US006813525B2

(12) United States Patent
Reid et al.

(10) Patent No.: US 6,813,525 B2
(45) Date of Patent: Nov. 2, 2004

(54) ENERGY MANAGEMENT SYSTEM

(75) Inventors: Drew A. Reid, Brentwood, TN (US); Scott C. Jordan, Murfreesboro, TN (US); Charles E. Reneau, Murfreesboro, TN (US); Stanley J. Brooks, Rockvale, TN (US); Keith E. Siders, Columbia, TN (US); Todd Munyon, Nashville, TN (US); Fredric I. Graham, Nashville, TN (US)

(73) Assignee: Square D Company, Palatine, IL (US)

( * ) Notice: Subject to any disclaimer, the term of this patent is extended or adjusted under 35 U.S.C. 154(b) by 639 days.

(21) Appl. No.: 09/765,915

(22) Filed: Jan. 18, 2001

(65) Prior Publication Data

US 2002/0010518 A1 Jan. 24, 2002

Related U.S. Application Data

(60) Provisional application No. 60/184,911, filed on Feb. 25, 2000.

(51) Int. Cl.[7] .............................................. G06F 15/46
(52) U.S. Cl. ............................ 700/19; 700/47; 702/182
(58) Field of Search .............................. 700/19, 28, 30, 700/47, 48, 49, 50, 276, 277, 299, 300, 21, 22, 292, 286; 702/182, 183, 187, 188; 361/170, 187, 206, 601, 622, 641, 644, 679; 200/56 R, 61.02

(56) References Cited

U.S. PATENT DOCUMENTS

| | | | |
|---|---|---|---|
| 4,623,859 A | 11/1986 | Erickson et al. | ............... 335/14 |
| 4,901,219 A | 2/1990 | Erickson et al. | ............. 363/146 |
| 4,940,903 A | 7/1990 | Brown, Jr. et al. | ......... 307/122 |
| 4,964,058 A | * 10/1990 | Brown, Jr. | ................... 700/296 |
| 4,965,694 A | 10/1990 | Dvorak et al. | ................ 361/64 |

(List continued on next page.)

OTHER PUBLICATIONS

Panelboard Lighting Control System—Section 16440–1, 3 pages doublesided.
"Powerlink® AS Circuit Breakers—Safe, Flexible, and Loaded with Features," Class 1210, Square D Groupe Schneider, brochure 1995, 1 page doublesided.
"Powerlink® AS Control Modules—Compact and Sophisticated Control," Class 1210, Square D Groupe Schneider, brochure Sep. 1995, 2 pages doublesided.
"Powerlink™ AS Lighting Control System," Class 1210, Square D Groupe Schneider, Oct. 1998, 26 pages doublesided.
"Powerlink® AS Software," Class 3080, Square D Groupe Schneider, brochure Dec. 1996, 2 pages doublesided.
"Powerlink® AS System For Industrial Applications," Class 1210, Square D Groupe Schneider, brochure Feb. 1997, 2 pages doublesided.
"Powerlink® AS The All–in–One, Automatic Lighting Control System," Square D Groupe Schneider, brochure Oct. 1998, 3 pages doublesided.
"Powerlogic® Power Monitoring and Control Systems Catalog," Class 3000, Square D Groupe Schneider, Dec. 1997, 37 pages doublesided.

*Primary Examiner*—Emanuel Todd Voeltz
(74) *Attorney, Agent, or Firm*—Kareem M. Irfan

(57) ABSTRACT

A programmable control system includes a control module having one or more inputs to which an external sensor device may be connected, and one or more outputs to which an external actuator device capable of manual override and providing a status feedback signal may be connected. One or more signal inputting devices are provided which a human operator can utilize to enter a learn mode. A display can be used to indicate a mode of the control system, and a memory can be used to store the characteristics of an external sensor device connected to an input and an association between inputs and outputs. A controller/processor has both a learn mode and a run mode. The control module may interface with external actuator devices such as circuit breakers located in one or more panels via an intelligent control bus and an address module.

96 Claims, 50 Drawing Sheets

U.S. PATENT DOCUMENTS

| | | | |
|---|---|---|---|
| D317,906 S | | 7/1991 | Winter et al. ............... D13/160 |
| 5,028,853 A | | 7/1991 | Brown, Jr. et al. ......... 318/280 |
| 5,083,103 A | | 1/1992 | Winter et al. .................. 335/14 |
| 5,180,051 A | * | 1/1993 | Cook et al. .................. 200/400 |
| 5,184,278 A | * | 2/1993 | Jordan et al. ............... 361/627 |
| 5,231,565 A | * | 7/1993 | Bilas et al. .................... 700/22 |
| 5,233,511 A | * | 8/1993 | Bilas et al. .................... 700/17 |
| 5,249,115 A | * | 9/1993 | Reid ............................ 700/12 |
| 5,253,159 A | * | 10/1993 | Bilas et al. .................... 700/22 |
| 5,315,499 A | * | 5/1994 | Bilas et al. .................... 700/22 |
| 5,323,307 A | * | 6/1994 | Wolf et al. .................... 700/22 |
| 5,327,114 A | * | 7/1994 | Straate et al. .......... 340/286.06 |
| 5,455,760 A | * | 10/1995 | Bilas et al. .................... 700/22 |
| 5,524,083 A | * | 6/1996 | Horne et al. ................. 700/293 |
| 5,532,660 A | * | 7/1996 | Smith et al. ................... 335/14 |
| 5,611,059 A | * | 3/1997 | Benton et al. .............. 345/734 |
| 5,706,455 A | * | 1/1998 | Benton et al. .............. 345/853 |
| 5,825,643 A | * | 10/1998 | Dvorak et al. ................. 700/12 |
| 5,892,449 A | * | 4/1999 | Reid et al. .................. 340/639 |
| 5,909,180 A | * | 6/1999 | Bailey et al. ................ 340/639 |
| 6,055,144 A | * | 4/2000 | Reid ............................ 361/64 |
| 6,067,483 A | * | 5/2000 | Fesmire et al. ............. 700/296 |
| 6,612,873 B2 | | 9/2003 | Reid et al. ................... 439/638 |

* cited by examiner

FIG. 12a

| Power Supply Addr1 | Control Module Addr0 |
|---|---|
| 12 Ploe Bus - Left | |
| 7 | 8 |
| 9 | 10 |
| 11 | 12 |
| 13 | 14 |
| 15 | 16 |
| 17 | 18 |
| 19 | 20 |
| 21 | 22 |
| 23 | 24 |
| 25 | 26 |
| 27 | 28 |
| 29 | 30 |
| 12 Ploe Bus - Right | |

30 Circuit Panel
Top or Bottom
Master or Slave

FIG. 12b

| Power Supply Addr1 | Control Module Addr0 |
|---|---|
| 18 Ploe Bus - Left | |
| 7 | 8 |
| 9 | 10 |
| 11 | 12 |
| 13 | 14 |
| 15 | 16 |
| 17 | 18 |
| 19 | 20 |
| 21 | 22 |
| 23 | 24 |
| 25 | 26 |
| 27 | 28 |
| 29 | 30 |
| 31 | 32 |
| 33 | 34 |
| 35 | 36 |
| 37 | 38 |
| 39 | 40 |
| 41 | 42 |
| 18 Ploe Bus - Right | |

42 Circuit Panel
Top or Bottom
Master or Slave

FIG. 12c

| Power Supply Addr1 | Control Module Addr0 |
|---|---|
| 21 Ploe Bus - Left | |
| 7 | 8 |
| 9 | 10 |
| 11 | 12 |
| 13 | 14 |
| 15 | 16 |
| 17 | 18 |
| 19 | 20 |
| 21 | 22 |
| 23 | 24 |
| 25 | 26 |
| 27 | 28 |
| 29 | 30 |
| 31 | 32 |
| 33 | 34 |
| 35 | 36 |
| 37 | 38 |
| 39 | 40 |
| 41 | 42 |
| 43 | 44 |
| 45 | 46 |
| 47 | 48 |
| 21 Ploe Bus - Right | |

54 Circuit Panel
Top or Bottom
Master or Slave

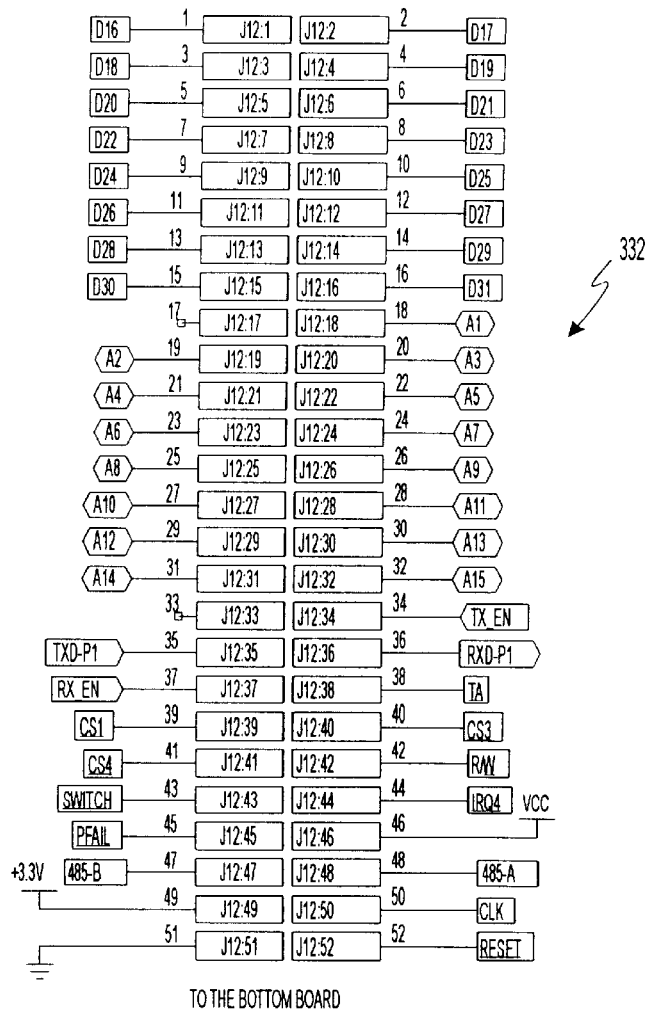
TO THE BOTTOM BOARD
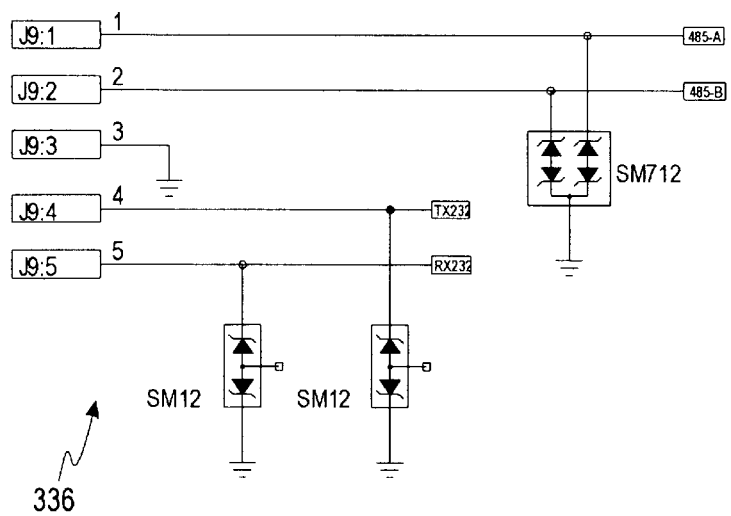
FIG. 28b

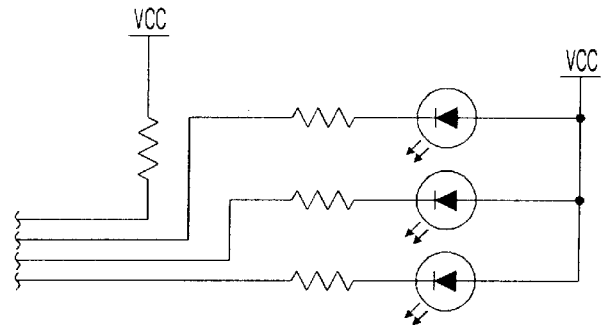
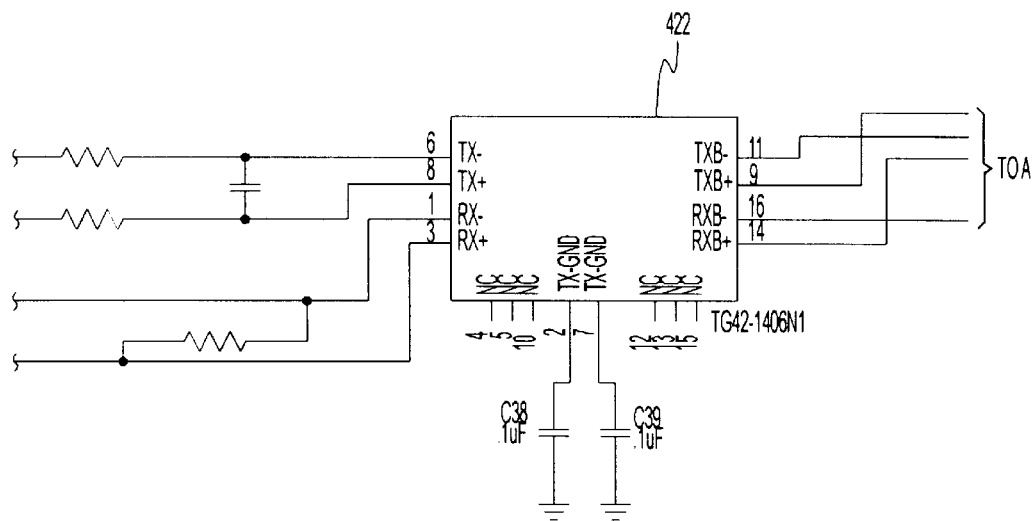
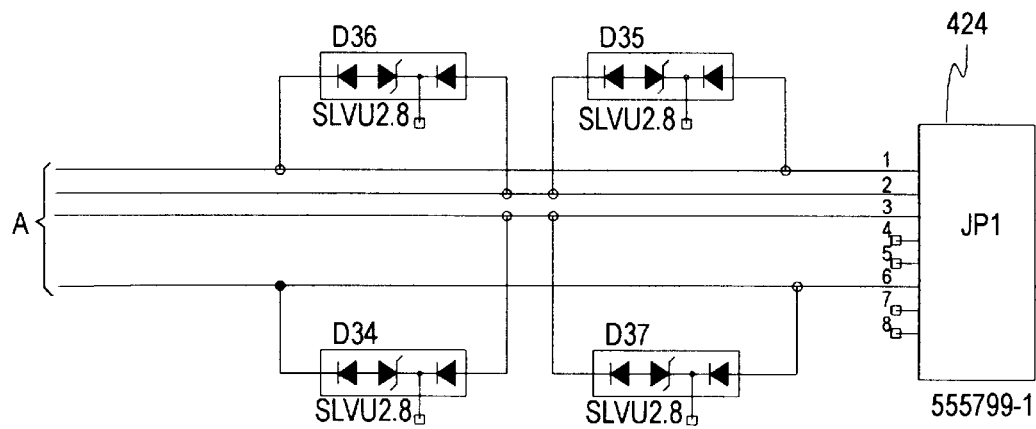
FIG. 31b

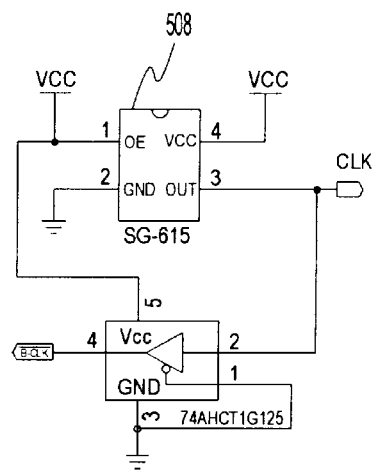
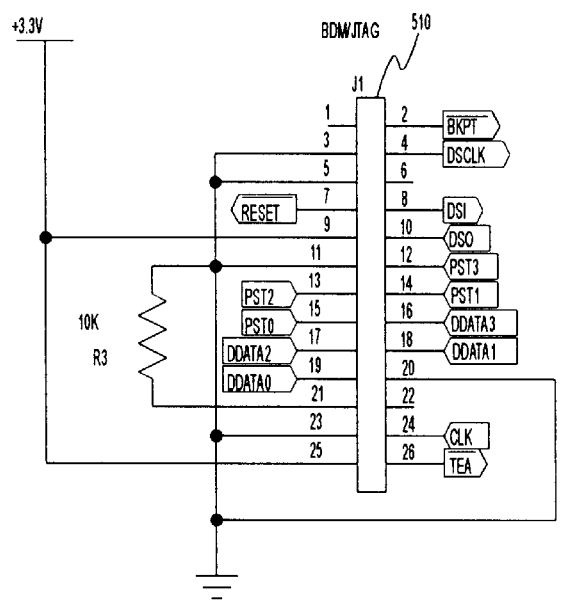
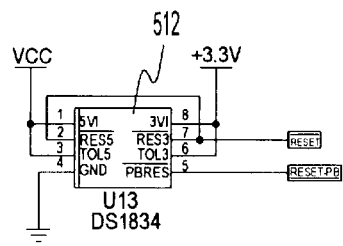
FIG. 33c

ENERGY MANAGEMENT SYSTEM

CROSS-REFERENCE TO RELATED APPLICATION

This application claims the benefit of pending United States Provisional Patent Application Ser. No. 60/184,911, filed Feb. 25, 2000.

FIELD OF THE INVENTION

This invention relates generally to electrical distribution systems and specifically to a system for incorporating energy management circuit breakers (EMCBs) in new or existing electrical distribution panels.

BACKGROUND OF THE INVENTION

Lighting directly accounts for about 40% of the electricity consumed in a typical building. Leaving lights on after hours or during long periods when they are not being used is a tremendous drain on energy and profits. Turning them off, on the other hand, is an instantaneous cost reduction. Reducing the amount of time that lamps burn each day can substantially increase the amount of time between replacements, saving on labor, material and disposal costs. Controlling electrical loads such as lights—turning them off when not needed—conserves energy, saves money, and helps the environment. This is not only cost effective, but is often required by federal and state laws in new or renovated buildings.

One of the oldest and simplest lighting control systems is the wall switch. Depending on people to flip a switch, however, is not an effective way to ensure that lights are turned off. Relay-based systems were developed to provide remote lighting control—and assurance that lights are turned off—but they are complex and bulky. In addition to a conventional circuit breaker panelboard, they require a separate relay cabinet, control system and the extra conduit, wire gutters and wall space to connect everything. Space for such new equipment in buildings is often limited. Modifying existing circuit runs is labor intensive. The installation may be very expensive, time-consuming and disruptive to occupants.

To overcome such limitations of relay-based systems, the instant assignee developed a "POWERLINK AS" energy management system that combined all of the components necessary to monitor and control lighting, as well as other types of electrical loads, within the space of a single, standard panelboard enclosure. Little additional equipment is required, thereby eliminating the need for extra space, modifying existing circuits, or disrupting operation. The POWERLINK AS system comprises four modular components, including motor-operated circuit breakers, plug-on control busses, a power module, and microprocessor-based control electronics. Each of the modules is designed to mount to a conventional panelboard. Wiring is kept to a minimum, and no additional wall space is required.

The intelligence of the POWERLINK AS system comes from its resident microprocessor-based control module. It can process signals that originate externally from control devices, such as switches or sensors, or provide time-based control according to predefined daily schedules set up by the user in the module. The power module furnishes the power for the circuit breakers and system electronics, and reports the status to the control module. In addition, it contains input and communications terminations for connection to external control devices such as wall switches, motion sensors, and photo-cells. The remote-operated circuit breakers in the POWERLINK AS system combine the protective features of conventional circuit breakers with the switching functions of a contactor. This eliminates the need for separate relays or contactors and associated enclosures, wiring, schedules, and installation labor. Finally, the plug-on control busses attach to the panelboard and provide interconnect wiring between the circuit breakers and the power module. The busses conduct switching power and control signals from the power module to switch individual circuit breakers, and report circuit breaker status back to the control module. Some innovative features of the POWERLINK AS system are disclosed in U.S. Pat. Nos. 5,180,051; 5,184,278; 5,231,565; 5,233,511; 5,249,115; 5,253,159; 5,315,499; 5,323,307; 5,455,760; 5,532,660; 5,892,449; and 5,909,180, which are incorporated by reference in their entireties.

Although the POWERLINK AS system provides a significant advancement in the art of energy management systems, there is a continuing need to develop new features for such systems to satisfy the demands of building owners, operators, and plant managers. The present invention is directed to satisfying these needs.

One of the difficulties encountered with control systems is that some level of programming is required to set up the system. This programming requires some type of human interface in which associations can be described Quite often this interface is not built in, since programming is only needed at installation time. While this lowers product cost, access to this device is occasionally needed and one must be purchased for each location or by each contractor. This is not practical for areas in which a contractor may only install a few systems.

Also, some electricians are not comfortable with the concept of programming, requiring system integrators to perform this task, again increasing cost.

The present invention, as more fully described below, eliminates the need for conventional programming by providing a way in which input signals and output actions are learned by manual actuation of a few simple control buttons. When this concept is applied to POWERLINK, a contractor would simply press the learn button, manually set his breaker handles to their desired positions and turn the input on, then he would then set the affected breakers to the opposite state and turn the input off. The input activity is used to take a "snapshot" of the breaker status. From this activity, the system can collect information as to which breakers are affected by which input, what type of input device is connected (momentary, maintained, or push-button switch), breaker states associated with the first input event, and breaker states associated with the second input event. All of the essential programming information is collected, stored, and activated.

An additional benefit is that input wiring errors are reduced since it is no longer necessary to wire a switch to a specific input.

Remotely operated circuit breakers provide both protection and switching in a convenient package. Most devices on the market use lengthy external wires to connect the switching means to an external control means. When Square D Company developed the POWERLINK AS system, a companion device, known as a control bus, was introduced to eliminate this wiring. This existing control bus provides a self-contained wiring means to connect the remotely operated circuit breakers to the control means. Connectors deployed along the length of the bus correspond to each branch circuit.

While the existing control bus provides a great advantage over other wiring methods, there are improvements that can be made to the control bus concept. One issue that this invention addresses is the existing requirement to provide a complete set of electronics within each panel. A secondary issue is that the existing control circuitry within this set of electronics is designed to operate a fixed number of points (42).

This invention, as more fully described below, overcomes these limitations by providing an intelligent wiring bus with its own internal controller. This results in two major improvements: first, since this new bus can be made in a variety of lengths, the number of control points can be optimized for a panel; and second, this new concept breaks the 42-point boundary by associating the control means with the number of breakers controlled, not with the panel.

Following this logic to the extreme would result in the conclusion that the optimal arrangement would be to place the control means at or within the breaker itself However, the cost of such an arrangement is still prohibitive.

The foregoing as well as other advantages and features of the invention are more fully described hereinbelow.

SUMMARY OF THE INVENTION

In accordance with one aspect of the invention, a programmable control system comprises a plurality of inputs for connecting to external sensors, a plurality of outputs for connecting to external actuators capable of manual override and providing status feedback signals to the control system, means, operable in a learn mode and responsive to the status feedback signals, for learning associations between the inputs and the outputs and recording the associations in a memory in response to a human operator selecting one of the inputs and manually toggling selected ones of the external actuators between first and second positions, and means, operable in a run mode, for commanding the selected ones of the external actuators to one of the first and second positions in response to a change in state of the external sensor connected to the one of the inputs, whereby the human operator has programmed an output response to input activity by manual manipulation of the connected sensors and actuators.

In accordance with another aspect of the invention, a method of programming a control system including a plurality of inputs and outputs, the inputs being connected to external sensors, the outputs being connected to external actuators capable of manual override and providing status feedback signals to the control system, the control system including a memory for recording associations between the inputs and the outputs, the method comprises switching the control system to a learn mode, selecting one of the inputs, and manually toggling selected ones of the external actuators between first and second positions.

In accordance with another aspect of the invention, a control bus for an electrical panelboard having a plurality of actuator device locations, said control bus comprises a plurality of connectors arranged such that a connector is adjacent to each of said plurality of actuator device locations, whereby the control bus means is capable of coupling to one or more actuators occupying one or more of said plurality of actuator locations, a controller circuit capable of accepting a control signal from an external device, which a control signal is used to command the position of one or more actuator devices occupying said one or more actuator devices locations, a drive circuit capable of causing said one or more actuator devices to actuate between at least two positions in response to said control signal.

In accordance with another aspect of the invention, there is provided a circuit breaker device with an internal impedance, connected between the load terminal and an external detection circuit, which internal impedance provides both isolation and level reduction.

In accordance with another aspect of the invention, there is provided a circuit breaker device with an internal wire-jumper identification circuit, in which at least the following conditions are encoded 1-pole, 2-pole, 3-pole, device not present.

In accordance with another aspect of the invention, a control module comprises a housing, a processor in said housing capable of accepting and interpreting one or more externally originating control signals provided from a sensor or control device, said processor being further capable of providing control signals to actuator devices located external to said housing, said processor being further capable of interpreting said externally originating sensor or control device signals into control signals for one or more external actuator devices, a memory disposed within said housing wherein mapping of said externally originating control signals to one or more external actuator devices is stored, said processor being capable of acquiring said mapping information and loading said mapping information into said memory, and an informational display mounted to said housing, on which a plurality of statuses of one or more of said control signals, said external actuators, or said controller are displayed.

In accordance with another aspect of the invention, a power supply, mountable within an electrical panelboard with a plurality of circuit breaker locations, comprises a housing dimensioned such that it can be inserted into a location normally occupied by a circuit breaker, a means for connecting to AC power, and a circuit means within said housing providing a regulated source of DC electrical power to output terminals, converted from said AC power, in which said conversion circuitry is adaptive to a range of voltage from at least 120 Vac to 277 Vac and the adaptive frequency range is adaptive from at least 50 to 60 cycles per second.

BRIEF DESCRIPTION OF THE DRAWINGS

In the drawings:

FIGS. 12*a*–12*c* indicate possible control bus numbering schemes;

DETAILED DESCRIPTION OF THE ILLUSTRATED EMBODIMENT

The drawings and the following descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated in the claims.

1. Overview

Figure 1:
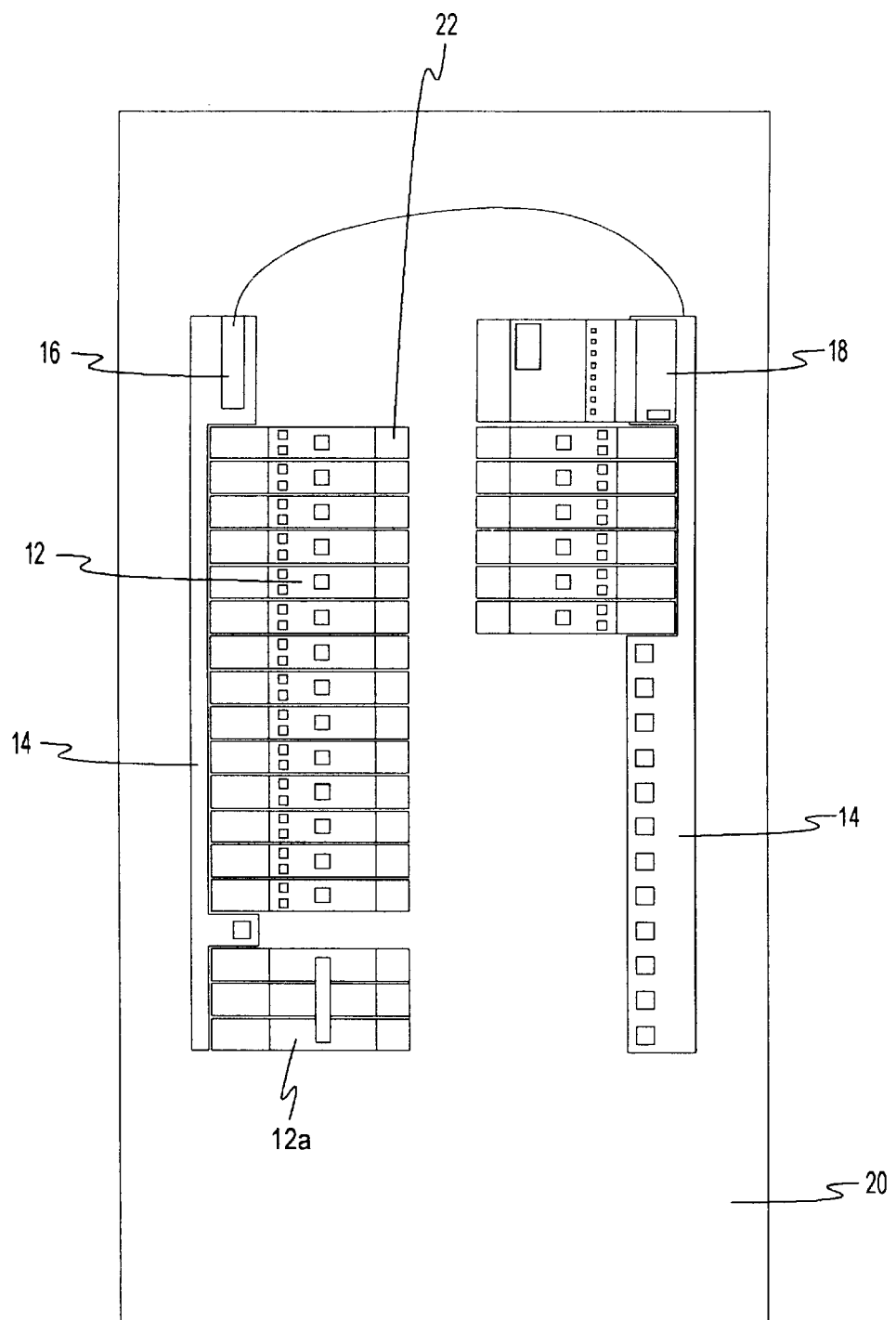
FIG. 1 is a simplified elevation of a panelboard incorporating components of an energy management system in accordance with one form of the invention.

FIG. 1 depicts an electrical distribution panel 10 of an energy management system embodying the present invention. The basic components of the system include remotely-operable circuit breakers 12, a pair of control busses 14, a power module 16, and a control module 18. These components plug into a panelboard 20 for ease of installation and operation. The control busses 14 may also accommodate conventional (i.e., not remotely-operable) circuit breakers 12*a*.

The circuit breakers 12 perform both overcurrent protection and remote switching functions on AC voltage systems. They may have a 1-, 2-, or 3-pole construction. The 2- and 3-pole circuit breakers are common trip. An overcurrent condition on any given pole of the circuit breaker will cause all poles of the circuit breaker to open.

The core of each circuit breaker 12 is a highly effective trip mechanism. A 24 VDC motor, along with a drive train and linkage, provides remote operation capability. This motor is located in the left pole of the 2-pole circuit breaker and the center pole of the 3-pole circuit breaker. When the circuit breaker handle 15 (see also FIG. 14) is in the ON position, the motor and drive train can open and close the contacts. When the handle is in the OFF position or the circuit breaker is tripped, the contacts cannot be closed remotely. An auto/manual switching mode selector on the front of the circuit breaker provides mechanical override capability. In manual mode, the motor drive train is disconnected from the contacts. The circuit breaker handle then operates the contacts like a conventional circuit breaker. A sensing device determines the presence or absence of voltage on the roadside terminal, and reports circuit breaker contact position back to the control module 18. Thus, a true-positive-closed-loop feedback of actual contact status is achieved.

Each circuit breaker 12 has a permanent trip unit that contains a factory preset thermal (overload) trip element and a magnetic (short circuit) trip element in each pole. The thermal trip element is rms sensing and is calibrated to carry the continuous current rating of the circuit breaker at about 40° C. free air ambient temperature.

Each circuit breaker 12 has an over-center toggle mechanism that provides quick-make, quick-break operation and a trip indicator. The operating mechanism is trip-free such that the circuit breaker will trip even though the operating handle may be restricted to the ON position. Without any restrictions, the operating handle moves to a position between ON and OFF when the circuit breaker is tripped. An internal crossbar provides common tripping of all poles on 2- and 3-poles circuit breakers. The trip indicator includes an indicator window that display one of three colors to show circuit breaker contact status. For example, the color white indicates that the circuit breaker contacts are closed; green indicates that the contacts are open; and red indicates that the circuit breaker is tripped.

The control busses 14 provide a functional interconnect between the circuit breakers 12 and the control module 18. Specifically, they conduct 24 VDC switching power and control signals from the control module 18 to switch individual circuit breakers 12, and report circuit breaker status back to the control module 18. Using surface mount technology, the busses 14 preferably include some intelligent switching circuitry that in prior systems was incorporated in the power interface module 16 and/or control module 18. These "smart" busses 14 reside on panelboard interior mounting channels. Each bus 14 provides secure plug-in connectors for mounting a plurality of circuit breakers 12 and either the power module 16 or the control module 18. The power module 16 is mounted to one of the busses 14, while the control module 18 is mounted to the other of the busses 14 generally opposite to the power module 16. A bundle of wires 22 extend between the power module 16 and the control module 18 to allow these components to communicate with each other and to provide 24 VDC power from the power module.

The power module 16 contains a power supply that furnishes 24 VDC power for remote circuit breaker for use in deriving regulated switching and 5 VDC and other DC power for the control module system and smart bus electronics, and reports the status of the 24 VDC to the control module 18 via one of the wires 22. The power module 16 plugs directly to a connector on one of the busses 14.

The microprocessor-based control module 18, which is plugged to a similar connector on the other bus 14, provides most of the intelligence of the electrical distribution panel 10. The control module 18 can process signals that originate externally from control devices, such as switches or sensors, or provide time-based control according to predefined daily schedules set up in the module. In addition, the control module 18 contains input and communications terminations for connecting to external control devices. These terminations can accept a plurality of dry contact inputs with the following characteristics: 2-wire maintained, 2-wire momentary, and 3-wire momentary. The control module 18 provides optional network communications, multi-channel time clock functions, 365 day calendar control, and optional local display operations. If the control module 18 is provided with a local display, such a display may show system status and program information The control module 18 may turn one or more of the circuit breakers 12 ON and OFF based on an event or events programmed into the control module. Events can be on automatic control, such as time-of-day, or signaled by an input change (e.g., moving a light switch from ON to OFF). Output signals are sent from the control module 18 to the circuit breakers 12 via the smart bus 14.

Figure 2:
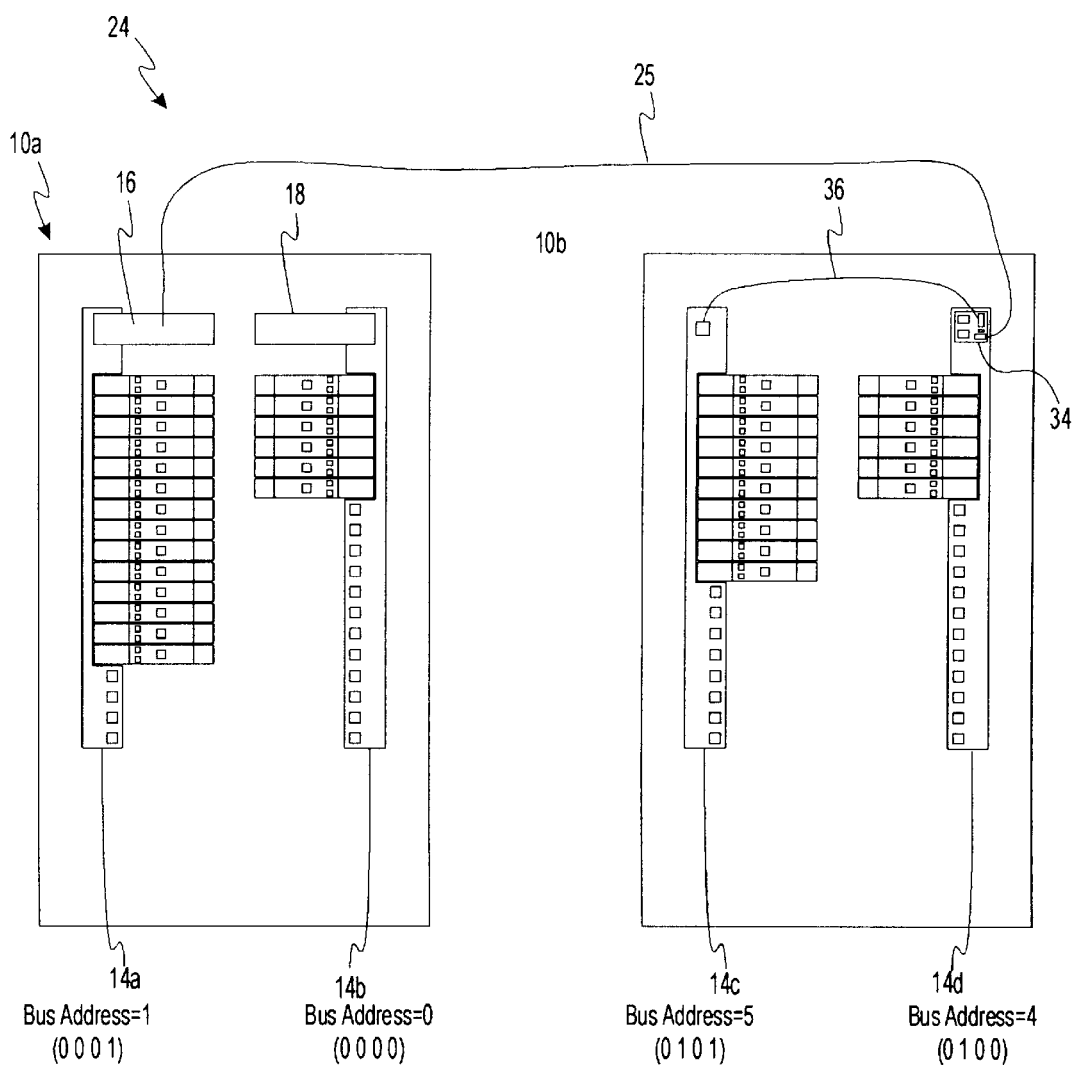
FIG. 2 is a simplified elevation of a pair of breaker panels similar to FIG. 1 connected to form an energy management system in accordance with the invention.

Referring to FIG. 2, the energy management system allows for multiple electrical distribution panels 10a and 10b to share a common control module 18 and a common power module 16 thereby greatly reducing the cost of jobs where multiple panels are involved. Operability between panels is accomplished through the use of a device level network 24 that provides a communications data path and control power to the various components over interpanel network wires 25. The respective modules 16, 18 may be designed such that the wires from the first panel connect to either the power module 16 or the control module 18; however, the former is indicated in FIG. 2. In one embodiment, each device level network 24 is designed to accommodate up to eight smart busses 14 In one network embodiment, these smart bus components can be distributed in one to eight different panels. Each bus 14a, 14b, 14c, 14d may have a unique bus address, one example of which is indicated in FIG. 2. The circuit breakers 12 can be controlled by a single control module 18, and be powered by a single power module 16.

Figure 3:
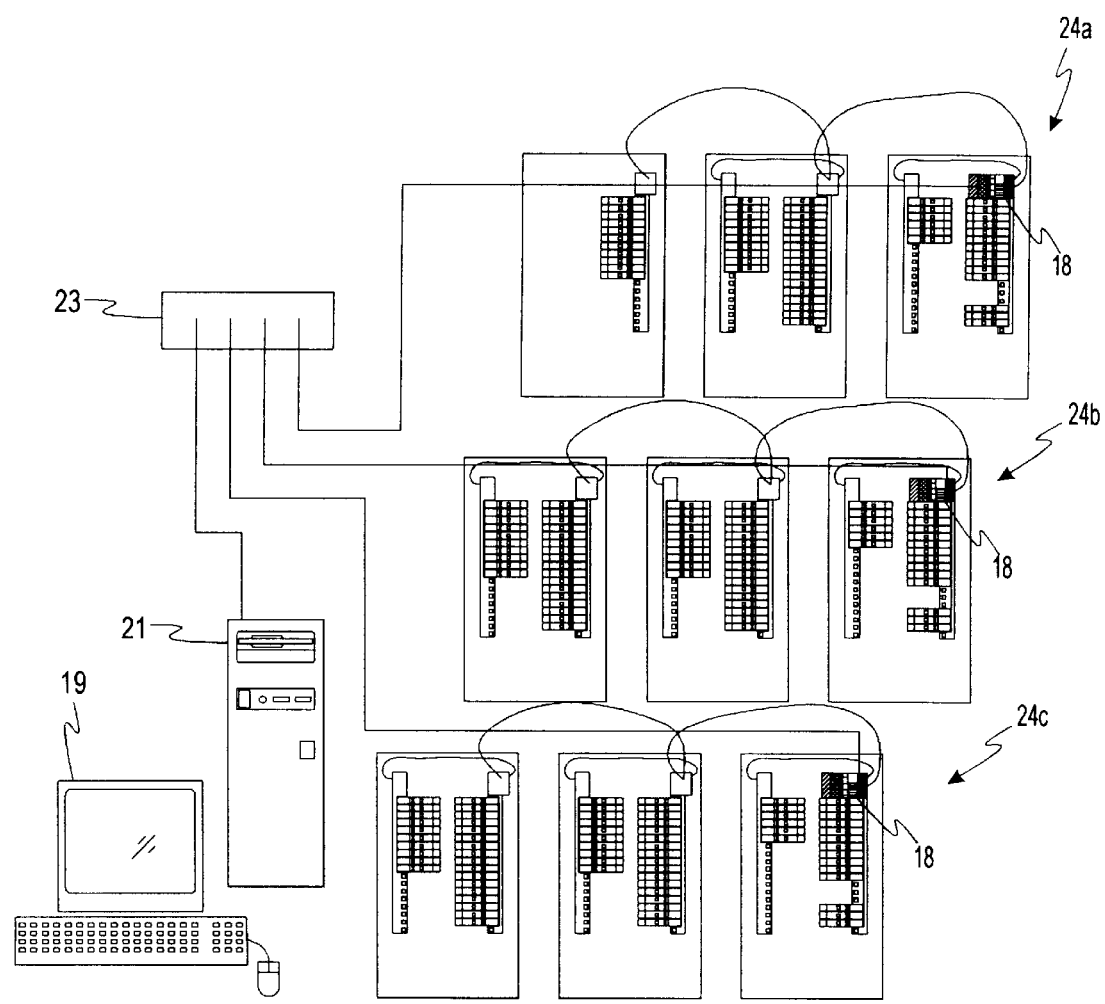
FIG. 3 is a simplified elevation of a number of breaker panels connected in an energy management system including a multiple device network or Ethernet.

Referring to FIG. 3, connection of multiple device level networks 24a, 24b, and 24c may be achieved on systems containing more than eight smart busses 14. Such systems typically require these panels to share common inputs located throughout the building. The control modules 18 in the respective device level networks can be furnished with an Ethernet option (indicated schematically by components 19, 21 and 23) which allows the control modules 18 to be tied together and inputs shared across the network.

2. Object Representation

Figure 4:
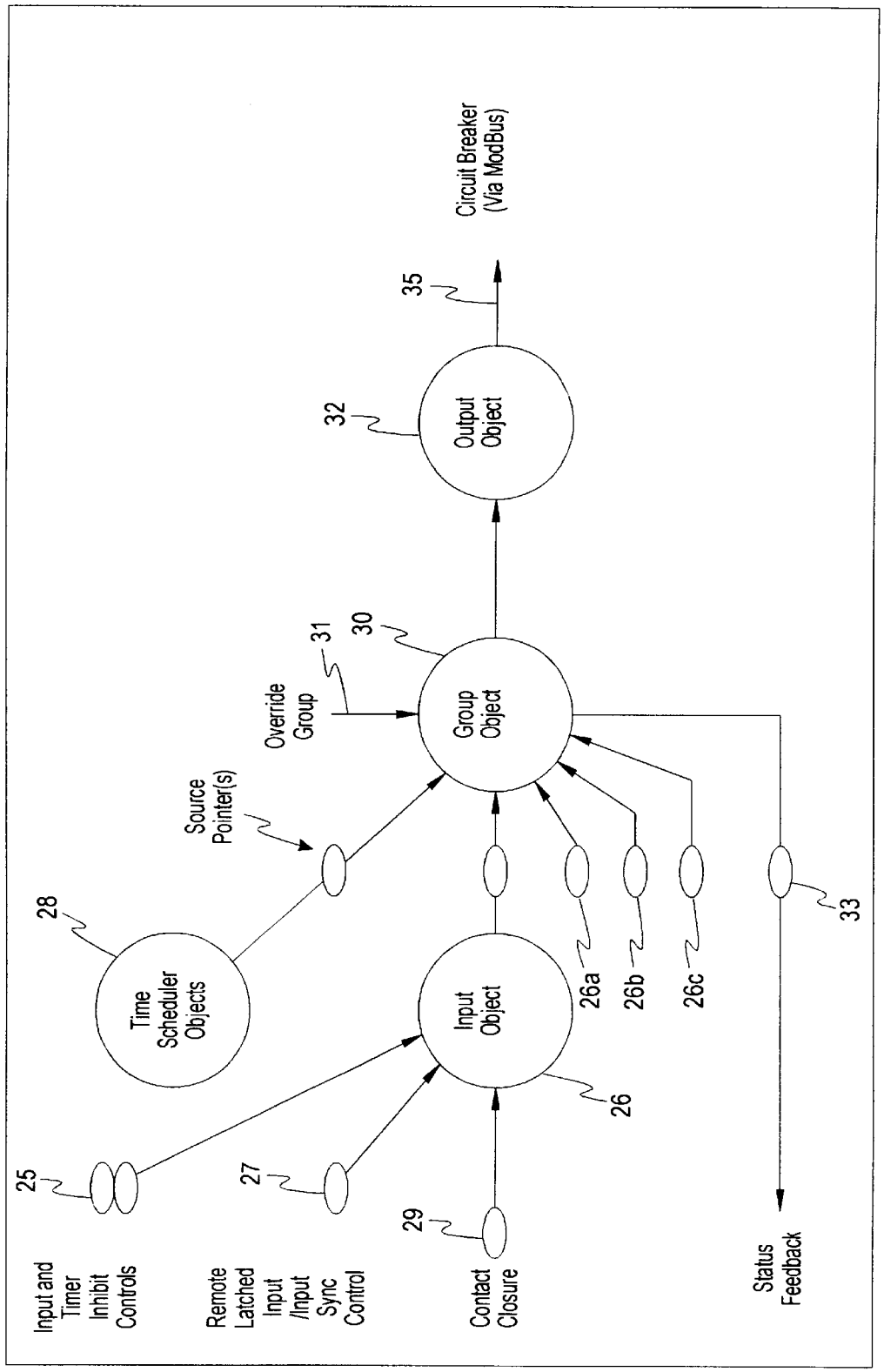
FIG. 4 is a diagrammatic showing of one aspect of operation of a control module of the energy management system of the invention.

Referring to FIG. 4, operation of the control module 18 can be shown diagrammatically as a series of processes. These processes can be naturally grouped into objects, with each object representing a major function of the module. There are four major control functions, or types of objects, within the control module 18. They are: input objects 26, time scheduler objects 28, group objects 30, and output objects 32. The input object 26 combines the physical hardware activity with the configuration attributes to create a single logical state representative of the input. This hardware activity may include input and timer inhibit controls 25, remote latched input/input sinc control 27 and contact closure 29. The scheduler object 28 compares the current time, day and date with the schedule configuration, and computes a single logical state. The group object 30 takes all logical states that are configured to it, including inputs from the time scheduler objects 28 and one or more input objects 26 (26a, 26b, etc.) logically combines them according to the logic type configuration, and creates a single group state. It then uses this group state to set the desired states of any circuit breakers 12 mapped to that group. The group object 30 may also receive an override group input 31 and provide a status feedback 33. The output object 32, each representing a circuit breaker 12, combines this desired state (from the group object 30) with the configuration attributes to determine and control the physical state of the circuit breaker 12 (via the modbus) as indicated at 35.

One embodiment of the control module 16 allows custom configuration in which any single bit status may be used as a source for the group logic, through a system of pointers. The choice of a particular status is referenced by using either a 0X or 1X input/coil number, as included in the register list. These pointers are pre-loaded with typical default values, but may be changed by the user to meet special applications.

3. Input Object Operation

The input object 26 produces a logical output based on the status of a dry-contact input 29, in conjunction with the configuration parameters for that input. The behavior of an input is interpreted according to the input type parameter and, based on this activity, will update the corresponding input object state for use by other processes. A timer can effect this status, if configured and enabled.

The input task is comprised of two parts: the hardware interpretation process periodically scans, debounces, and interprets the status of connected devices. The result of this process updates the latched input state. The input control process combines the affect of timers with changes of the latched input state, and updates the input object state. Latched input states and accumulated timer values are held during power loss.

3.1 Hardware Interpretation Process 3.1.1 Scanning and Debouncing

The control module 18 physically has eight dual inputs in the illustrated embodiment (see also FIG. 28, reference numeral 326) of which one-half are used for 2-wire switch applications, or both halves are used for three-wire switch applications. It is required that a contact close or open action be valid for at least 50 ms before it is recognized. To provide de-bouncing, the inputs are polled about every 10 ms and the contact state is valid for at least 5 consecutive samples (50 ms) before the logic state is updated.

3.1.2 Input Interpretation

Contact activity is interpreted according to the input type configuration. For example, the status of a momentary switch is interpreted according to the hardware type setting and is latched, since the event is transient. The latched input state may also be changed from either communications or another process. This latched state is remembered through a power cycle to prevent an unknown condition from occurring. (On a new installation, the default state when the condition is unknown is assumed OFF.) When the input hardware type is Maintained, the latched input state equals the contact state interpretation, since the switch is "self-latching".

Figure 5A:
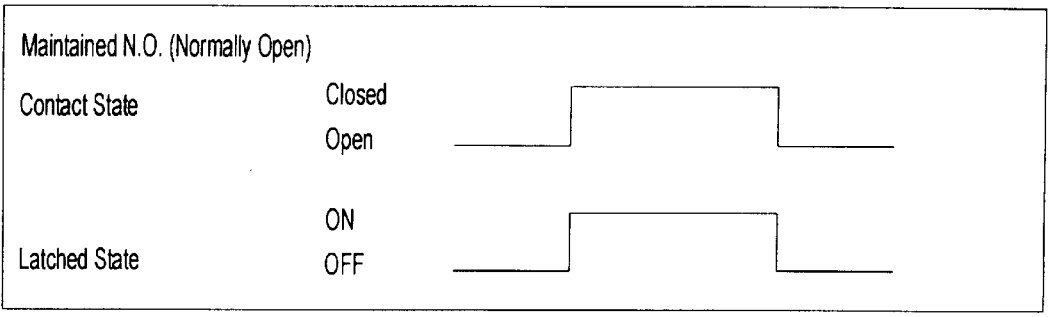
FIGS. 5a–5f are timing diagrams illustrating input object operation in accordance with one aspect of the invention.

Input configuration types are described as follows:

Maintained N.O. (FIG. 5a)—The latched state is the same as the contact state.

Figure 5B:
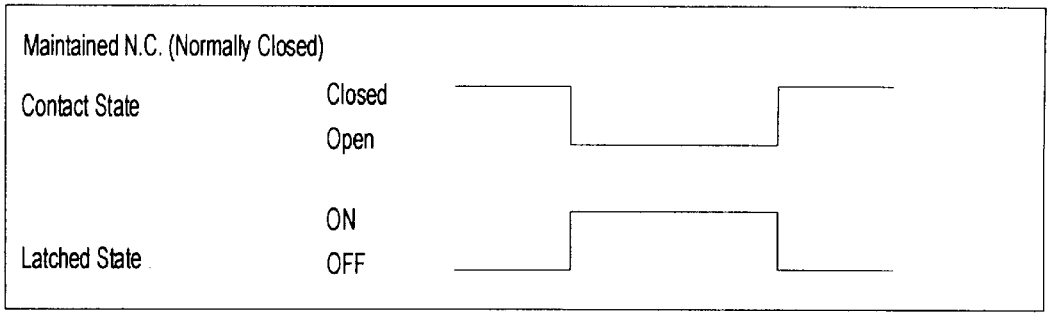

Maintained N.C. (FIG. 5b)—The latched state is the opposite of the contact state.

Figure 5C:
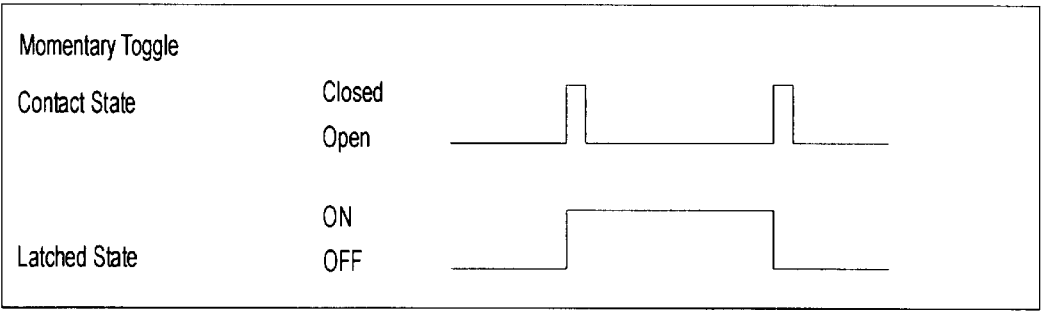

Momentary Toggle (FIG. 5c) (2-Wire Momentary)—The latched state alternates between ON and OFF on subsequent contact closures.

Figure 5D:
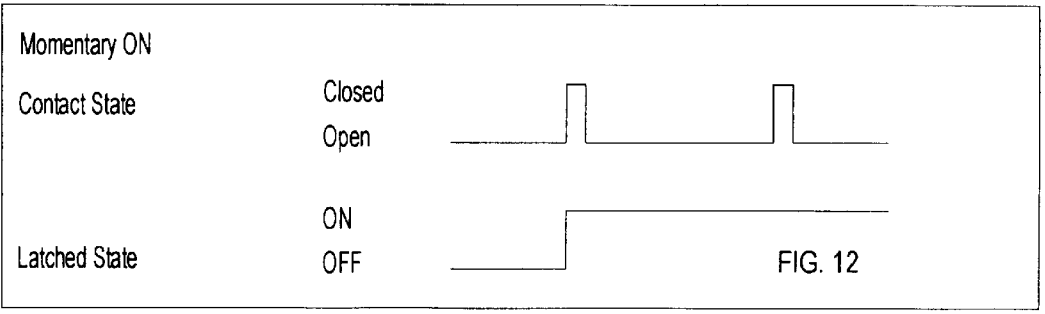

Momentary ON (FIG. 5d)—The latched state is commanded ON when the contact is closed.

Figure 5E:
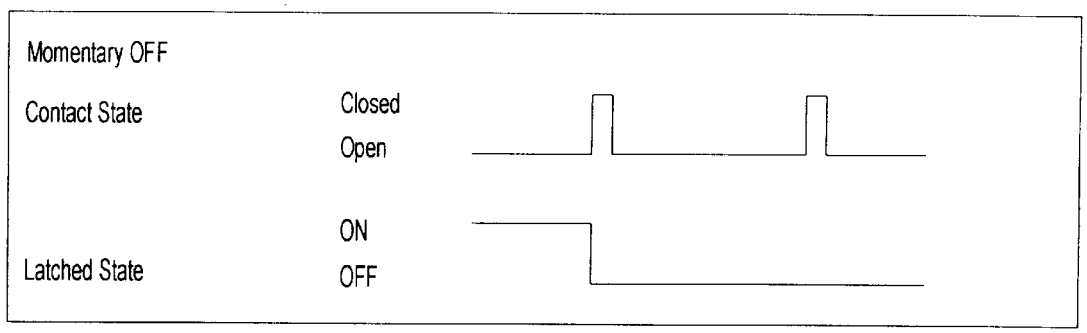

Momentary OFF (FIG. 5e)—The latched state is commanded OFF when the contact is closed.

Figure 5F:
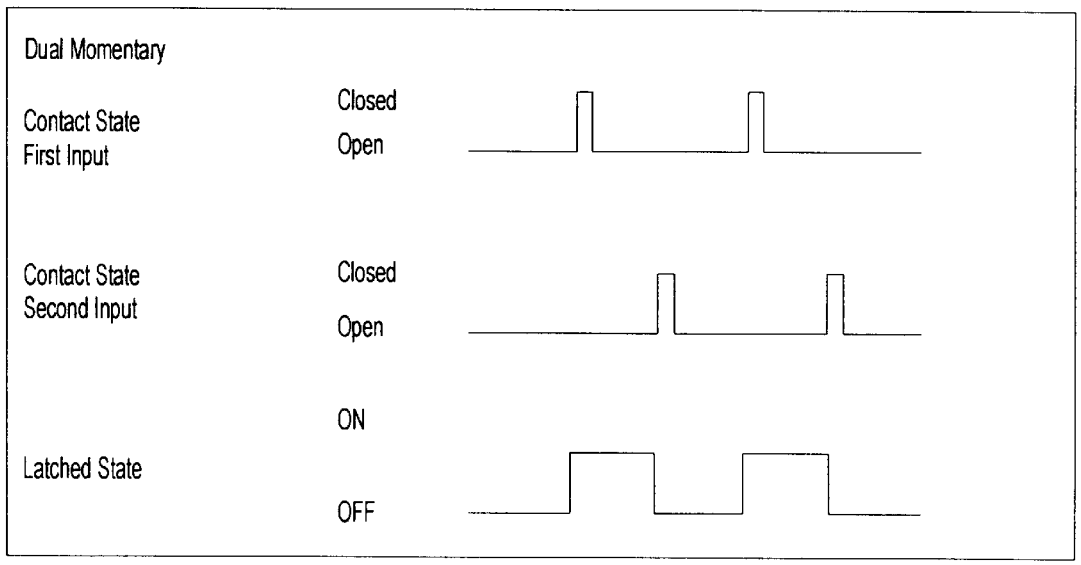

Dual Momentary (FIG. 5f) (3-Wire Momentary)—The latched state is commanded ON or OFF according to which contact is closed.

These types are illustrated in FIGS. 5a through 5f. Not shown on these diagrams is an "Update" flag for each input. This flag will be set whenever there is any valid activity on the input, even if there is no change in state. The update flag is required for use with timers, which is discussed below. Also discussed below is the "manual" flag which is used to indicate that the change in object state was the result of a contact closure.

3.2 Input Processing/Input Timers

A timer may be used to delay a change from the latched input state to the input object state. A typical use is to automatically provide an OFF signal some time after a physically initiated ON action. If a timer is not configured or is inhibited for an input, the input object state is always equal to the latched input state and any remaining timer value is zeroed.

When an input is configured as either Momentary ON or Dual Momentary it is possible to create successive ON contact closures, without any OFF occurring. In these cases, the update flag indicates that the timer needs to restart with the initial value. The update flag is cleared after the processing of the input timer. The manual flag is set whenever the update flag is set, but is cleared when the timer expires and the output state is updated.

Below is a description of different timer types:

3.2.1 Timed ON (AKA Off-Delay Timer)

Figure 6:
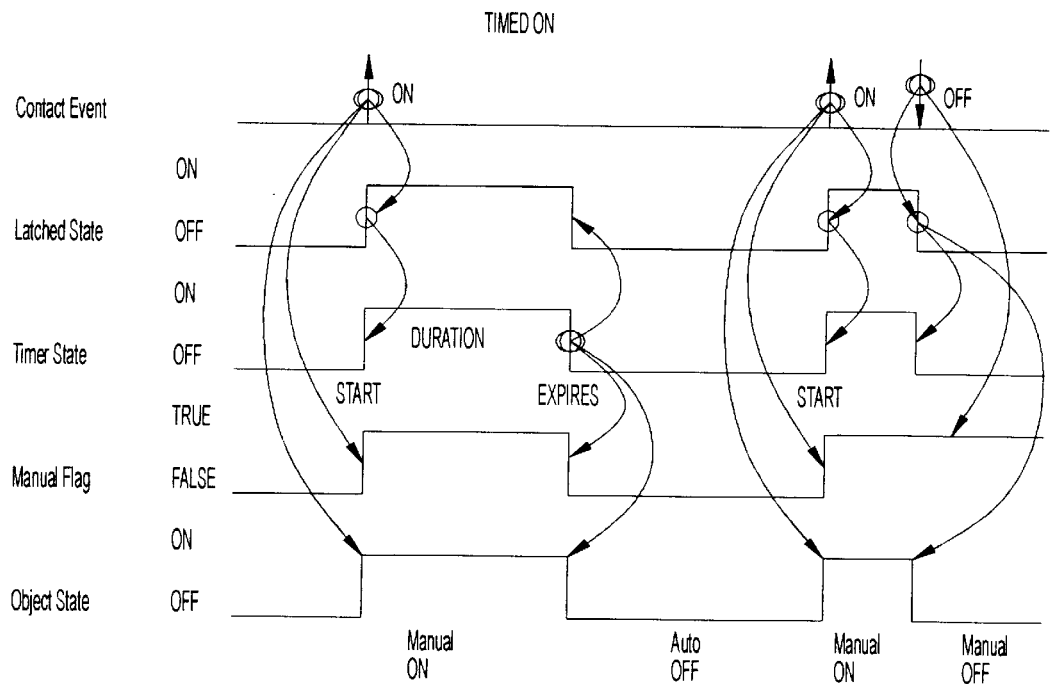
FIGS. 6, 7a–b, and 8 are timing diagrams illustrating operation of a timer in accordance with one aspect of the invention.

Referring to FIG. 6, when the update flag is set and the latched input state is ON, the timer will restart, and the input object state is set to ON. The input object state remains ON until the timer expires. On expiration both the latched input state and the input object state are reset to OFF. If the latched input state changes to OFF at any time, the input object state is reset to OFF. (Not intended for use with the Maintained input hardware type.)

3.2.2 OFF Delay (AKA Delayed-OFF Timer)

Figure 7A:
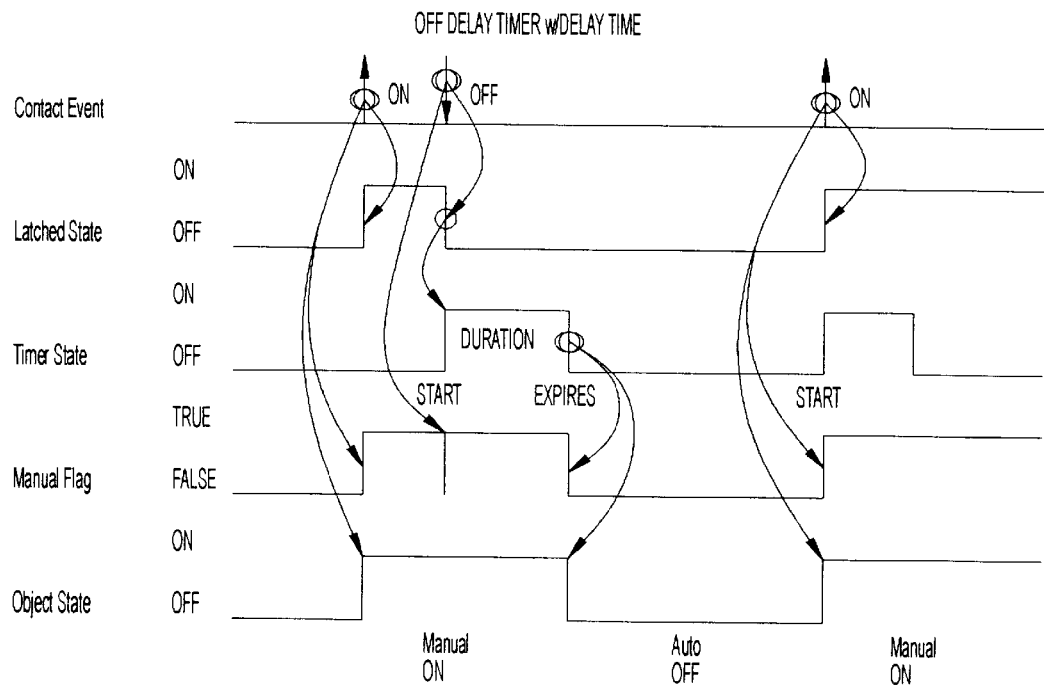
Figure 7B:
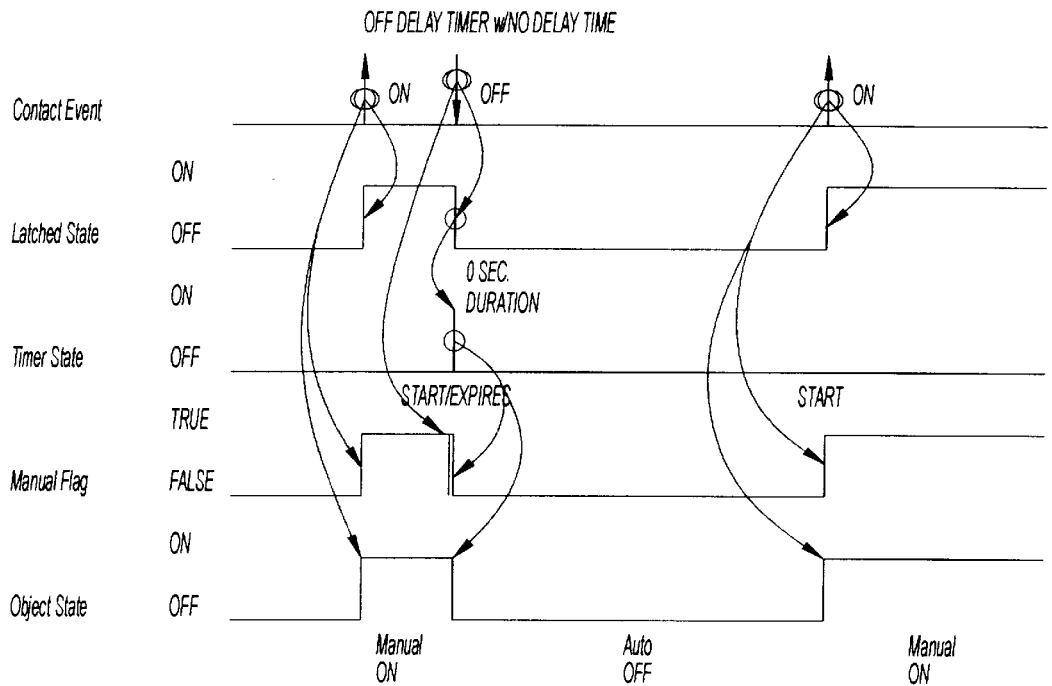

Referring to FIGS. 7a and 7b, when the latched state changes to OFF, the timer will restart and the input object state will remain ON until the timer expires. If the latched state changes to ON at any time, the input object state turns ON. (Used for egress path lighting or occupancy sensors without internal time delay.)

3.2.3 Sensor Delay

Figure 8:
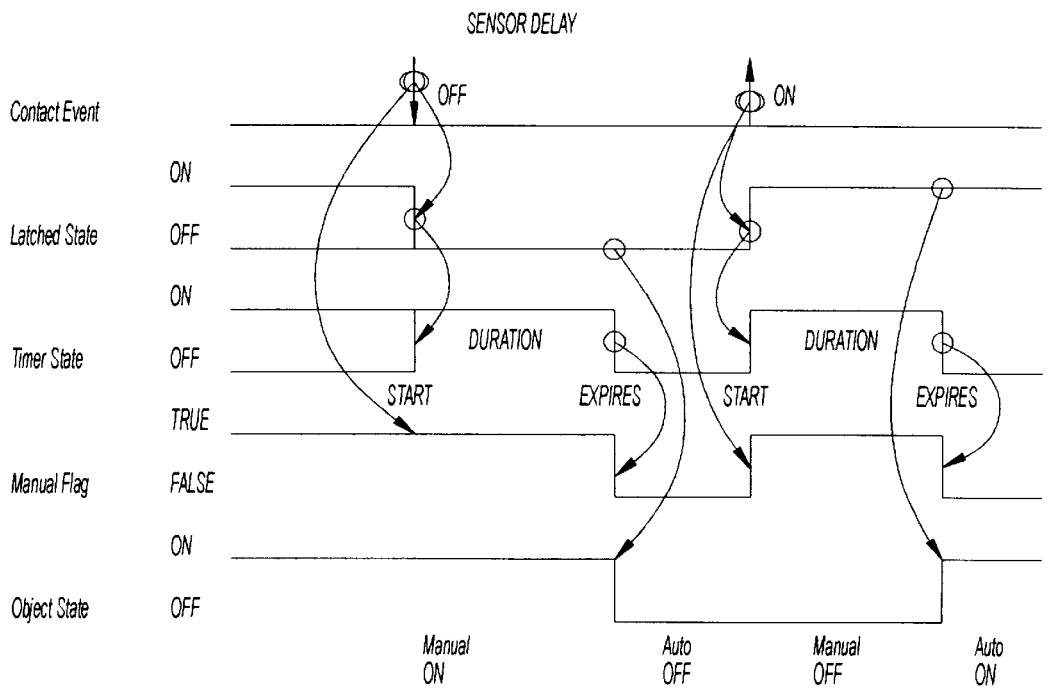
Figure 9A:
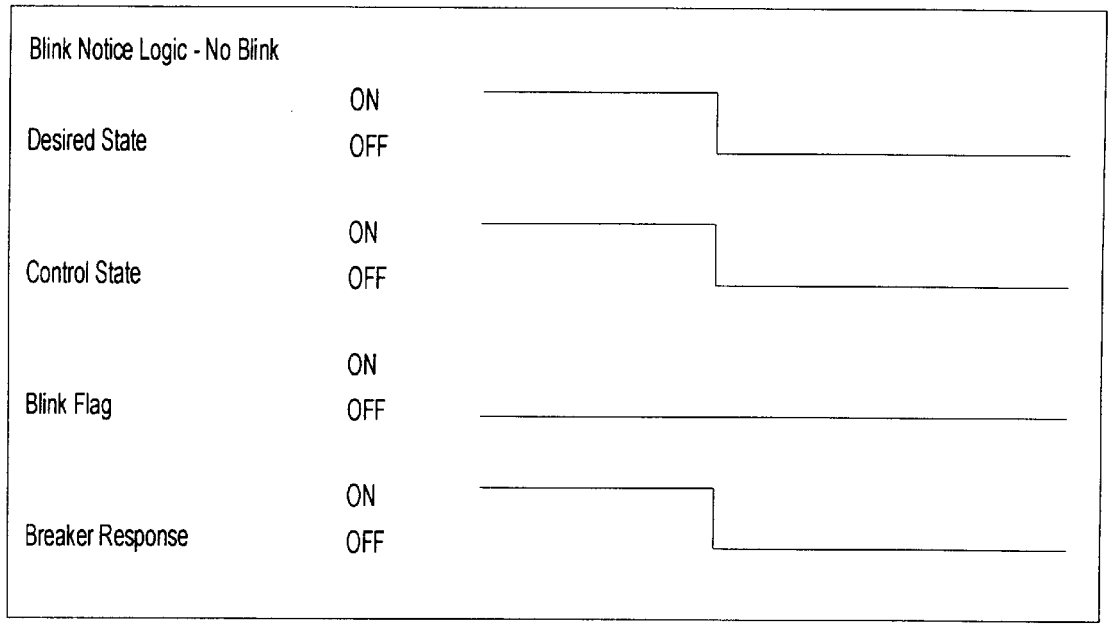
FIGS. 9a and 9d illustrate blink notice logic in connection with output operation in accordance with one aspect of the invention.
Figure 9B:
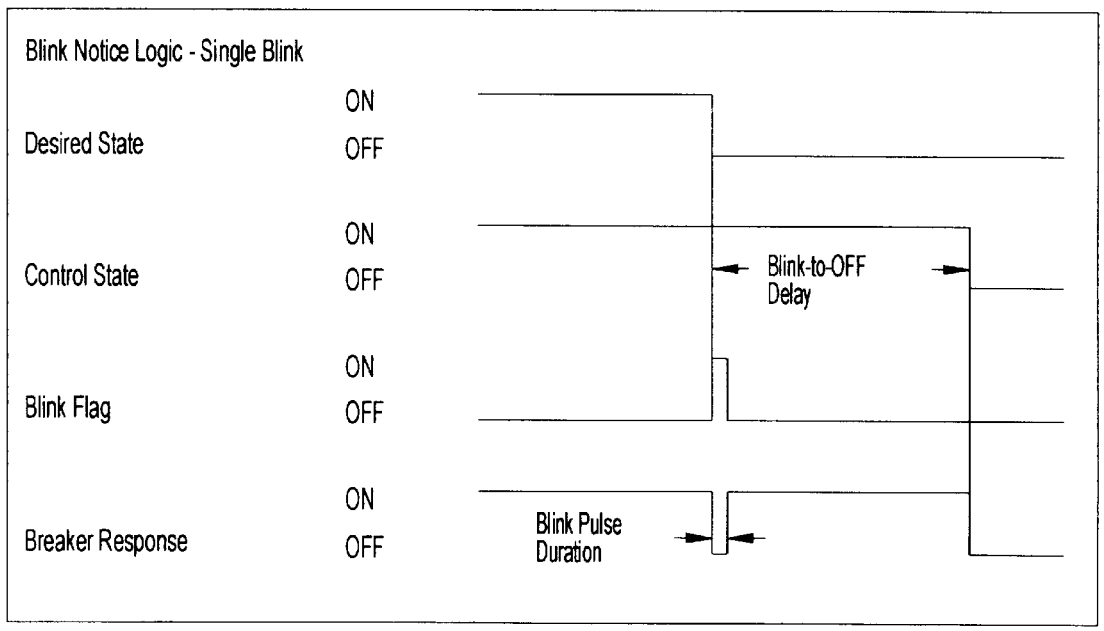
Figure 9C:
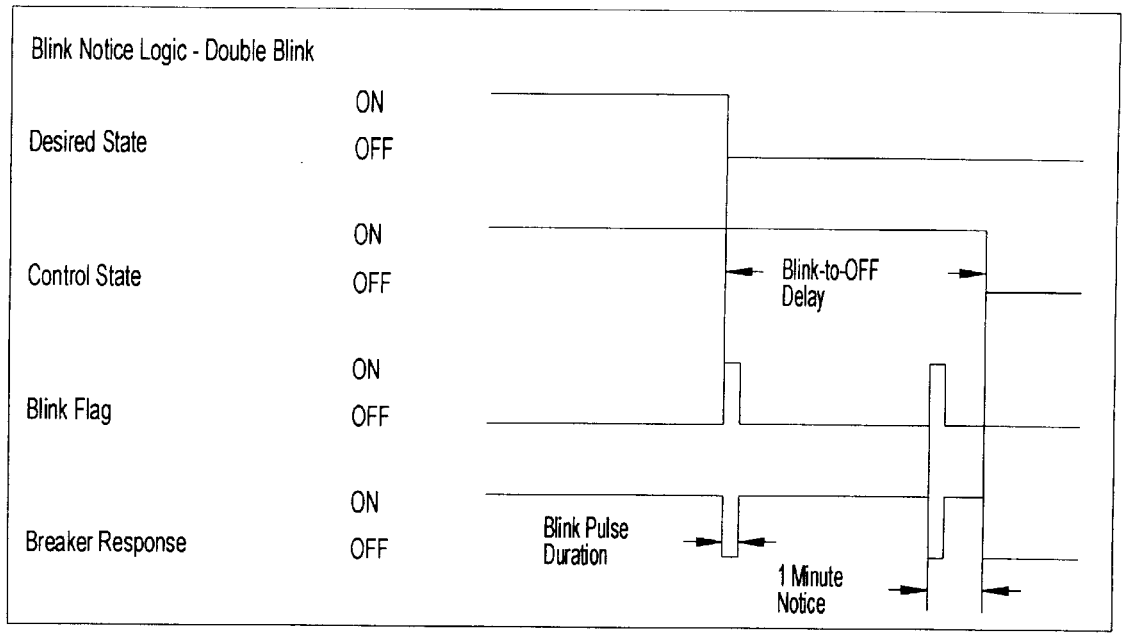
Figure 9D:
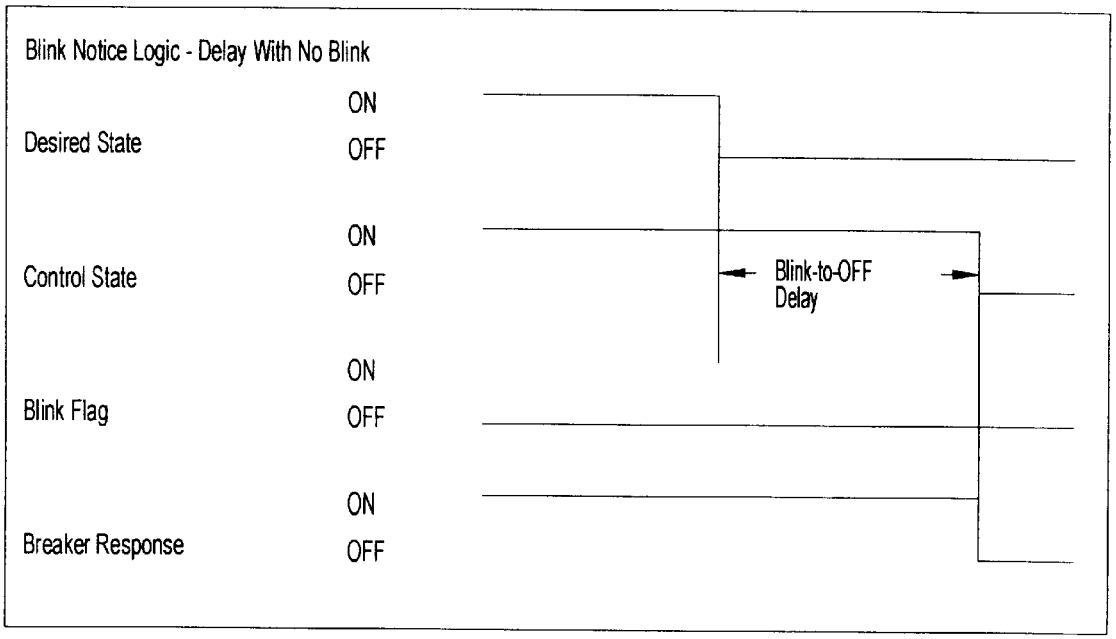

Referring to FIG. 8, when the latched input state changes to OFF and the input object is ON, the timer will restart. The input object state will remain ON until the timer expires. When the latched state changes to ON and the input object state is OFF, the timer will restart and the input object state will remain OFF until the timer expires. This results in any change of input state being ignored unless the change lasts longer than the timer duration. (This prevents excessive circuit breaker cycling due to input state changes of short duration, i.e. from a light level sensor exposed to headlights or an occasional shadow. Use with Maintained, Momentary On, or Momentary Off hardware types.)

3.3 Manual Flag (Signal to Bypass Blink Notice)

The change in state of an input object can be the result of either a manual or automatic event. For an input, a manual event results from a contact closure. An automatic event would be a state change resulting from a timer time-out.

This information is useful for the group object's management of blink notice. A manual event, such as a contact closure intended to turn the lights OFF immediately, should result in an immediate action. However, it is desirable to notify a user, via blink, that an automatic event has taken place and delay the OFF event.

Every input object has a manual flag in addition to the state flag. This flag will indicate the reason for the input state (manual=1), and will be updated whenever the group state is updated. The state does not always change when the manual flag changes, i.e. the timer has timed out (state=OFF, manual=false), and the user then pushes the OFF switch (state=OFF, manual=true.)

3.4 Input Synchronization

As discussed in the descriptions above, the latched input state may be changed by either the contact scanning/interpretation routine or a timer associated with the input. There are other processes that may also affect input operation. All of these processes employ a similar polling mechanism that monitors a state at a configurable location, and uses this information to affect the input operation.

An exception to the polling mechanism is the ability for a communications command (i.e. a register/coil write to latched input state) to write to any of these locations. While this is allowed and desirable in many instances, any update to one of these synchronized control points occurs on a last-event basis, as there is no priority or arbitration between potential sources. If a point is configured for automatic synchronization any status from communications will be overwritten. This will be discussed below.

Automatic polling is disabled by setting the configuration pointer to a value of 00000 (Invalid coil #.) The location of the manual flag associated with each source is assumed by the arrangement of the register/coil numbers.

3.4.1 Input Synchronization Control/Remote Latched Input/Event Filter

This polling process automatically monitors the control source at the pointer location and updates the latched input state and input manual flag on the change of either item at the pointer location. This process will synchronize the input state to the source at the pointer. A change in either state or manual bits at the pointer location will cause a synchronization update, and the input update flag is also set.

If the latched input state is written from an external source, i.e. via a register/coil write, this event is considered as well. The latched input state may or may not change in this instance. However, on this instance, the update flag is still set, and the manual flag will be set to automatic. The manual flag is assumed to be false in this event, since this change is most likely to originate from an automated source, such as a building automation system.

In some applications it is desirable to respond to certain changes, such as OFF or ON events. To accommodate this, each input also has an event filter. The user may choose from update on: ANY, ON, or OFF, plus Direct or Invert. For example, if the event filter is set to OFF, the input state and manual flags will be updated only when the source changes from ON to OFF or if the source is OFF and the manual status at the source changed. The event filter applies to changes written to the latched input state from the input synchronization control or communications only. Changes from a contact closure are unaffected by the source filter. A second part of this filtering process is the ability to invert the signal before it is applied. Typically, the bit state is directly written, but if Invert is selected, the state of the bit is flipped before it is applied. For example, if ON/Invert is selected, the latched input state will be commanded OFF whenever the remote source turns ON.

While most control scenarios do not need to use these features, below are some application techniques that are possible:

Three-wire Momentary Switch from 2 Inputs

Input 1 is set to Momentary On operation. Input 2 is set to Momentary Off operation. The Input 1 sync pointer is set to Input 2, and vice-versa When Input 1 turns ON, Input 2 detects the change of state, and sets the Input 2 latched state equal to Input 1, ON. Subsequent pushes of the input 1 button continue to command Input 1 ON, but Input 2 will not detect a change in state. When the Input 2 button is pushed, Input 2 turns OFF. This is detected by Input 1, which updates its latched state to OFF.

Linked Momentary Toggle Pushbuttons

Another example where this feature is useful is in linking two different push-button switches. Inputs 1 and 2 would be set to Momentary Toggle operation. The Input 1 synchronization pointer would be set to Input 2, and vice-versa. When Input 1 toggles ON, the change of state would set the Input 2 latched state equal to Input 1. A subsequent push of either button will result in both outputs turning OFF.

Interlocked Cleaning Switches

This application is used for cleaning crews. The crew turns on Input 1, which turns on the associated circuit breakers. The Input 1 synchronization pointer is configured to Input 2, and the source filter is set to ANY/Invert. As the crew finishes cleaning the first section, they turn on Input 2. The associated circuit breakers for that section turn on, and Input 1 is commanded OFF.

BAS Control

A building automation system commands the remote input register The event filter is set to OFF. When the BAS writes an OFF to the remote input register, it will result in the output state=OFF and the manual flag=false (automatic). The group control will provide a blink notice and delay in response to this OFF event.

3.4.2 Input Inhibit Control and Timer Inhibit Control

Similar to the Input Synchronization Control capability described above, each input also has an Input Inhibit bit. When the Input Inhibit bit is set, contact activity is ignored and will not change the latched input state. This bit is available as a read/write coil in the register list so that it may be commanded from an external source, such as a building automation system.

Like the Input Synchronization Control, it may subscribe to a control source via a pointer. Since this is an OFF/Release type of feature, the input is inhibited whenever the control source state at the pointer is true. The change in control source state does not need to be monitored. The manual flag of the control source is not used.

Nearly identical in operation, the Timer Inhibit control is used to inhibit the input timer operation. When the Timer Inhibit bit is set, from communications or automatic polling, the input object state is always equal to the latched input state and any remaining timer value is zeroed as if no timer was selected.

Example of control scenarios that use these features are:

Conditional Input Switch

Input 1 is configured with a Timed On timer and a 2-hour delay. The Timer Inhibit pointer is set to follow Schedule 1, which is ON during the normal business day. The switch will operate as a normal wall switch during the day, but will convert to a Timed ON switch after hours.

Disabled Wall Switches

The cleaning crew switches are located in a public area. The Input Inhibit for these switches are set to follow schedule 1, which disables them during business hours.

3.5 Input Numbering Scheme

Inputs 1–8 (see also FIG. 28—reference numeral 326) are dual inputs located in the wiring compartment of the control module 18. These inputs may be used as either 2 or 3 wire inputs, depending on the input switch type configuration. A three-wire input (dual momentary) uses both sides of the dual input, while a two-wire input does not require the second half. The second half input uses a combined input/output terminal that is shared with the feedback output feature. If a two-wire input type is chosen for inputs 1–8, the feedback status will automatically appear at the third terminal.

Input numbers 57–64 are used to independently access the second half of inputs 1–8 and configure them for two-wire switch operation. If the input 57–64 type is set for dual momentary, the type is considered to be not configured. If any input 57–64 is configured, the status feedback will not appear on the third terminal. Inputs 9–56 are reserved in the numbering scheme for expander inputs, when necessary, desired or available.

3.6 Status Feedback Output

As mentioned in the input numbering discussion, each input 1–8 has a status feedback output terminal that is shared with the second half of the input circuit. If this terminal is not consumed as an input, then an output status will appear. The output status will typically represent the group state corresponding to that input. However, the status represented may be redirected to another source via the pointer scheme. A status feedback process monitors the state of the information referenced by each pointer, and updates the status feedback according to the state of the referenced source. The pointer may be loaded with a reference to any valid 0xxxx or 1xxxx bit. (A 00000 value disables this feature.) If configured, the process polls the logic state of the bit at the pointer location and the status feedback will be set equal to this state.

3.7 Input Object Pointer Defaults

The same type of pointer scheme is used in the Input Object for Timer Inhibit, Input Inhibit, Input Synchronization control, and the Status Feedback output. A single process could be created to manage this scheme, if desired. While these pointers allow custom configuration of the system, most applications can be defaulted to standard pointer locations. A pointer of 0 indicates not used. In one embodiment, this capability is hidden to keep the device simple for the user. If memory resources are not sufficient, it is acceptable to eliminate the pointer scheme entirely and hard-code the operation.

| | | Input Object Pointer Defaults | | | |
|---|---|---|---|---|---|
| Input Number | Input Sync Control Pointer | Input Event Filter | Input Inhibit Pointer | Timer Inhibit Pointer | Status Feedback Pointer |
| 1–8 | 00000 | Any/Direct | 00000 | 00000 | Group State 1–8 |
| 9–56 | 00000 | Any/Direct | 00000 | 00000 | Group State 9–56 |
| 57–64 | 00000 | Any/Direct | 00000 | 00000 | (Not Applicable) |

3.8 Response Time Requirements

The time from a wall switch contact closure to the response of the light connected to the circuit breaker is critical in user perception of system operation. The following times are worst-case benchmarks:

Local Input Switch close to first circuit breaker operation–250 ms

Local Expander Input close to first circuit breaker operation–500 ms

Remote Switch Change (via Ethernet) to first circuit breaker operation–500 ms+Local Delay (assumes no network traffic)

4. Group Object Operation 4.1 Group Object Overview

The group object 30 (see FIG. 4) consists of two parts the group logic process determines the state of the group, based on controlling source states, communication time-out, and group override. Controlling sources are defined using the same type of pointer scheme as used by the input object. The group mapping process determines the desired state of each circuit breaker, based on the calculated group state and the circuit breaker mapping configuration for that group.

In one embodiment, the control module 18 allows only one controlling source for a group. The source pointer is either defaulted or fixed so that the group number automatically references the same input number. (i.e. Group 1 follows Input Object 1, etc.) In another embodiment, the control module 18 considers a time schedule source in addition to the input object source. The source pointer for both sources is either defaulted or fixed so that the group number automatically references the same input and schedule number. (i.e. Group 1 follows Input Object 1 and Schedule 1, etc.) In yet another embodiment, the control module 18 may use up to five sources for the logic in each group. Each source pointer for all sources is defaulted for typical situations, but may be changed by the user for special applications. Groups may even be cascaded by setting a source pointer to the group state of another group. Sources may even be located in other panels, via the external reference register. The location of the source state and manual flag is identified by a pointer to the source state. The location of the associated manual flag is known via register number arrangement.

4.2 Group Logic Process

Each group object has a set of logical inputs that are evaluated to determine the output state of the group. To create a desired control scenario, the operation can be described by boolean expressions that define the conditions when the group output state is to be ON.

A group can have up to five controlling sources. These sources are referenced by pointer and are obtained when the group logic is calculated. Any source pointer with a value of 0 is invalid and therefore ignored. In addition to the source pointer, the group logic can be configured to the modes listed below.

OR—The states of all valid sources are OR-ed together to compute the group state. If any input source is ON then the group is ON.

AND—The states of all valid sources are AND-ed together to compute the group state. The group is ON only if all input sources are ON.

XOR—The states of all valid sources are XOR-ed together to compute the group state. The group is ON only if one source is ON. If either no valid source or more than one valid source is ON then the group state will be OFF.

Last Event—The group state will be controlled by a change in source state. A change in any valid source from OFF to ON will cause the group state to be ON. A change in any valid source from ON to OFF will cause the group state to be OFF.

Custom—The group state will be evaluated according to the programmed boolean expression. (Additional explanation below.)

The group logic process will not update any group state when the control module 18 is in the learn mode. This allows the user to manually toggle a group state from the front panel without a coincidentally changing source confusing the process. The calculated group state will be applied again after exiting the learn mode.

4.2.1 Custom Logic

Each group object has a set of logical inputs that are evaluated to determine the output state of the group. To address special situations, exotic control scenarios can be created through one or more boolean expressions that describes the conditions when the output is to be ON.

Illustrating this concept, below are all the possible combinations for five inputs. ($2^5$ or 32 possible combinations.) When the states of the inputs match the "True" conditions, the output is ON. The table below shows the configuration for desired operation in which the output should be ON if A or B or C or D or E is ON.

| A + B + C + D + E = Group State | | | |
|---|---|---|---|
| 00000 = 0 | 01000 = 1 | 10000 = 1 | 11000 = 1 |
| 00001 = 1 | 01001 = 1 | 10001 = 1 | 11001 = 1 |
| 00010 = 1 | 01010 = 1 | 10010 = 1 | 11010 = 1 |
| 00011 = 1 | 01011 = 1 | 10011 = 1 | 11011 = 1 |
| 00100 = 1 | 01100 = 1 | 10100 = 1 | 11100 = 1 |
| 00101 = 1 | 01101 = 1 | 10101 = 1 | 11101 = 1 |
| 00110 = 1 | 01110 = 1 | 10110 = 1 | 11110 = 1 |
| 00111 = 1 | 01111 = 1 | 10111 = 1 | 11111 = 1 |

Using this common framework one can implement a technique that allows the simplest to most complex boolean expressions. Suppose we have an application in which the lights to be ON when the schedule is ON, unless the Load Shed signal is ON. However, if the photocell says it is too dark, ignore the Load Shed signal and turn the lights ON. But do not turn the lights ON in the middle of the night when the schedule is OFF. Of course, turn the lights on anytime the timed Manual Switch is ON.

To illustrate this, the output should be ON when any of the following conditions are true: (X=Don't care.)

| Schedule (A) | Load Shed (B) | Photocell (C) | Manual Switch (D) | (E) | Lights = |
|---|---|---|---|---|---|
| X | X | X | ON | X | ON |
| ON | OFF | OFF | OFF | X | ON |
| ON | ON | ON | OFF | X | ON |

The pointers are configured so that Schedule=Input A, Load Shed=Input B, Photocell=Input C, Manual Switch= Input D, and Input E is not used. The logic configuration loaded for this group would be:

| | | | |
|---|---|---|---|
| 00000 = 0 | 01000 = 0 | 10000 = 1 | 11000 = 0 |
| 00001 = 0 | 01001 = 0 | 10001 = 1 | 11001 = 0 |
| 00010 = 1 | 01010 = 1 | 10010 = 1 | 11010 = 1 |
| 00011 = 1 | 01011 = 1 | 10011 = 1 | 11011 = 1 |
| 00100 = 0 | 01100 = 0 | 10100 = 0 | 11100 = 1 |
| 00101 = 0 | 01101 = 0 | 10101 = 0 | 11101 = 1 |
| 00110 = 1 | 01110 = 1 | 10110 = 1 | 11110 = 1 |
| 00111 = 1 | 01111 = 1 | 10111 = 1 | 11111 = 1 |

These 32 combinations can be compressed into four bytes by using the highest two bits as a byte pointer and the lower three bits as a bit pointer to find the proper state in the table.

4.2.2 Communications Time-out Feature/Group Default Action

Communications Time-Out is typically applied when there is an external building automation system used in conjunction with the energy management system of the present invention. The time-out period is globally configurable, and refers to the amount of time that has elapsed since either the last successful communication transaction on the ModBus slave port or that a message has been received by the Ethernet port. If the external automation system fails to communicate at least once during this time period, either local control is maintained, or the group can automatically assume a known state. The response of each group is individually selectable. If the communications time-out is active, the group state will automatically be changed to a user-configured default action, either Maintain Last Group State, Continue Normal Operation, Group ON, or Group OFF. When communications is restored the group resumes normal operation. If Group ON or OFF is activated, this is considered an automatic change and the group manual flag will be updated accordingly. Otherwise, it will not be affected.

4.2.3 Group Override

Overrides may be used to force a state. Overrides may be controlled from the front panel or remotely from system software such as CMS, or an external building automation system executing its own control strategy. Group override has priority over the communications time-out feature.

Overrides can be disabled (released) or enabled ON or OFF. For example, if the Group Override were enabled and the override state set to ON, the Group State would be ON, regardless of the calculated state. It would remain in that state until either the override state was changed to OFF or the override was disabled (released). Individual overrides are available for all groups.

| Calculated Group State | Group Override State | Learn Mode State | Resulting Group State |
|---|---|---|---|
| OFF | Disable | Run | OFF |
| ON | Disable | Run | ON |
| X | Enable + ON | Run | ON |
| X | Enable + OFF | Run | OFF |
| X | X | Learn | (Toggled by TEST key on front panel) |

Group Override Timer

Each group override has an independent timer. This timer has a setpoint designating a number of minutes. When the override is activated (enabled) this timer will begin to count down, from the setpoint value to zero. When the timer reaches zero, the override will be automatically released (disabled). A timer setpoint of 0 indicates that the timer is disabled, and the override will remain on until manually released.

Override Effect on Group Manual Flag

When the group override is enabled, this is considered a manual change, and the group manual flag is set. If the group override is already enabled and the group override state is changed, this is considered a manual change, and the group manual flag is set. When the group override times out, this is considered an automatic change, and the group manual flag is cleared. Otherwise, the manual flag is not adjusted.

4.2.4 Group Pointer Defaults

The same type of pointer scheme is used with group objects and input objects. A single process could be created to manage this scheme, if desired. While these pointers allow custom configuration of the system, most applications can be defaulted to standard pointer locations. This capability may optionally be hidden or kept available to keep the device simple for the user If memory resources are not sufficient, it is also possible to eliminate the pointer scheme entirely and hard-code the operation. A pointer of 0 indicates not used.

| Group No. | Source A | Source B | Source C | Source D | Source E |
|---|---|---|---|---|---|
| 1–8 | Input 1–8 | Schedule 1–8 | 00000 | 00000 | 00000 |
| 9–16 | Input 9–16 | Schedule 9–16 | 00000 | 00000 | 00000 |
| 17–24 | Input 17–24 | Schedule 1–8 | 00000 | 00000 | 00000 |
| 25–32 | Input 25–32 | Schedule 9–16 | 00000 | 00000 | 00000 |
| 33–40 | Input 33–40 | Schedule 1–8 | 00000 | 00000 | 00000 |
| 41–48 | Input 41–48 | Schedule 9–16 | 00000 | 00000 | 00000 |
| 49–56 | Input 49–56 | Schedule 1–8 | 00000 | 00000 | 00000 |
| 57–64 | Input 57–64 | Schedule 9–16 | 00000 | 00000 | 00000 |

4.2.5 Actual Group State

Status feedback may require knowledge of the "true" state of a group. Since circuit breakers may belong to more than one group, the actual group state may be different than the calculated group state. Actual group state is calculated by OR-ing together the actual circuit breaker states of all members assigned to a group. If any circuit breaker in a group is ON, then the group is ON.

4.2.6 Blink Notice and Delay Control

Each source has an associated manual flag. This flag is used by the group logic process to determine if the resulting group state was caused by automatic or manual activity. These individual manual flags are combined into a group manual flag. This is desirable so that the circuit breaker management routine knows whether to provide immediate response to a manual OFF action by canceling the blink notice and delay. (The group state and group manual flags are also available as a source to another group if cascading groups in special control situations.)

This is preferably done in several steps. First, it is assumed that the group state has already been calculated per logic type configuration, as discussed above. Next, the group manual flag is updated to reflect whether the group state is the result of manual or automatic operation. The final step is to determine whether the blink notice for an individual circuit breaker should be cancelled, considering other groups that may be controlling that circuit breaker. This final step is discussed in the mapping section below.

The group manual flag is mostly static. The only time it will be updated is on the change of an active source. Each active source for that group is evaluated for changes every time this task is executed. The initial default four the group manual flag is automatic (not manual).

For a group, if any source changed state and is manual, or if any source did not change state but the manual flag changed to manual, then the group manual flag is set.

If any source changed state and is auto (not manual), or if any source did not change state but the manual flag changed to auto (not manual), then the group manual flag is cleared.

If more than one source changed since the last evaluation, and the auto/manual determination is in conflict, the manual condition has priority and the group state will be manual.

4.3 Group Mapping Process

Each group is configured with a map of circuit breakers that are controlled by that group. The implied logic is that if the Group State is ON and the circuit breaker is included in the map for that group, then each included circuit breaker's desired state is ON.

By default, all circuit breakers are OFF. All circuit breaker desired states from every group are OR ed together. If any group calls for a circuit breaker to be ON, then the circuit breaker will be ON. If all desired states for a circuit breaker are OFF, then the circuit breaker is OFF. An exception for this rule occurs when the module is in the LEARN mode.

Because of this, on each calculation of the group logic, the desired state logic evaluates all groups for each circuit breaker before updating the desired state. This prevents random switching due to partial calculation.

It is also required that the final desired states calculation be masked against the list of all circuit breakers that are included in any map so that un-mapped circuit breakers do not switch. The calculated desired states are applied to the circuit breakers that are mapped and the desired states of the unmapped circuit breakers are not changed.

Recalling that the purpose for the manual flag is to provide an immediate response to an OFF desired state calculation by canceling a blink notice delay, this condition is flagged for the circuit breaker management routine. This information is passed on via the no_delay flag. All groups affecting each circuit breaker are evaluated, similar to the group source evaluation, to set or clear the no_delay flag.

For each circuit breaker, if any group affecting the circuit breaker has changed state and is manual, or if any group affecting the circuit breaker did not change state but the group manual flag changed to manual, and the circuit breaker desired state is OFF, then the circuit breaker's no_delay flag is set.

If any group affecting the circuit breaker changed state and is auto (not manual), or if any group affecting the circuit breaker did not change state but the group manual flag changed to automatic (not manual), or if the circuit breaker desired state is ON, then the circuit breaker's no_delay flag is cleared.

If more than one group changed since the last evaluation, and the no_delay determination is in conflict, the no_delay condition has priority and the no_delay flag is set.

4.3.1 Learn Mode

One of the difficulties encountered with control systems is that some level of programming is required to set up the system. This programming requires some type of human interface in which associations can be described. Quite often this interface is not built because programming is only needed at installation time. While this lowers product cost, access to this device is occasionally needed and one must be purchased for each location or by each contractor. This is not practical for areas in which a contractor may only install a few systems. Also, some electricians are not comfortable with the concept of programming, require system integrators to perform this task, again increasing cost.

The LEARN mode of the energy management system eliminates the need for conventional programming by providing a method in which input signals and output actions are learned by manual actuation of the circuit breakers. The LEARN mode is used to add or delete a circuit breaker from a group by toggling the circuit breaker handle. This mode further offers a TEST feature in which the user may test the group mapping by toggling the group state via the front panel. However, if a circuit breaker is controlled by another group and that group is ON, the typical OR convention will not allow a change in the circuit breaker state, leading the user to believe that the circuit breaker was not included in the group. Therefore, an exception is made to the normal logic when in the LEARN mode.

On entering into the LEARN mode, the group states are "frozen" and not updated by input or other sources. The TEST button will toggle the group state. When the state for a group is changed to OFF, the map of associated circuit breakers is inverted and then AND-ed to the desired circuit breaker states. This will force the circuit breakers that are mapped to that group to OFF. When the group state is toggled to ON, the map of associated circuit breakers is OR-ed to the desired circuit breaker states, as is the normal convention when in the RUN mode. After exiting the LEARN mode, the RUN mode will automatically update the group states, since by design it runs periodically and is not event driven.

Using the LEARN mode, one can collect information as to which circuit breakers are affected by which input, what type of input device is connected (momentary, maintained, or push-button switch), breaker states associated with different input events. All of the essential programming information is collected, stored, and activated. Additional benefits are that input wiring errors are reduced because it is no longer necessary to wire a switch to a specific input. Further details concerning the LEARN mode are discussed below.

5. Schedule Object

5.1 Overview

The time scheduler 28 (see FIG. 4) has 16 channels in which each channel produces a logical output based on the current time, day and date in conjunction with a schedule that is held in the control module data base. Any of these 16 schedule objects 28 may be pointed to by a group object 30. These group pointers will be pre-loaded with defaults, as discussed in the previous section.

Each schedule can be visualized as the output channel of a discrete time clock. Like a time clock that opens and closes contacts according to the date, day, time and programmed schedule, each schedule will update "virtual contacts", or an output status location in the data base. The group object will use this information when calculating the group state.

5.2 Description

Each schedule will allow up to 24 time periods, each consisting of a pair of ON and OFF times. When the actual time is within this defined time period the output status will be ON, as long as the specified day condition is true.

There are two types of days that can be specified in a schedule normal and special. Normal days correspond to a particular day of the week. Special days correspond to a programmable set of conditions that are defined in a definition table. Up to 32 special days can be defined per control module 18. Special days are not limited to a 24 hour duration, but may be alternatively be referred to as holidays.

While there are only seven normal days of the week, the special days can be visualized as 32 additional days of the week. A time period can be programmed to be active on any or all of these 7+32 days. If today matches any of the specified day conditions and the current time is within the specified time period, then the output status will be ON.

Special days are exceptions that have priority over normal days. If today is a special day, time periods defined for normal days only are ignored. However, if the days selected for a schedule time period include both normal and special days, then the period will be valid in either situation. If the time period attributes are for special days only, then the time period is valid only on that special day.

For example:

Schedule 1 SALES FLOOR

Every MoTuWeThFr, schedule=ON from 08:00 to 17:59

Every XMAS EVE, schedule=ON from 08:00 to 11.59

Every INVENTORY, schedule=ON from 8:00 to 22:59

Defined Special Days

XMAS EVE=24 December to 24 December

INVENTORY=Last Monday of every month

XMAS DAY=25 December to 25 December

The schedule above will operate as programmed on the specified days. Because XMAS DAY was not included in any schedule time period, the sales floor lights will be OFF on December 25.

5.3 Priority Examples

If more than one set of time periods within a priority are evaluated and found to be true, then the output is ON.

For example:

Every MoTuWeThFr schedule=ON from 08:00 to 17:59

Every MoFr schedule=ON from 16:00 to 19:59

The resulting operation would be:

Every TuWeTh schedule=ON from 08:00 until 18:00

Every MoFr schedule-ON from 8:00 until 20:00

Another example:

Today is Friday, December 25, 9:00 AM

Schedule

Every MoTuWeThFr schedule=ON from 08:00 to 17:59

Defined Special Days

XMAS=25 December to 25 December

This schedule output status will be OFF because the special day has priority over the normal day.

5.4 Operation

In preparation for schedule processing, a complete evaluation of all parameters that may affect a schedule is performed. This includes calculating sunrise and sunset times, DST dates, etc. This refreshes the data prior to time period evaluation and eliminates the need for more complex start-up logic that would be required if these items were computed less frequently. The defined special day conditions are also evaluated to determine if the current day corresponds to a special day.

Next, each time period in each schedule is evaluated. If today is a special day and this special day is included in a schedule time period and the current time is within the time range specified, then the period evaluation is TRUE. If today is NOT a holiday and the current day of the week is included in a schedule time period and the current time is within the time range specified, then the period evaluation is TRUE. Otherwise, the period evaluation is FALSE. (The results of each period evaluation is saved in the data base for diagnostic purposes.)

The results of all 24 period evaluations are "OR-ed" together to create the schedule output status. If any period evaluates to ON than the output status is ON.

If none of the evaluations are true, then the schedule's output status will be OFF. This entire process repeats for all 16 schedules. Note again that if TODAY matches a defined holiday and it is not included in any time period, then the output status will be OFF.

Also note that a time period defines a range of ON time, from the beginning of the start time minute to the end of the stop time minute. Schedule 1 illustrates this operation. It is assumed that the stop time is always after the start time. Schedule 2 would evaluate to a negative ON time period and would be ignored. Schedule 3 would evaluate to a 1 minute ON time period.

Schedule 1, Valid

Every MoTuWeThFr, schedule=ON from 08:00 to 8:59

Results in Every MoTuWeThFr, schedule=ON from 08:00 until 09:00

Schedule 2, Invalid

Every MoTuWeThFr, schedule=ON from 08:00 to 07:00

Results in schedule=OFF

Schedule 3, One Minute

Every MoTuWeThFr, schedule=ON from 08:00 to 08:00

Results in Every MoTuWeThFr, schedule=ON from 08:00 until 08:01

5.5 Trans-Day and Multi-Day Events

When the actual time steps to midnight, the defined period will end due to the change in day of the week. To have a time period wrap past midnight into the next day, the operation is defined as two time periods. For example:

Schedule 1. TAVERN HOURS

Every MoTuWeThFrSa schedule=ON from 16:00 to 23:59

Every TuWeThFrSaSu schedule=ON from 00:00 to 02:00

This schedule would be appropriate for a tavern that operates Monday through Saturday from 4PM to 2AM. The first schedule period keeps the lights ON after the 23:59 evaluation, but would turn them OFF at 00:00 if not for the second schedule period that calls for them to be ON again at 00:00.

Multi-day events of various duration are possible using this technique. For example:

Schedule 1, FACTORY LIGHTS

Every Mo schedule=ON from 08:00 to 23:59

Every TuWeTh schedule=ON from 00:00 to 23:59

Every Fr schedule=ON from 00:00 to 16:00

The above schedule would be appropriate for a factory that operates continuously from 8AM on Monday to 4PM on Friday.

5.6 A Note on Blink Notice

Blink notice is NOT associated directly with a schedule. This is because state-based Boolean logic combines many sources into a single command state for the group, and circuit breakers can be members of multiple groups. Therefore, no individual source can determine whether it is off will cause a circuit breaker to turn off. Therefore, blink notice is associated with the transition from ON to OFF of the circuit breaker, not the source. A blink occurs at this transition time, and initiates an individual timer for each circuit breaker. The circuit breaker will turn OFF after this timer expires, unless a control source commands it back ON. Since the time schedule is always automatic, blink notice is usually desired. Therefore, a schedule's manual flag is not set and a change in schedule does not result in the "no__ delay" flag being set. This operation is discussed in detail in other sections.

6. Time Keeper

In one embodiment, the control module has real-time clock capabilities (see description of FIG. 33b below). This includes all time-keeper functions that provide information resources to the scheduler. The hardware time clock is a 24 hour time chip with leap year compensation. Time is always stored as local time. A summary of the function's attributes appears below.

Month—The current month.

Day—The current day.

Year—The current year.

Hour—The current hour, local time.

Minute—The current minute, local time.

Second—The current second, local time.

DST Enable—Automatic daylight savings time adjustment. If enabled, apply the following rule: If first Sunday in April then add one hour at 2:00AM. If last Sunday in October then subtract one hour at 2:00AM.

12/24 Hour Display—Display time values in 12 hour AM/PM or in 24 hour format. Affects display only. All time functions operate internally using a 24 hour format.

Time Zone Offset Reference—Number of hours difference between local time and GMT. Note that some areas observe fractional time zones.

Calculated Day of Week—Numerical day of the week calculated from day and date.

Calculated Week of the Month—Numerical week of the month calculated from day and date.

Calculated DST Begin Month—Daylight savings time starting month.

Calculated DST Begin Day—Daylight savings time starting day.

Calculated DST End Month—Daylight savings time ending month.

Calculated DST End Day—Daylight savings time ending day.

Latitude—Local latitude for use by celestial clock.

Longitude—Local longitude for use by celestial clock.

Calculated Sunrise—Calculated sunrise time for this location.

Calculated Sunset—Calculated sunset time for this location.

The time period based scheduler design inherently prevents missed or repeated events. This is an advantage for situations in which DST is enabled and events are scheduled between 1 and 3 AM.

The range of allowable latitudes is limited so that sunrise and sunset occur on the same day. Simplifying assumptions or an estimation technique may be made in the celestial clock calculation of sunrise and sunset. It is desired that the calculation accuracy be within 5 minutes of true astronomical time in latitudes corresponding to the lower 48 United States and within 10 minutes in all other locations.

7. Master Clock Operation

In one embodiment, one control module 18 has the ability to synchronize real-time clocks within an energy management system containing multiple control modules 18. The synchronization operation may be performed using one of the techniques described below.

In one technique, one control module is chosen as the master clock. All other control modules are configured with the IP address and port number of the master control module. The update interval, in minutes, is also specified (Maximum rate is once per minute.) Shortly after power-up, if a master clock is specified, a slave module will perform a register read of the time value in the master module and will update its internal clock with that value. Thereafter, this operation will be repeated at the update interval frequency. If no response is received from the master, no update is performed, and the slave will continue to use its own clock value.

In another technique, the master control module is capable of sending and receiving time messages using simple network time protocol (SNTP). All other control modules, on receipt of a SNTP message, will use this time to update their internal clock. This information may come from any SNTP source. The master control module has configuration attributes to designate it as a master, and to specify the update interval. (Maximum rate is once per minute.) Shortly after power-up, if the clock is a master, it broadcasts its time using SNTP. Thereafter, this operation is repeated at the update interval frequency.

8. Global Control

In many applications it is desirable that one control module 18 use status from a source residing in another control module. This requires a network connection and an automatic method for transferring information between control modules. This function is limited to control modules using ModBus TCP and 10 Base-T Ethernet. Ethernet, being a standardized peer-to-peer network, solves the problem of communications bus arbitration.

To provide for more predictable operation and limit potential network saturation, the system uses a polling model rather than report by exception Each module will be allowed to "subscribe" to 32 unique external sources. These sources will be polled by the module periodically, as specified by a polling interval configuration attribute. The polling period may be reduced to compensate for network congestion or increased to improve response time.

Each of the 32 external reference sources is identified in the configuration data base by IP address, Port Number, Coil/Register number. The associated manual flag location is implied by register numbering. Standard ModBus messages, encapsulated into an Ethernet frame per the ModBus TCP guidelines, is periodically sent to the locations described. The status returned is saved as the external reference state and manual flag. This status may then be pointed to as an input or group object control source.

Time-out and number of retries attributes are also specified. If no data is eventually returned in response to a poll, each of the 32 external reference states has a default value that may be used in place of the real data. The user may choose between the following default actions.

External Reference State=Manual OFF on update failure

External Reference State=Automatic OFF on update failure

External Reference State=Automatic ON on update failure

External Reference State=No Change on update failure

9. Output Object Operation

The output object 32 (see FIG. 4) consists of two main parts: (1) the blink notice process determines the control state of the circuit breaker based on the desired state and the blink notice configuration, and (2) the circuit breaker control process manages the operation of the smart busses via ModBus master communications port 1.

9.1 Blink Notice Process

Blink notice is associated with a circuit, not with any control source. This is because one source can turn OFF, but another source may still be keeping the circuit ON. The only time that a blink would be appropriate would be when all sources in their logical OR-ed combination results in the desired state of the circuit breaker changing from ON to OFF.

If blink notice setting for a circuit breaker is "no blink", then the circuit breaker turns OFF or ON according to the desired state. However, if the desired state for a circuit breaker changes to OFF and if a blink notice for that circuit breaker is enabled, then the control state for the circuit breaker remains ON, but the circuit breaker is momentarily blinked OFF*. (*NOTE: Because the blink operation requires a special OFF/ON command sequence with a predictable time delay in between, a Blink flag will be set for that circuit breaker. This flag will indicate to the circuit breaker control process that the circuit breaker needs to be blinked.) An individual Off-delay timer is started for that circuit breaker at the time of the blink. When this timer expires the circuit breaker changes to OFF. If, at any time, the desired state for that circuit breaker returns to ON, the Off-delay timer is stopped and reset.

If the no_delay flag is true when the desired state changes from ON to OFF, the circuit breaker is turned OFF immediately without a blink, regardless of the blink notice configuration. Also, if the no_delay flag becomes true during an OFF-delay, the circuit breaker is turned OFF immediately and the blink delay timer cleared. If the no_delay flag returns to false and the circuit breaker desired state is OFF the timer does not re-start. Also, a circuit breaker that is OFF should not blink.

The blink notice process is temporarily disabled for all circuit breakers when the control module is in the learn mode. This allows the user to manually test the circuit breaker mapping without circuit breaker reaction being delayed or affected by the blink notice function.

Blink settings range from no blink, single blink, double blink, and delay with no blink. These are illustrated in the diagrams in FIGS. 9a through 9d.

9.2 Circuit breaker Control Process

The circuit breaker control process manages the switching of circuit breakers on the smart bus network. Its primary purpose is to apply ON or OFF commands to a particular bus/circuit breaker according to the control state computed in the previous process steps. Another lower priority task collects status and other information from the busses.

9.2.1 ModBus Message Sequencing

The lower priority task normally polls the smart bus network for all available statuses. This task has a round-robin sequence of these issued messages. This is not a part of the circuit breaker control process, but is described here.

Low Priority Commands—Loop through a sequence such as below if no circuit breaker commands are pending.

1. Poll all busses, 0–F, for model # and F/W version. Store information in the data base and set the bus present bits. Zero all statuses of all unavailable busses.
2. Get Circuit breaker Present/# of Poles data from all available busses. Store information. Zero statuses of all empty circuit breaker slots.
3. Get Actual Circuit breaker Status, from all available circuit breakers. Store information.
4. Get Bus Comms Loss Action from all available busses. Compare to configuration. Write update to bus if different.

It is assumed that there will be a single message ModBus driver that can be used by both routines. Like ModBus itself, the routine is not pre-emptive, but runs to completion. A ModBus_Busy flag or similar method indicates availability. If a message times out, or if an exception code response is received, the message is repeated up to two additional times. If no response is received the time-out value is small to prevent noticeable delays.

Circuit breaker control messages have priority over this normal message flow. The circuit breaker control task is called by the operating system every 100 ms. This automatically creates a simple "time base" for circuit breaker switching with a maximum rate of 10 pulses per second. If the stagger time is increased beyond the minimum via configuration setting, the allowed switching time slots are skipped, but the time base is maintained for use by the retry sampling, as described below.

Messages from the circuit breaker control task wait on the ModBus Busy flag and take the next place in the message sequence The lower priority messages may resume after the circuit breaker control task completes.

Messages, other than a periodic test for bus availability, are not issued to non-existent busses. Circuit breaker commands are not issued to locations where no circuit breaker is present, or when in the halt mode.

9.2.2 Retry Configuration

How and when the commands are issued to a circuit breaker depends on the retry configuration. There are 3 modes of operation:

9.2.2.1 Automatic Retry

This command system is a closed-loop type of control in that a difference between control and actual states must exist for a pulse to be issued. Closed-loop control minimizes wear on the circuit breaker by only pulsing the mechanism when necessary. For instance, if the Control State of a circuit breaker is ON and the actual state indicates that the circuit breaker is already ON, there is no command issued. The actual state and control state of circuit breakers configured for Automatic Retry are continuously compared. The circuit breaker is pulsed whenever these states do not match, unless the circuit breaker is not present or non-responding.

If there is a difference between the two states, a command is issued to send the circuit breaker forward to the Control State. (Unless the circuit breaker is already "non-responding." See below.) Immediately thereafter, a sample is taken of the actual state for that circuit breaker. If the control and actual states match, the operation is complete.

If the error still exists, a number of additional samples are taken at a rate of 1 sample per 0.1 seconds, the same rate as the switching time-base. If the error continues through all samples, a command for a reverse direction pulse is issued immediately followed by a command for a forward direction pulse.

At this point, the verification process repeats. If the control and actual states do not match for the number of additional samples, then the circuit breaker is considered to be non-responding, and a non-responding circuit breaker error bit is set.

The number of additional samples is a global configuration attribute. Experience indicates that electrical phenomena settles in less than 1 second. Therefore, the minimum number of retries is chosen to be 10, so that 1 second will be allowed before issuing the reverse pulse The configuration setting is scaled in "additional seconds", so that each count adds 10 samples to the number of retries.

The non-responding bit is used to lock out the circuit breaker. Otherwise, the circuit breaker would be improperly pulsed each time the control and actual state comparison is made. However, if at any time the control and actual states match, the non-responding bit is cleared. This automatically restores the circuit breaker back to normal operation.

While the automatic retry is intended primarily to overcome any stickiness or jamming in the remote control mechanism, a tripped, off, or manual circuit breaker will also be non-responding if the mechanical condition prevents attainment of the control state. Because of the routine's logic, resetting a tripped circuit breaker clears the non-responding bit.

If the blink flag is set to indicate that a circuit breaker configured for automatic retry is to be blinked, the circuit breaker is turned OFF-ON only if the circuit breaker status indicates that it is already ON and if the Non-Responding status is clear. The blink flag is cleared whether a blink is issued or not.

9.2.2.2 No Retry

In some situations it is desirable to eliminate the automatic retry. For example, some loads (electronic ballasts or phase-to-phase connected fixtures) may maintain a charge on the wires for a time after the circuit breaker is switched OFF. This period of time may last beyond the sampling sequence in the retry logic, causing the reverse and forward pulse to be erroneously issued. The resulting effect is that the light is blinked prior to being turned OFF.

The "No Retry" mode can be selected for a circuit to compensate for this problem. It maintains the closed-loop control and verification features of the automatic retry approach but will not command any additional pulses if the circuit breaker does not respond. The non-responding flag is still updated according to pass or fail of verification.

The actual state and control state of circuit breakers configured for No Retry are continuously compared. The circuit breaker is pulsed whenever these states do not match, unless the circuit breaker is not present or non-responding.

If the blink flag is set to indicate that a circuit breaker configured for no retry is to be blinked, the circuit breaker is turned OFF-ON only if the circuit breaker status indicates that it is already ON and if the Non-Responding status is clear. The blink flag is cleared whether a blink is issued or not.

9.2.2.3 Open-Loop

In some situations it is desirable to skip the comparison between actual and control states. For example, if there are back-fed or induced voltages on the circuit, the circuit breaker will always indicate that it is ON.

If open-loop control is specified for a circuit breaker, command pulses to the circuit breaker are triggered by a change in Control State only. For instance, if the Control State changes from OFF to ON, a command to pulse the circuit breaker ON is issued, regardless of the actual state indicated by the circuit breaker, unless the circuit breaker is not present. Unlike the other two modes, the actual state and control state of circuit breakers configured as Open-Loop are not continuously compared.

Open-loop mode skips any verification process, and the non-responding bit for that circuit breaker always remains cleared.

The retry configuration is temporarily changed to Open Loop when the module is in the learn mode. This allows the user to manually test the circuit breaker mapping without circuit breakers being affected by load-side issues such as back-fed circuits or induced voltages.

If the blink flag is set to indicate that a circuit breaker configured for open loop is to be blinked, the circuit breaker is turned OFF-ON based on control state being ON, since the actual state is ignored. The blink flag is then cleared.

10. Miscellaneous 10.1 Initialization and Power Up/Down Behavior

It is preferred that the occupant is not aware of any activity relating to power up or resets of the control module 18. Therefore, no circuit breakers change state as a result of power cycling or processor reset. Also, any latched input states, accumulated timer values, or other statuses are maintained throughout the power cycle to insure that the module automatically resumes normal operation. Because the operation of the module is state-based, rather than event-based, control processing may resume normally after the reset. However, an initialization sequence is still performed. This initialization is performed in 5 seconds or less to minimize downtime.

On initialization, intermediate statuses that are calculated from input states, etc. are self-recovering. States that are obtained from external sources, such as input or circuit breaker states, are maintained through the power cycle. These states are initially assumed as valid on power-up so that logic calculations do not change on power-up. Input states are updated by normal processing. However, circuit breaker and other smart bus statuses are refreshed as soon as possible and prior to the enabling of the circuit breaker control task.

Watchdogs are used to monitor and, if necessary, correct processor behavior by causing either a hard or soft reset as appropriate.

10.2 Halt Mode

The halt mode provides the ability to temporarily suspend the switching of circuit breakers. It is used in conjunction with an external program loader. It provides a means of turning off circuit breaker switching while the loader is changing configurations. This prevents glitches that may occur from processing partial information.

11. Control Bus Addressing

As shown in FIG. 2, the energy management system embodying the present invention may utilize a plurality of remote electrical distribution panels 10a, 10b, etc that share a common control module and are connected over a device level network 24. To uniquely identify each panel 10 so that the control module can send commands to the circuit breakers mounted therein, addresses are set locally at each panel 10 using an associated address select module 34. Each address select module 34 can assign up to two bus addresses and, therefore, only one address select module 34 need be mounted in each panel 10. This reduces the cost of the busses 14 and simplifies the addressing of the busses 14. The modularity of the address select module 34 allows the module to be removed to replace a bus 14 without breaking the continuity of the power and communications signals that feed to other distribution panels 10 or busses 14, while maintaining the original address.

Figure 10:
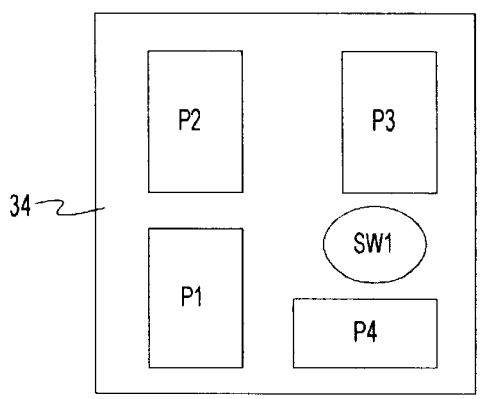
FIG. 10 is a diagrammatic plan view of an address select module in accordance with one aspect of the invention.
Figure 11:
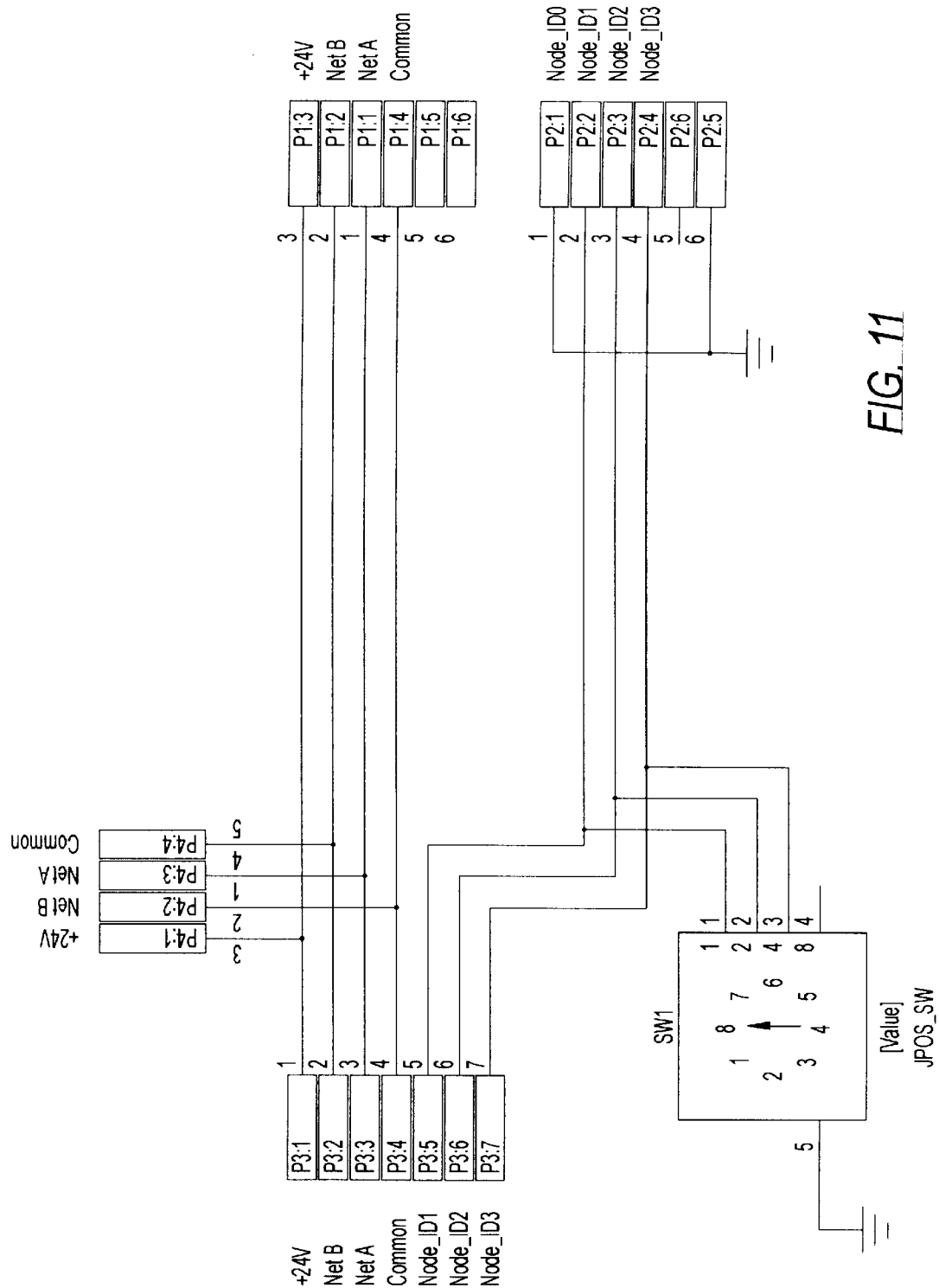
FIG. 11 is a simplified circuit diagram of the address select module of FIG. 10.

Referring to FIG. 10, the address select module 34 includes four connectors P1, P2, P3, and P4 and an octal switch SW1. Referring to FIG. 2 and FIG. 11, connector P4 provides a termination point for an interpanel wire harness 25 extending from another electrical distribution panel. The connector P4 is the entry point for power and communication signals. Connectors P1 and P2 provide connection points to the associated control bus 14a. The connector P1 provides power and communications signals to the connected bus 14a.

The address set by the octal switch SW1 is transferred to the bus 14a via the connector P2. The connector P3 provides a location for an intrapanel wire harness 36 to connect to a second control bus 14b, preferably within the same electrical distribution panel. The harness 36 transfers the three most significant bits of the address that is determined by the position of the octal switch SW1. The omission of the least significant bit allows that bit to be set by the second control bus 14b to which the harness 36 connects. This increments the address by one. For example, if the octal switch SW1 is set to 4, the bus 14a has an octal bus address of (0 1 0 0). To obtain the address of the second bus 14b, only the first three digits or bits, (0 1 0), are transferred to the second bus 14b. The last bit is automatically set to a "1" by the bus 14b. The next bus address becomes (0 1 0 1), which is 5.

To simplify servicing, no configuration, other than default operation, is loaded on each bus. If a bus appears at an address it will respond to any commands issued to it. Because busses could fail, be moved or be removed during the product service life, operation of the energy management system is designed so that it is not affected by these possibilities. Therefore, the system memory and logic are designed to deal with busses at any or all of the 16 addresses.

The 16 control bus addresses are identified by a single nibble only, 0–F. However, the range of these 16 addresses may begin at a non-zero base address value. Also, this numbering scheme is at the logical level. The actual representation to the user is via the octal switch on the address select module 34. This switch has positions for 0–7.

12. Control Bus Numbering

Control busses may be located anywhere in an electrical distribution panel without regard for typical panel numbering. They are unaware of their location, but must assume some numbering scheme that would ideally match the physical panel numbers. This requires a default numbering scheme, but one that optionally allows the user to change the reference numbering for unique situations. There are two types of control bus numbering systems. Electrical and Alias.

The electrical numbering of a connector position on a control bus is the real, naturally occurring numbering with respect to the connector position on the bus. In one embodiment, these are referenced as positions 1–24. All register list data and non-displayed information use this numbering. The bus number is referenced in the register list by address number (+base). In one embodiment, there are 16 possible bus addresses.

The alias numbering is an assigned numbering scheme that better represents each circuit breaker position in the panel. This information is used for display purposes only to provide the user with reference numbers that match the physical panel numbering convention. This numbering could be different for every installation scenario, but typically matches a convention that can be assumed from the bus address.

To better insure that the default location numbering is usually correct, typical configurations for electrical distribution panels are prescribed. Three embodiments of sizes and locations of panel components are shown on the diagrams in FIGS. 12a, 12b, and 12c. Typically, the bus length matches the panel size. In one embodiment, the control module defaults to the upper right occupying slots 2, 4, and 6, and the power module defaults to the upper left occupying slots 1, 3, and 5.

From this typical convention one can assume that in one embodiment, left side busses start at 7 and increment by 2's, and right side busses start at 8 and increment by 2's. However, the control module does not really know whether left or right busses will be connected at those addresses until installation, because the module may have been programmed away from the system, or a bus was not installed until later. Therefore, the left or right designation cannot be used reliably for numbering. However, if one prescribes an addressing convention, then the address may be used to imply the numbering.

The master electrical distribution panel containing the control module and power module forces addresses 0 and 1 onto their respective control busses. It is prescribed that the control module and the power module are always located in the same panel. A slave panel is always connected via an address select module (ASM) 34. The primary ASM address setting is forced onto the attached control bus. As shown in FIG. 2, a second control bus may be attached to the address select module 34 with its address forced to the ASM setting +1. Connecting the address select module 34 to a second bus that is located in another panel is not allowed. Therefore, one can assume that for any even address, the next address is located in the very same electrical distribution panel.

In the table below, the primary or even address bus is referred to as the "P" bus and the secondary bus is referred to as the "S" bus. It will be further assumed that primary busses are always located on the right side and will always have either a control module or address select module 34.

DEFAULT BUS NUMBERING AND PANEL NAME

| Electrical Address (Base+) | Address Select Module Address | Bus Name-Default | First Number-Default | Sequence-Default |
|---|---|---|---|---|
| 0 | 0 Primary (CM) | "Panel 0" | 8 | Incr. by 2's |
| 1 | 0 Secondary (PS) | "Panel 0" | 7 | Incr. by 2's |
| 2 | 1P | "Panel 1" | 8 | Incr. by 2's |
| 3 * | 1S | "Panel 1" | 7 | Incr. by 2's |
| 4 | 2P | "Panel 2" | 8 | Incr. by 2's |
| 5 * | 2S | "Panel 2" | 7 | Incr. by 2's |
| 6 | 3P | "Panel 3" | 8 | Incr. by 2's |
| 7 * | 3S | "Panel 3" | 7 | Incr. by 2's |
| 8 | 4P | "Panel 4" | 8 | Incr. by 2's |
| 9 * | 4S | "Panel 4" | 7 | Incr. by 2's |
| A | 5P | "Panel 5" | 8 | Incr. by 2's |
| B * | 5S | "Panel 5" | 7 | Incr. by 2's |
| C | 6P | "Panel 6" | 8 | Incr. by 2's |
| D * | 6S | "Panel 6" | 7 | Incr. by 2's |
| E | 7P | "Panel 7" | 8 | Incr. by 2's |
| F * | 7S | "Panel 7" | 7 | Incr. by 2's |

* Forced from Address Select Module address + 1

In summary, a device that displays control bus data, such as the LCD or a PC software application, will use the electrical numbering to reference all data. However, when this information is displayed, the electrical numbering will be replaced with the alias numbering, as calculated by the first number and sequence type information for each bus.

Figure 13:
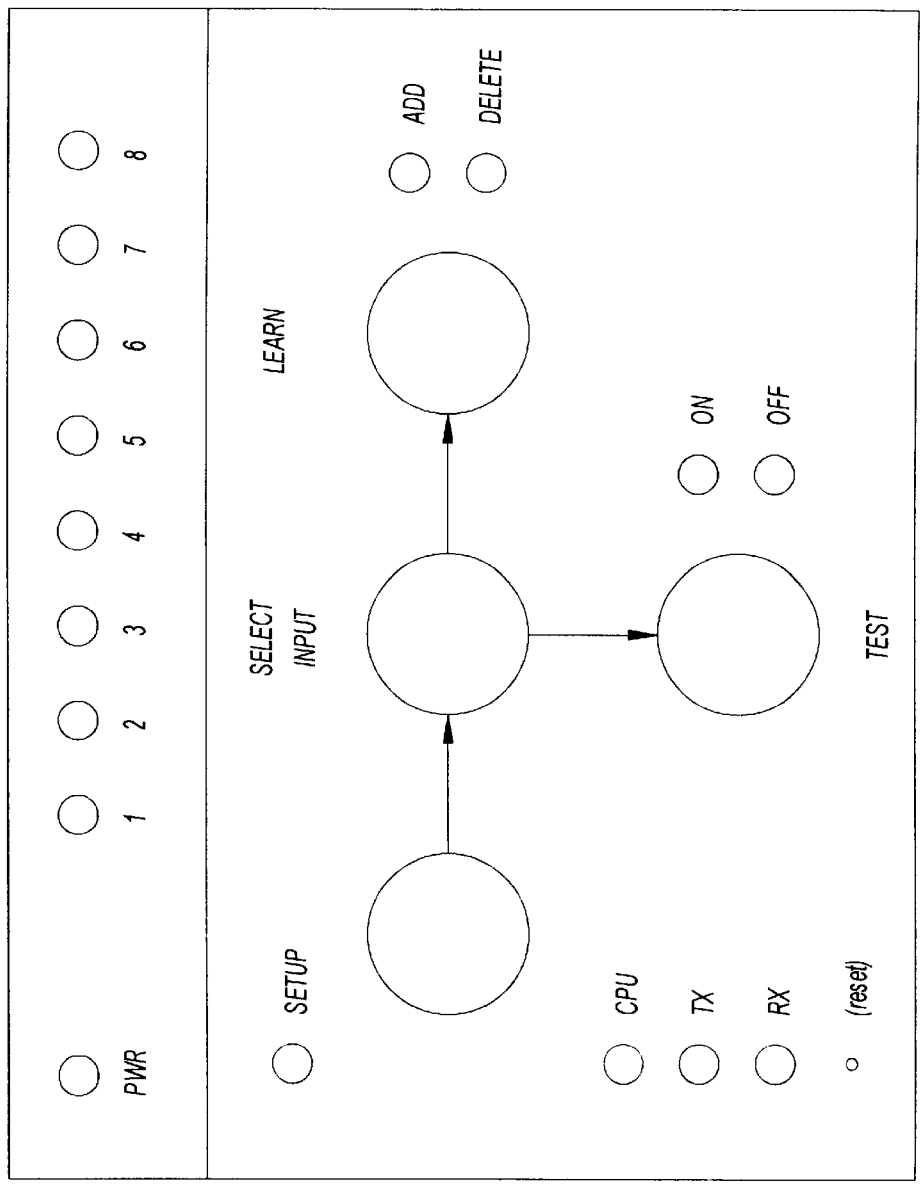
FIG. 13 is an elevation of one example of a control panel or front panel of a control module of the invention.

13. Front Panel Operation (FIG. 13)

Figure 35A:
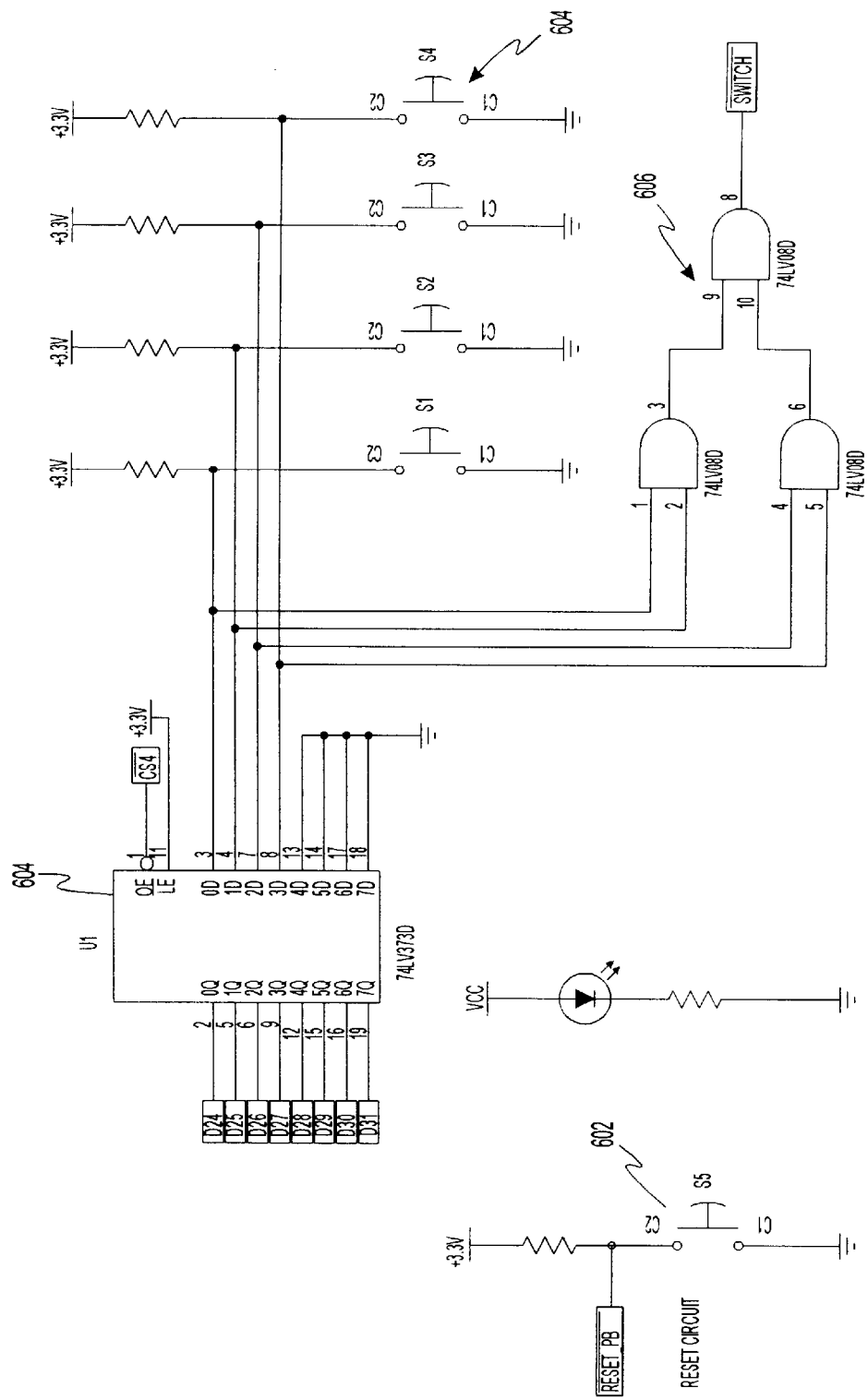
FIGS. 35*a* and 35*b* illustrate control panel circuits.
Figure 35B:
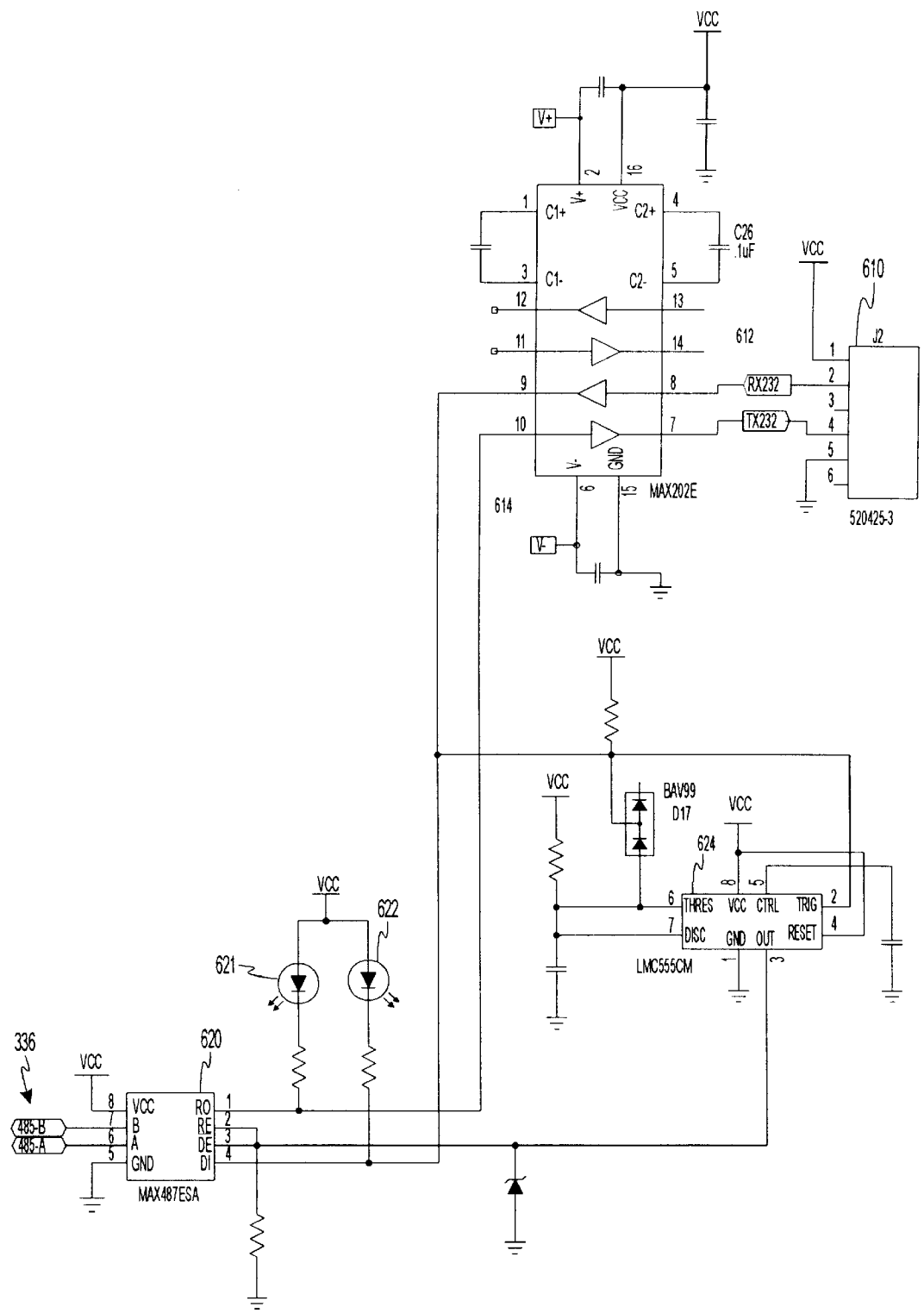
Figure 35C:
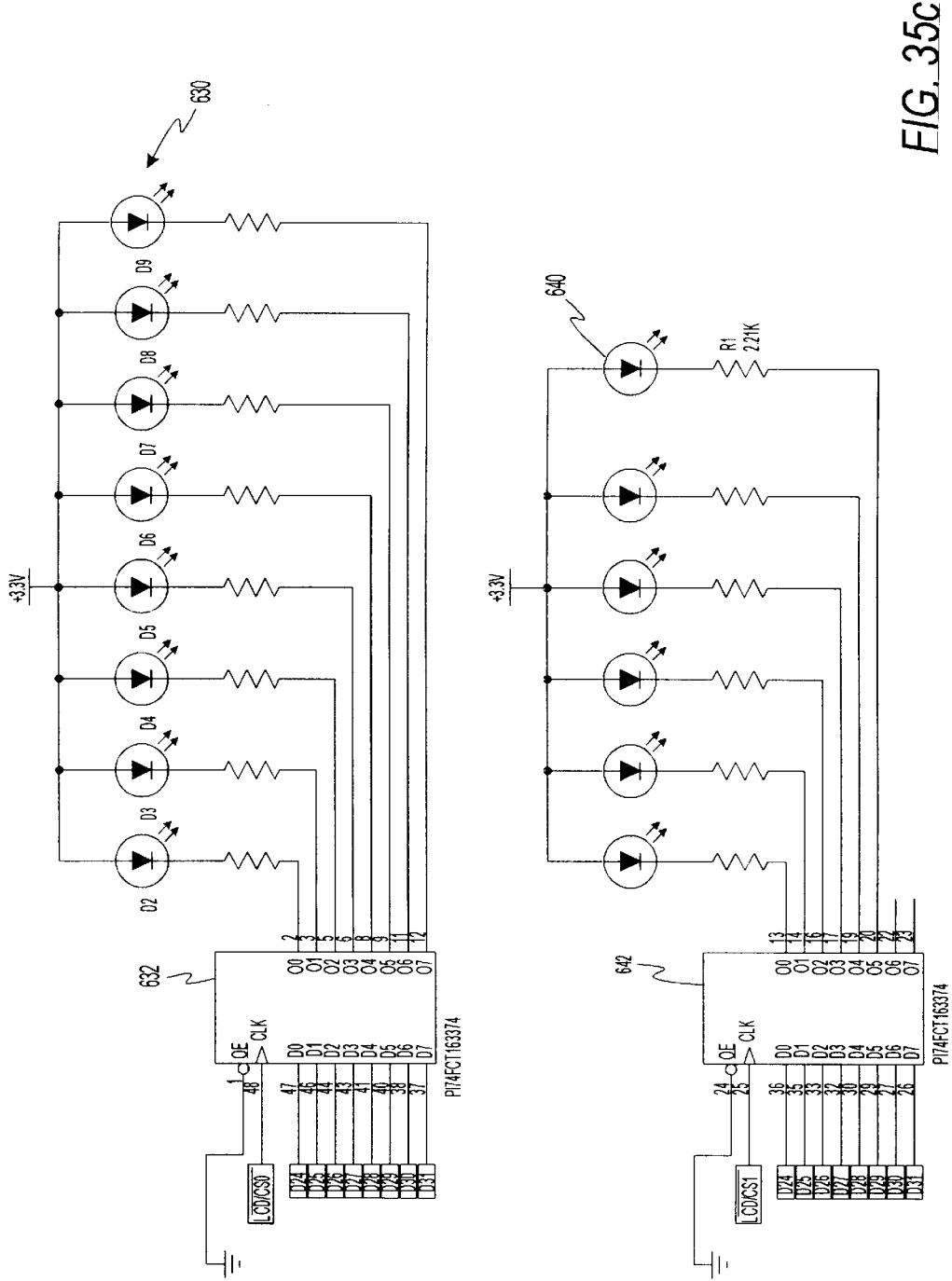
FIG. 35*c* illustrates one embodiment of a control panel display in associated circuits.
Figure 36:
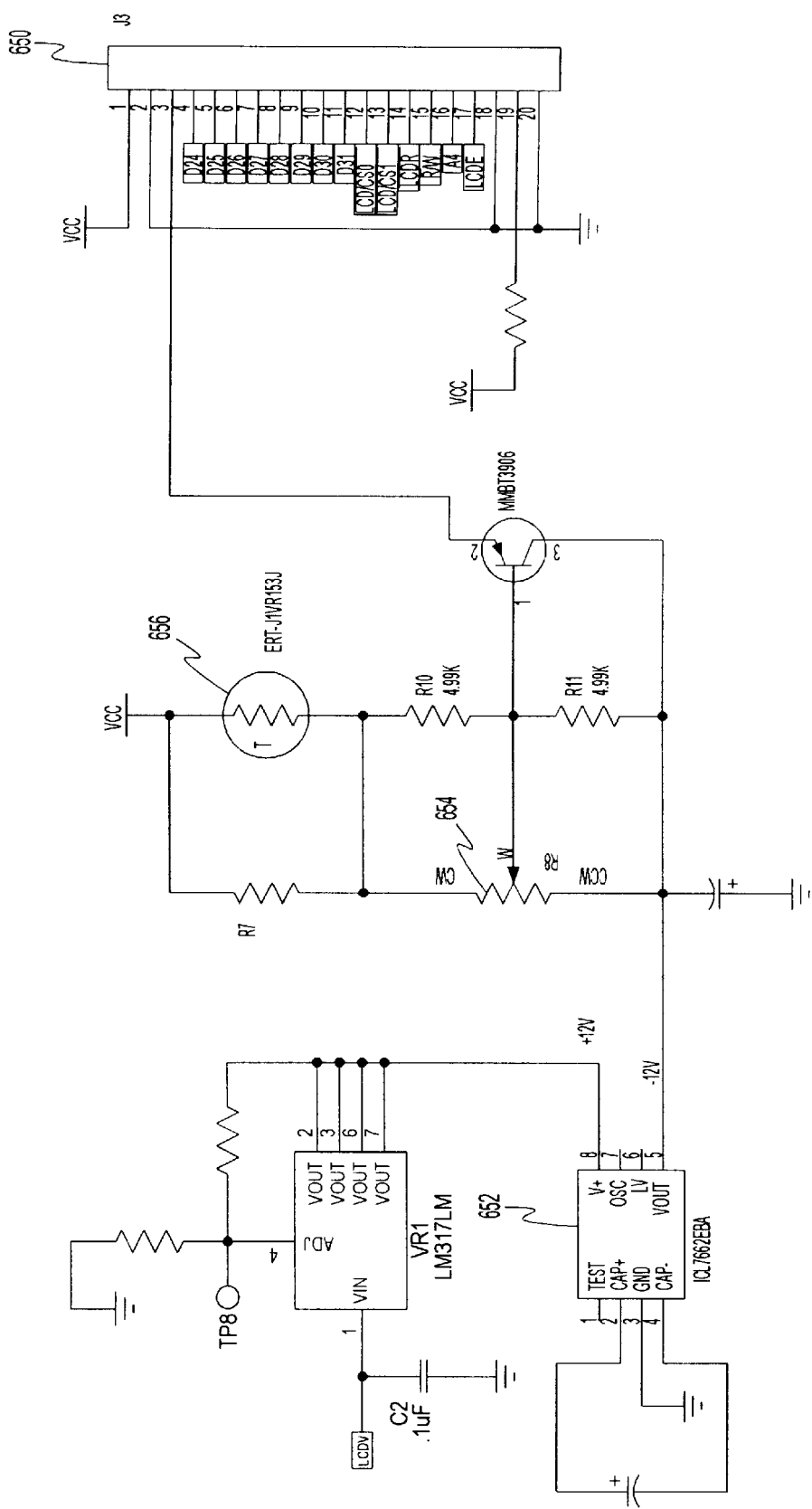
FIG. 36 illustrates an alternate embodiment of a control panel display and circuits.

Schematics of two types of front panel "LED" and "LCD" are shown and described herein with reference to FIGS. 35 and 36. The discussion which follows is one example of various modes of operation using the various display elements shown in FIGS. 35 and/or 36.

13.1 User Instructions

RUN Mode:

Input LED shows the current state of each input. Blinking indicates the input is overridden.

SETUP MODE: To LEARN or TEST:

1. Place unit in SETUP mode by pressing SETUP key until SETUP LED is ON.
2. Select desired input by pressing INPUT key (Selected input LED will illuminate.)
3. To ADD or DELETE circuit breakers for this input, place desired circuit breakers into MANUAL mode, and select ADD or DELETE:
   To ADD circuit breakers to a group, press ADD/DELETE key until ADD LED is ON. Turn desired circuit breaker handle OFF and ON again.
   To DELETE circuit breakers from this group, press ADD/DELETE key until DELETE LED is ON.
4. To TEST circuit breakers learned for this input, return desired circuit breakers to AUTO mode, and press TEST key. TEST key will toggle all circuit breakers mapped to this input between ON and OFF.
5. To CLEAR all circuit breakers learned for this input press and hold LEARN key for 3 seconds.
6. Repeat desired steps for next input or press SETUP key to return to RUN mode.

13.2 Front Panel Operation Details

SETUP Key:

Toggles between RUN and SETUP modes, unless the "Front Panel Disable" bit is set.

An automatic return to RUN mode will occur if there is no pushbutton activity for 30 minutes, or after a reset event.

Configuration software will disable the front panel when configuration is downloaded via Port 2 by setting the "Front Panel Disable" configuration bit, and returning the unit to RUN. All keys will be inoperative whenever the "Front Panel Disable" bit is set. This bit can be optionally cleared through software.

In RUN Mode:

SETUP, ADD, DELETE, ON and OFF LEDs are OFF.

All control processes put in "Run" mode. (Learn Mode Disabled)

1–8 displays the group state corresponding to input 1–8. If an override is set for a group the LED will blink:

Group Override ON=LED duty cycle will be 90% ON.

Group Override OFF=LED duty cycle will be 10% ON.

SELECT INPUT, LEARN and TEST buttons are not functional.

In SETUP Mode:

SETUP LED ON. LEARN mode set to ADD, with ADD LED ON. ON/OFF LEDs reflect group state calculated prior to SETUP mode.

All control processes put in "Learn" mode. (Learn Mode Enabled—Group Logic and Blink Notice processes disabled, and Circuit breaker Retry Mode temporarily changed to "Open-Loop.")

INPUT key scrolls between 1–8 to select input number. Unselected inputs are not lit. The user is required to deliberately push button each time to advance, with the input number changing when the key is released. The scroll pointer is to be remembered through mode changes, but not through a power cycle.

The input type is defaulted to "Maintained NO". To change input type for all inputs:
Press and hold SELECT INPUT key for 3 seconds to change all inputs to "Maintained NC" operation. The currently lit input LED will rotate from left to right one revolution to acknowledge.
Press and hold the SELECT INPUT key again for 3 seconds to change all inputs to "Maintained NO" operation. The currently lit input LED will rotate from right to left one revolution to acknowledge.

LEARN key toggles between ADD and DELETE modes. Associated LED illuminates accordingly.

Learn algorithm: Any circuit breaker that changes state while in ADD mode that is not already part of the member list for the selected input/group is added to the member list for the selected input. Any circuit breaker that changes state while in DELETE mode that is already part of the member list for the selected input/group is deleted from the member list for the selected input.

Pressing and holding LEARN key for 3 seconds will delete all circuit breakers from the member list for the selected input/group. Both ADD/DELETE LEDs will quickly flash 10 times after CLEAR has taken place and will then return to ADD mode.

The ADD LED is to blink one time whenever the member list is updated while in the ADD mode. The DELETE LED is to blink one time whenever the member list is updated while in the DELETE mode. (This provides feedback as circuit breaker handles are flipped.)

Pressing TEST will force a toggle of the Group State. The calculated Group State will be restored when returning to RUN mode.

OTHER:

PWR LED is energized from Vcc and is always on when unit is powered.

RX and TX LEDs show the PORT 2 (ModBus slave) UART activity.

The CPU LED shows a status heartbeat, similar in function to POWERLINK AS:
A quick flash of at least 4 cycles per second indicates that the program is operating and successfully communicating via the PORT 1 (ModBus master) "smart bus" network.
A slow flash of less than 2 cycles per second indicates that the program is operating, but not communicating via port 1.
A non-blinking ON LED will indicate that the operating program is corrupt (by checksum) and ready for a download.

A non-blinking OFF LED will indicate that the microprocessor circuitry is not functioning.

Pressing the RESET button will cause a hard microprocessor reset Immediately after a reset all LEDs shall momentarily turn ON for ½ second or less as a combination reset indication/LED test before resuming the states described above.

14. Logging and Alarming/Alarm Reporting 14.1 General

The logging and alarming feature is actually comprised of multiple logs.

The event log captures various control module events as they occur.

The alarm log records user-defined alarms.

The access log records the time of use and the access code used at the local user interface.

The power outage log records the time of power loss and restoration.

The run-time log records the on-time of each output.

All logs, with the exception of the run-time log, report information in a generalized format. The event and alarm logs are each contained in a separate files, in which each logged event constitutes an individual record. To save space, non-volatile memory only stores the required information for a particular type of log, but the file record is sent in the following format:

| Generic Log Report Format | |
|---|---|
| 1.1. Register | Description |
| 0 | n/a |
| 1–2 | Event identifier |
| 3 | Entry Type |
| 4 | n/a or Magnitude |
| 5–8 | Start/Stop time/date |
| 9–11 | n/a |
| 12 | n/a or Correlation Sequence # |

The event identifier is the heart of the logging sub-system. The identifier consists of two registers in which the first register contains the reference register/coil number, and the second register contains the "alarm type" in the high-byte location. Analog alarms place the "alarm level" in the low byte. The identifier is used by application software, in conjunction with knowledge of the register list description, to determine the characteristics of the alarm. Because information can vary from this general format according to the type of log, the individual log descriptions below provide complete information.

14.1.1 Event Log

The event log is a log of pre-defined events that does not require set-up and is typically useful for diagnostic purposes. These events are binary and typically related to the change of state of an object, but overrides and other events are captured as well. The Entry Type for the event log is always be reported as "one-shot" and the Correlation Sequence Number is not applicable. Therefore, these two items do not need to be saved in memory. This log is circular, i.e. new log data will begin to overwrite the old data when the log is full. The total size of this log is determined by non-volatile memory resources, but it preferably holds at least 256 events.

Event Log Report Format

| 1.2. Register | Description |
|---|---|
| 0 | n/a |
| 1–2 | Event identifier |
| 3 | Always "One-Shot" |
| 4 | n/a |
| 5–8 | Event time/date |
| 9–11 | n/a |
| 12 | n/a |

Event Identifier

| Log Type | Register 1 | Register 2 |
|---|---|---|
| Event | Register/Coil # of Event | Hi-Byte: Alarm Type Lo-Byte: n/a |

Alarm Type

| Alarm Type | Description | Operation |
|---|---|---|
| 060 | Status Change to ON | This "alram type" is logged whenever the item identified in Register 1 changes from OFF to ON. |
| 061 | Status Change to OFF | This "alarm type" is logged whenever the item identified in Register 1 changes from ON to OFF. |

A write to the data base that changes any of the following pre-defined items creates a log entry:

Schedule Object State
Input Object State
Latched Input State
Group State
Group Override Enable
Group Override Type
Non-Responding Circuit breaker State
Circuit breaker Present
Override Time-Out Enable
Communications Time-Out Active
Learn Mode
Halt Mode
Timer Inhibit
Bus Present
Front Panel Disable
External Reference Because of the large number of circuit breakers that can be controlled by a single event, a change in circuit breaker state is not logged individually, but by exception. A change in group state results in a change in circuit breaker state. If a circuit breaker does not properly respond to the change in group state, it will be reported as non-responding. (Note that the log may contain the register number corresponding to the electrical bus/circuit breaker number, but application software can convert this information into the alias numbering and display the panel name for better user reference.)

14.1.2 Alarm Log

Alarms are useful to identify abnormal activity that may require some action by the user. All alarms are defined and user-configured for an application. Because changes in alarm state correlate to a pick-up and drop-out, the Entry Type and Correlation Sequence numbers are valid for the alarm log and are saved in memory, along with the event identifier and a start or stop time. In one embodiment, up to 256 custom alarms may be defined. These alarms require set-up by loading a custom alarm set-up table:

Alarm Set-Up Table

| Register | Description |
|---|---|
| 0 | Pointer to Test Register/Coil |
| 1 (high byte) | Digital Alarms: 060 = The alarm will be active whenever the test status changes from OFF to ON 061 = The alarm will be active whenever the test status changes from ON to OFF. Analog Alarms: 010 = The alarm will be active whenever the test status is over the Pickup Level Value 020 = The alarm will be active whenever the test status is under the Pickup Level Value |
| 1 (low byte) | Alarm Level (used for analog) |
| 2 (high byte) | Enables/Disables Alarm |
| 2 (low byte) | Sets a priority of 0–5 |
| 3–10 | 16 character specified name |
| 11 | Alarm Pickup Level |
| 12 | 0 |
| 13 | Alarm Dropout Level |
| 14 | 0 |
| 15 | n/a |
| 16–17 | n/a |
| 18 | n/a |
| 19 | n/a |

Alarm Log Report Format

| 1.3. Register | Description |
|---|---|
| 0 | n/a |
| 1–2 | Event identifier |
| 3 | Entry Type |
| 4 | n/a or Magnitude |
| 5–8 | Start/Stop time/date |
| 9–11 | n/a |
| 12 | Correlation Sequence # |

| Event Idenitifier | | |
|---|---|---|
| Log Type | Register 1 | Register 2 |
| Alarm | Register/Coil # of Event | Hi-Byte: Alarm Type<br>Lo-Byte: Alarm Level |

| Alarm Type | | |
|---|---|---|
| Alarm Type | Description | Operation |
| 060 | Status Change to ON | This "alram type" is logged whenever the item identified in Register 1 changes from OFF to ON. |
| 061 | Status Change to OFF | This "alarm type" is logged whenever the item identified in Register 1 changes from ON to OFF. |
| 010 | Over Value Alarm | The alarm will be active whenever the test status identified in Register 1 is over the pickup level value |
| 020 | Under Value Alarm | The alarm will be active whenever the test status identified in Register 1 under the pickup level value |

These alarms are active and logged as whenever they are enabled in the set-up table. The priority field is used to optionally trigger an action. If the priority is=0, then the alarm is logged only. If the priority is >0, then the alarm will be automatically reported per the alarm reporting set-up function. The numeric priority levels 1–5 are arbitrary, but can be used by a software application to discriminate between different types of alarms.

Non-responding circuit breakers present a special case. It may be desired to have any non-responding circuit breaker logged, but if each individual circuit breaker required set-up to capture this activity, it would consume most of the alarm set-up table. The solution to this is to invoke special logic in which if the bit corresponding to "any non-responding circuit breaker" is chosen as the alarm test register, then the non-responding status of any circuit breaker will be logged and reported. The event identifier in the alarm log would contain the register number of the particular non-responding circuit breaker rather than the alarm test register. A similar technique may be used for any other "if any" type of digital alarms are defined.

14.1.3 Alarm Reporting

While alarms are logged for possible upload by a software application, automatic reporting may be desired to notify a user of an event. When automatic reporting is selected, via an assigned priority level >0, the control module may be designed to send a message at the time an alarm event is logged. The message may be sent via one the following means:

Direct PC Connection—The event is reported by sending the ModBus TCP log record to an IP address and port number, which corresponds to a PC running CMS application software capable of receiving an unsolicited message.

Dial-Up PC Connection—The event is reported by sending the ModBus TCP log record to a PC running the CMS application software via modem. Any additional alarms will be sent once the connection is established, up to the entire alarm log contents, before disconnecting.

Direct E-Mail Connection—The event is reported by sending a text message, derived from the log record and other panel information, via e-mail protocol. This message, built from the log record, alarm set-up table, and other controller registers will contain:
Control Module Name
Event Time
16 Character Alarm Name
Alarm Status (Pickup=ACTIVATED or Dropout= RELEASED)
(Optional Object Nametag)
(Optional Alias Information)
Priority Number
Register Number
Register Description
Register/Coil Value or Magnitude (0=OFF, 1=ON)

It should be noted that if the test register is associated with an object that has either a nametag record, alias information (i.e. a circuit breaker), or both, this information will be inserted into the message. A register description is preferably provided after the register number, because a register list may not be readily available for reference.

14.1.4 Access Log

The access log is used to note user activity at the front panel of the control module 18. This feature operates in conjunction with the front panel access code system. The front panel access code provides multi-tier access permission based on the log-in level. A path to a particular screen is not available unless the user is logged in to that level or higher. This feature is configured optionally by the user. By default, the access codes are disabled, allowing full access to all screens.

Because full or partial access may be granted without logging in, it is preferable to note that activity has occurred regardless of access level. The log-out timer is important in determining when key activity is to be noted. To summarize, only three types of events are captured in the access log:

Initial key press time—Indicates that a user has pushed a button at the front panel at a time when the log-out timer is zero. This event indicates the log-out timer has started.

Access code entry—This event indicates that the user has entered an access code. The access level that has been granted is recorded along with the time. An unsuccessful log-in attempt is also noted.

Logout timer expires—Indicates that it has been "n" minutes since the last key press, and the system has reverted back to the lowest access level.

From the above information, reviewing the log will reveal front panel access activity. The reviewer will be able to determine what time the activity started, any attempts to log in, the attempted access code with the level granted, and the time the access activity stopped via the log out time. The access log is limited in size to 16 entries.

In the log the information is posted as follows:

| Access Log Report Format | |
|---|---|
| 1.4. Register | Description |
| 0 | n/a |
| 1–2 | Event identifier |
| 3 | "One-Shot" |
| 4 | n/a |
| 5–8 | Start/Stop time/date |

-continued

Access Log Report Format

| 1.4. Register | Description |
|---|---|
| 9–11 | n/a |
| 12 | n/a |

Event Idenitifier

| Log Type | Register 1 | Register 2 |
|---|---|---|
| Access: | 0 | Hi-Byte: 060 |
| (Log-In) | | Lo-Byte: n/a |
| (Password Entry) | Password # | Hi-Byte: n/a |
| | | Lo-Byte: Level Granted 0–3 |
| (Log-out) | 0 | Hi-Byte: 061 |
| | | Lo-Byte: n/a |

14.2 Power Outage Log

The power outage log records the time of any control module power loss and power restored events. It is preferably limited in size to the last 16 power events. The format is as follows: (192 bytes)

Power Outage Log Report Format

| 1.5. Register | Description |
|---|---|
| 0 | n/a |
| 1–2 | Event identifier |
| 3 | "One-Shot" |
| 4 | n/a |
| 5–8 | Start/Stop time/date |
| 9–11 | n/a |
| 12 | n/a |

Event Idenitifier

| Log Type | Register 1 | Register 2 |
|---|---|---|
| Power: Restored | n/a | Hi-Byte: 060 Lo-Byte: n/a |
| Power: Loss | n/a | Hi-Byte: 061 Lo-Byte: n/a |

14.3 Run-Time Logs

The run-time logs are used to record the total ON time of an individual circuit breaker output. This information is useful for determining usage patterns, tenant billing, and re-lamping times. Being an accumulator, rather than an event-type of log, the format for maintaining this information is totally different than the format used in the other logs. Also, while the source for the information is the same, the accumulated time is grouped in a couple different ways:

14.3.1 Run-Time Log 1—Total On-Time

This log is used to determine the total number of on-time hours for an output. It is one register in length and scaled as unsigned hours. This allows an accumulation of 65535 hours before roll-over. For a circuit that is on 24 hours per day, roll-over would occur after about 7.5 years.

14.3.2 Run-Time Log 2—On-Time by Month

This log is used to determine the total amount of on-time per month for an output, by month of the year. Each instance is one register in length and is scaled as minutes. This number would not exceed the total number of minutes in a month, or 31×24×60=44,640 counts. This information is accumulated during the current month and is historically maintained for 12 months before being overwritten. (13 months total.) The various timers referred to herein above may be implemented in code (firmware).

The present invention also allows the control module to control a larger number of remotely controllable circuit breakers than earlier designs, by using a sub-net command path, rather than hard-wired control, as described generally above. The above-discussed address module offers a combination of address selection function and the modularity into one unit.

The control module described below can also be thought of as a panelboard-mounted programmable logic controller (PLC). While it is intended primarily as a controller for remotely-controllable circuit breakers, this device could monitor or control any device connected to its sub-net.

The system of the invention may utilize multiple control buses with one controller. The above-described addressing method allows up to two bus addresses to be assigned from one address select module. This reduces the cost of the buses and simplifies the addressing of the buses included in a system. The modularity of the address select module allows the module to be removed to replace a bus without breaking the continuity of the power and communication signals that feed to other panels or buses, while maintaining the original address.

The improved POWERLINK energy management system of the present invention, as described herein, utilizes intelligent control busses communicating to a central controller/power supply unit via a local area network. This results in a more modular system in which the shared controller/power supply unit can be coupled with one or more control bus units to provide a control system optimized for a particular application. The local area network also allows other intelligent communicating devices to be connected and operated by the controller. This flexibility creates opportunities for new applications of the system.

Figure 14:
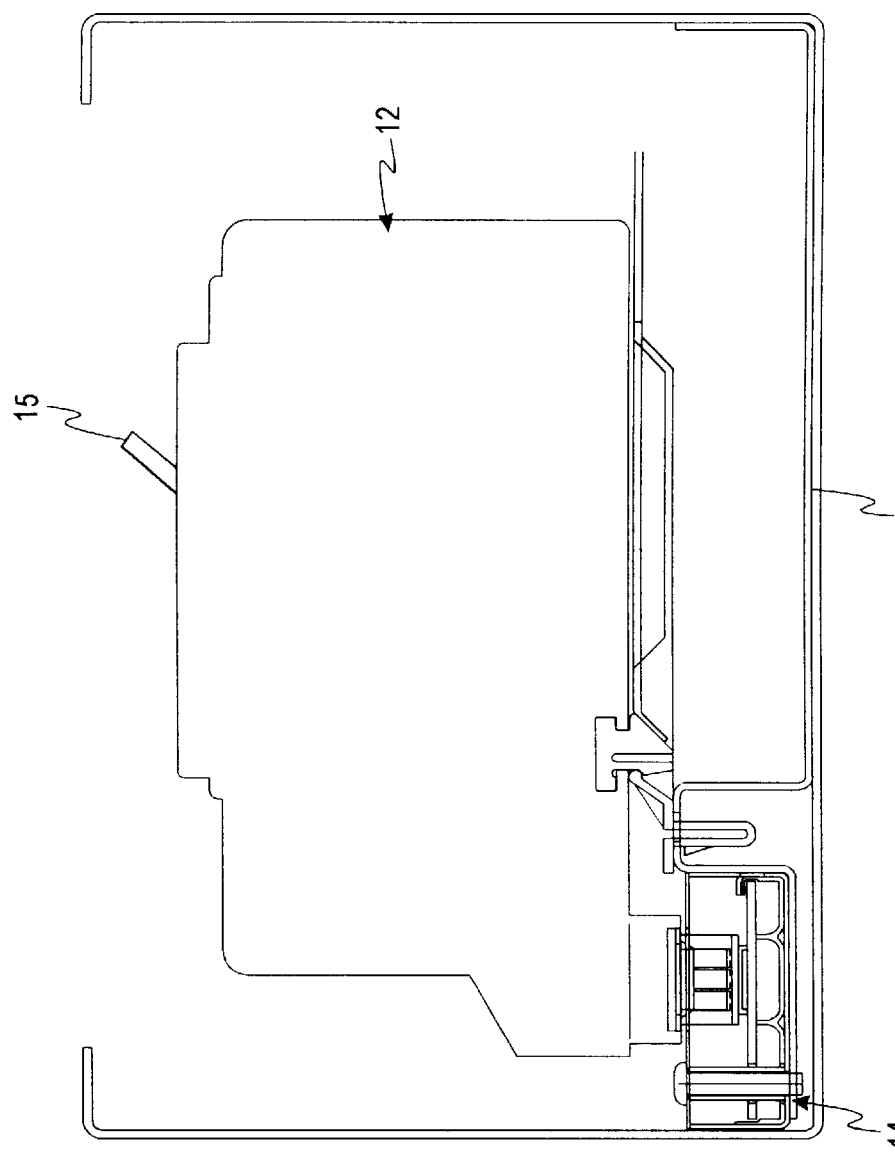
FIG. 14 is a side elevation, partially in section showing connection of a circuit breaker to a control bus in accordance with one embodiment of the invention.

Referring now to FIG. 14, a simplified sectional view shows a circuit breaker module 12 plugged into a smart bus module 14 in accordance with the invention. As more fully described elsewhere herein, the smart module 14 has the capability of addressing and identifying the particular breaker 12 and sending appropriate signals, if the breaker is a power link breaker, that is, a circuit breaker of the remotely controllable type, suitable signals for opening and closing the contacts of the breaker 12 in response to remote control signals. A portion of an enclosure 20 in which the intelligent panelboard wiring bus is mounted is also shown in FIG. 14. A motor 65 for operating (opening and closing) the breaker contacts 70 independently of operation of the handle or manual toggle 15, and breaker contacts 70 are illustrated diagrammatically in FIGS. 23 and 24. The motor may be operated by a remotely generated control signal fed to the smart bus 14 and addressed to the particular breaker (i.e., the associated connector 100) with which the motor is associated as is more fully described elsewhere herein. For ease of description, the intelligent panelboard wiring bus 14 will be hereinafter referred to simply as the "bus" or "smart bus."

Figure 15:
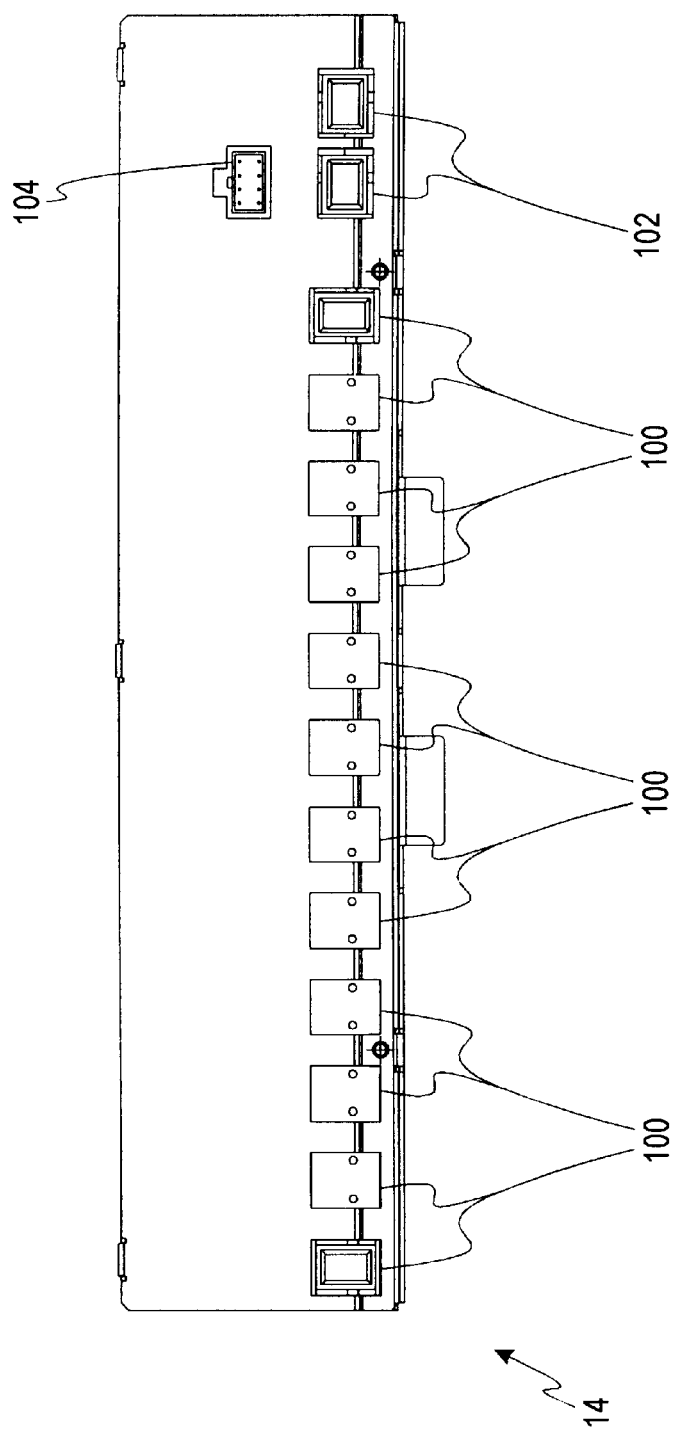
FIG. 15 is a plan view of one embodiment of an intelligent control bus of the invention.

FIG. 15 is a top plan view of an exemplary bus 14 in accordance with one embodiment of the invention. The bus 14 has a number of connectors 100, each for receiving a circuit breaker 12 in the manner indicated in FIG. 15. The bus 14 may be provided in various lengths, having fewer or more connectors 100. While 1-pole circuit breakers 12 have been illustrated, 2-or 3-pole breakers may also be mounted to the bus 14. Each breaker will engage a single connector 100, but 2- and 3-pole breakers, due to their larger width will overlie two and three connectors 100, respectively, thus occupying two or three "positions", while using only a single connector 100. An additional pair of connectors 102 are provided for mating engagement with a panelboard-mounted controller as described above. A further connector is provided for a jumper cable of the type described above for connection to one or more further intelligent busses of the same or similar type resident in the same panelboard or on panelboards at remote locations.

Figure 16:
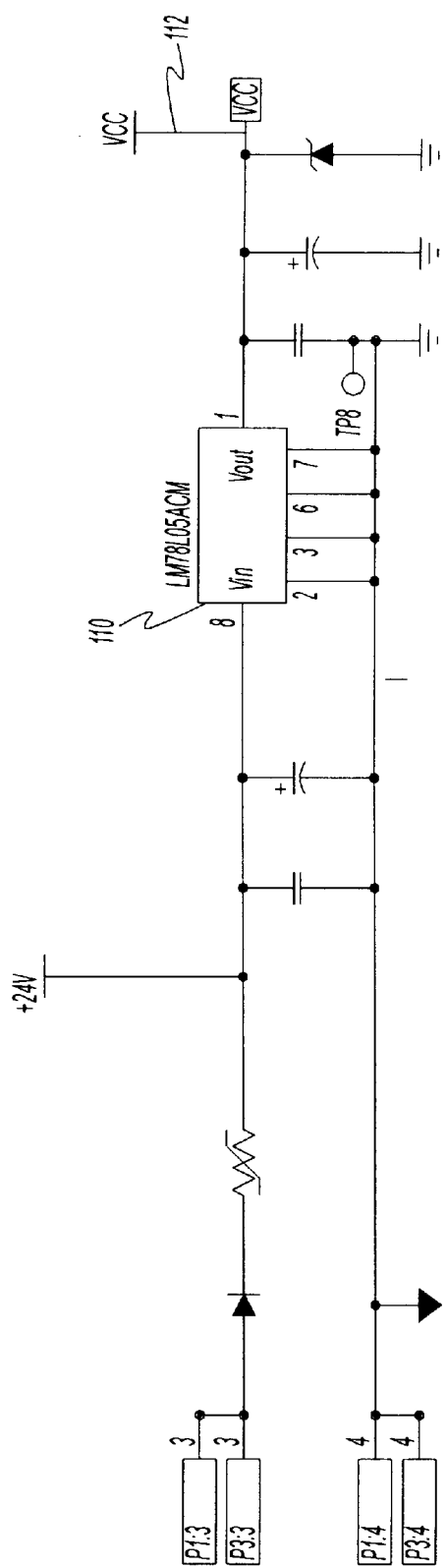
FIGS. 16, 17, and 18*a*–*b* are schematic circuit diagrams of portions of a circuit of the intelligent control bus of FIG. 15 in accordance with one embodiment of the invention.

Referring now to FIGS. 16–22, circuitry incorporated within the panelboard wiring bus or smart bus 14 will next be described. FIG. 16 shows a DC power supply for providing a regulated 5-volts DC from a 24-volt unregulated AC input. The unregulated 24-volt input is provided via the power and communications cable from the power supply module 16 which may be mounted in the same panelboard as the bus 14 or in a different panelboard and connected thereto via a cable 25 as described above with reference to FIG. 2.

In smart bus modules attached via a cable 25 to a controller or control module and power supply module located in another panelboard, the address select module 35, at connectors P1 and P2 (see FIG. 10) will mount to leading connectors 102 of the bus 14.

In FIG. 16, a regulated power supply 110 receives the unregulated 24-volts from the power supply module and provides a regulated 5-volt VCC output 112. In the illustrated embodiment, the voltage regulator is of the type LM78L05ACM, which is a 3-terminal positive regulator, available for example from National Semiconductor Corporation.

Figure 17:
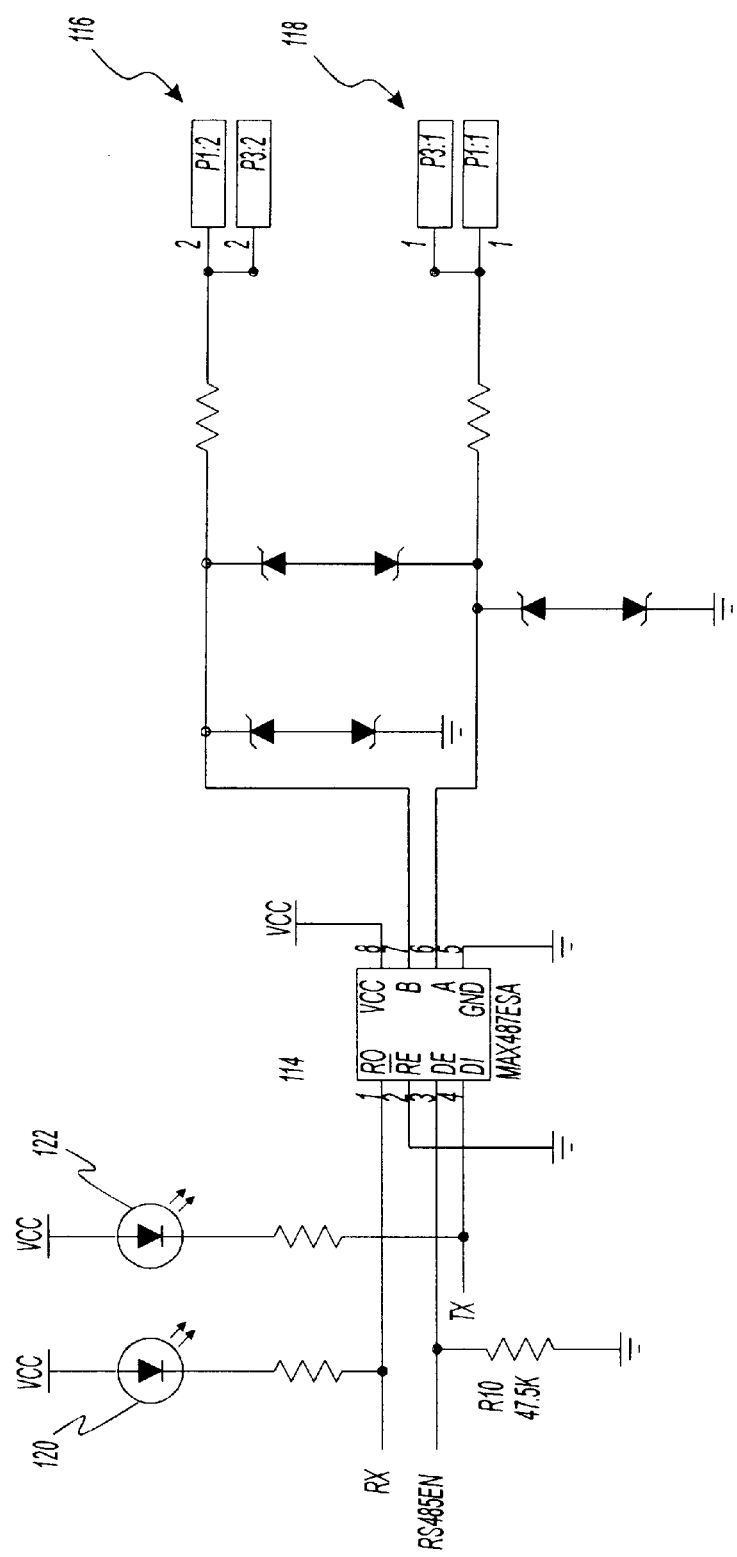

FIG. 17 illustrates an RS-485 driver circuit which includes a low-power, slew-rate limited RS-485 transceiver 114 of the type MAX487ESA available from Maxim Integrated Products. This transceiver 114 is coupled with RS-485 protocol inputs and outputs 116 and 118 and may further be provided with LED indicators 120 for receive (RX) operation and 122 for transmit (TX) operation. In the illustrated embodiment, the LED 120 may be green and the LED 122 yellow.

Figure 18A:
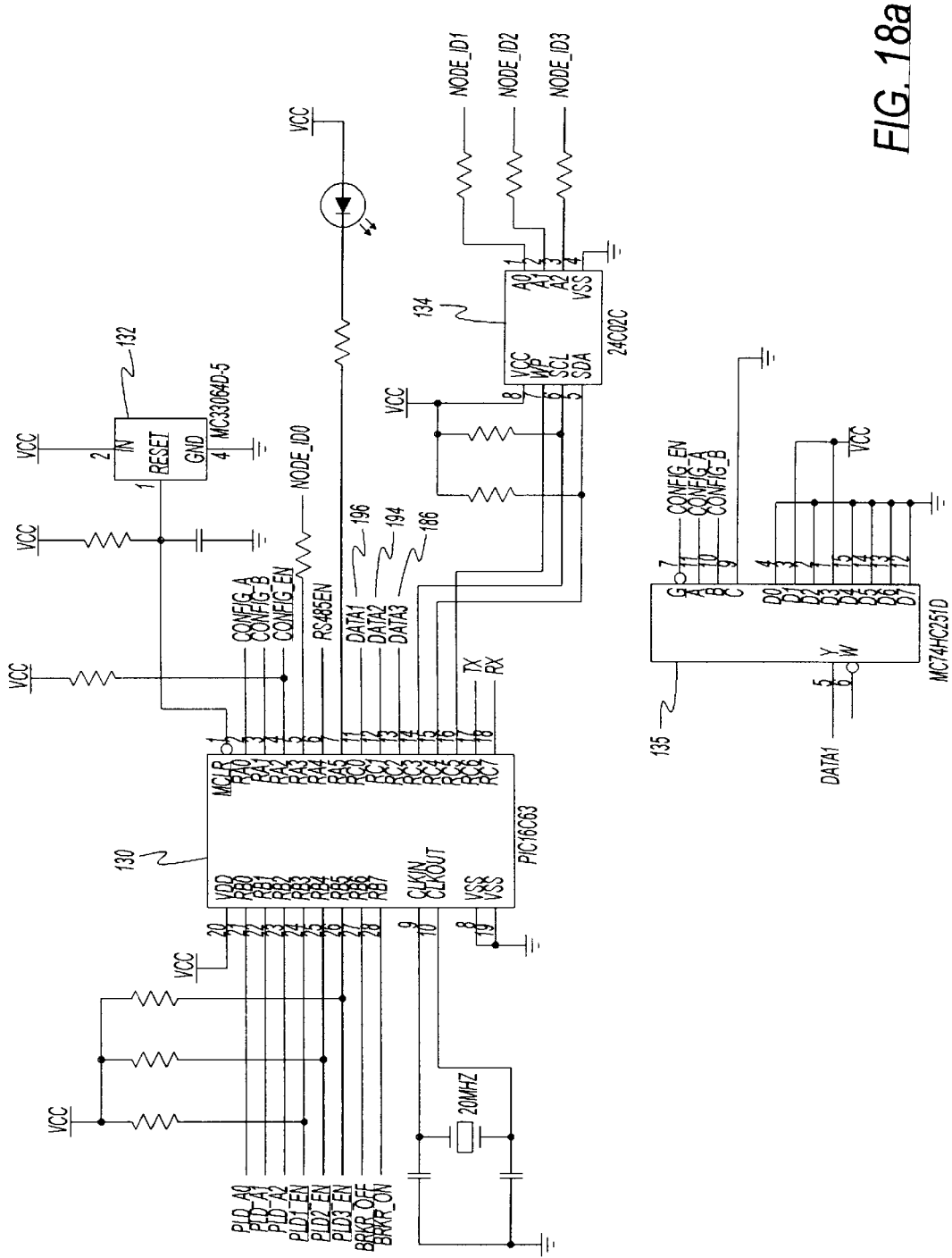
Figure 18B:
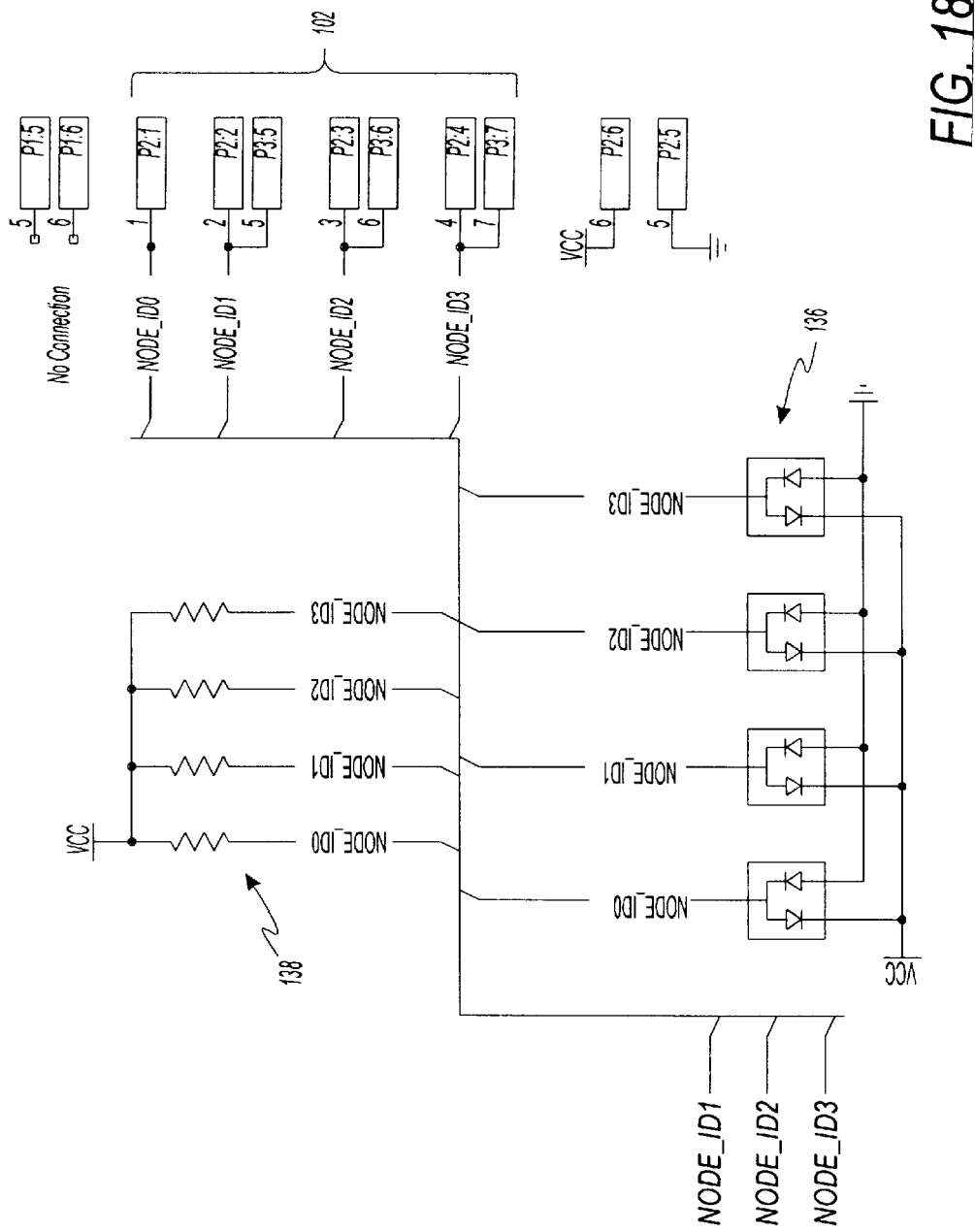

FIGS. 18a and 18b show a controller or microprocessor 130 and associated components. The controller or microprocessor may be of the type designated PIC16C63 available from Microchip Technology Inc., which is an 8-bit CMOS microcontroller. The associated circuits may include a reset circuit 132 which may be of the type MC33064D-5. A serial EEPROM 134 is also coupled with the controller or microprocessor 130. This EEPROM 134 may comprise a 2K serial EEPROM of the type 240C2C available from Microchip Technology. The EEPROM 134 decodes serial to 3-bit addresses from the address module 34 (see FIG. 10) which is coupled thereto via the four address pins of the connector 102, as described above. A plurality of diodes 136 provide clamping protection for the address lines and pullups are provided by resistors 138. The EEPROM 134 can remember the unit address of the bus and can also store other data relative to a particular bus such as manufacturing data, module number, number of positions on the bus and whether the bus is a "left-hand" or a "right-hand" configured bus for example as indicated in FIG. 1.

A data selector/multiplexer 135 of the type 5N74HC251D available from Texas Instruments is used to hard code the smart bus circuit board. This code will indicate whether the bus is a "right-hand" or a "left-hand" configuration (see FIG. 2) and the number of connectors 100, which may be from 6 to 24 in increments of 3 in the embodiment described herein. This coding may be in accordance with the following example:

| D3 | D2 | D1 | D0 | Bus |
|----|----|----|----|-----|
| 0 | 0 | 0 | 0 | 6R |
| 0 | 0 | 0 | 1 | 6L |
| 0 | 0 | 1 | 0 | 9R |
| 0 | 0 | 1 | 1 | 9L |
| 0 | 1 | 0 | 0 | 12R |
| 0 | 1 | 0 | 1 | 12L |
| 0 | 1 | 1 | 0 | 15R |
| 0 | 1 | 1 | 1 | 15L |
| 1 | 0 | 0 | 0 | 18R |
| 1 | 0 | 0 | 1 | 18L |
| 1 | 0 | 1 | 0 | 21R |
| 1 | 0 | 1 | 1 | 21L |
| 1 | 1 | 0 | 0 | 24R |
| 1 | 1 | 0 | 1 | 24L |
| 1 | 1 | 1 | 0 | open |
| 1 | 1 | 1 | 1 | open |

FIGS. 19a–22 illustrate circuits for addressing and driving respective motors for opening and closing contacts in respective ones of the remotely controllable circuit breakers mounted to the smart bus 14. As indicated above, remotely controllable circuit breakers may include a motor for closing and opening the contacts thereof independently of the breaker handle 15 shown for example in FIG. 14.

Figure 21:
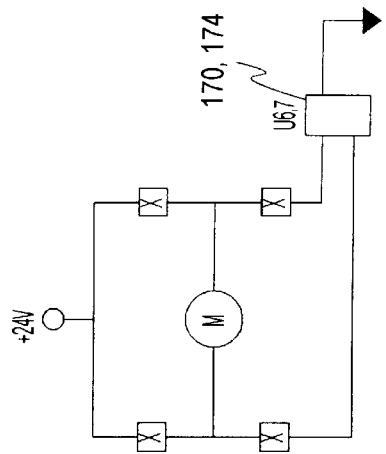
FIG. 21 illustrates a simplified circuit for operation of a motor contained in a circuit breaker under the control of the intelligent control bus.

FIG. 21 illustrates generally the type of motor control circuit utilized herein which is generally in the form of an H control circuit 140, for driving the motor bi-directionally in response to control signals generated by the controller and fed to the motor control circuits and addressed for control of a motor associated with a particular breaker, as will be further described presently. An interface circuit 142, shown in FIG. 22, performs three functions. Firstly, it receives motor on and off control signals at terminals 144 and 146 and receives motor power at terminals 148 and 150. These power inputs are clamped by suitable diodes and fed to motor control output terminals 152 and 154 of the interface circuit 142. The interface circuit 142 also senses the voltage at the load terminal of the breaker at input terminal 156 and clamps and divides down the AC voltage to provide a signal to verify the open or closed condition of the breaker contacts 70 at an output terminal 158. Finally, three output terminals 160 are coupled with respective jumper terminals (in the breaker—see FIGS. 23–24) which may be interconnected to develop a 3-bit code indicating the number of poles of the particular breaker to which interface circuit 142 is coupled. These contacts are located and hardwired to perform the appropriate code within the breaker itself, with the first code terminal being coupled to ground and a 2-bit code indicating whether the breaker is a single-pole, 2-pole or 3-pole type being coded by the remaining two terminals. These "code bits" are fed out of the interface circuit at terminals 162 and 164.

Figure 19A:
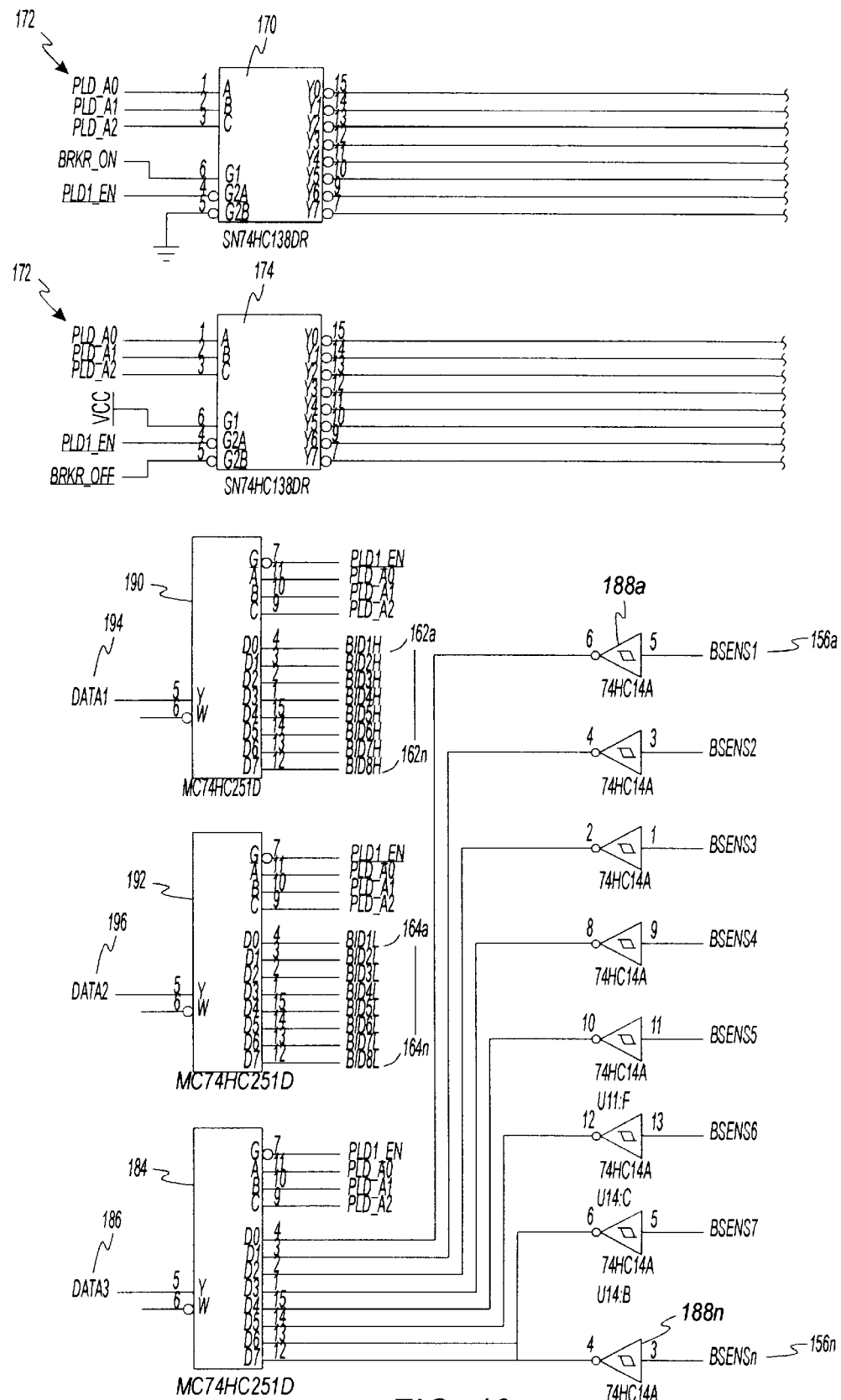
FIGS. 19*a*–*c* and 20 illustrate further portions of a circuit of the control bus of FIG. 15.
Figure 19B:
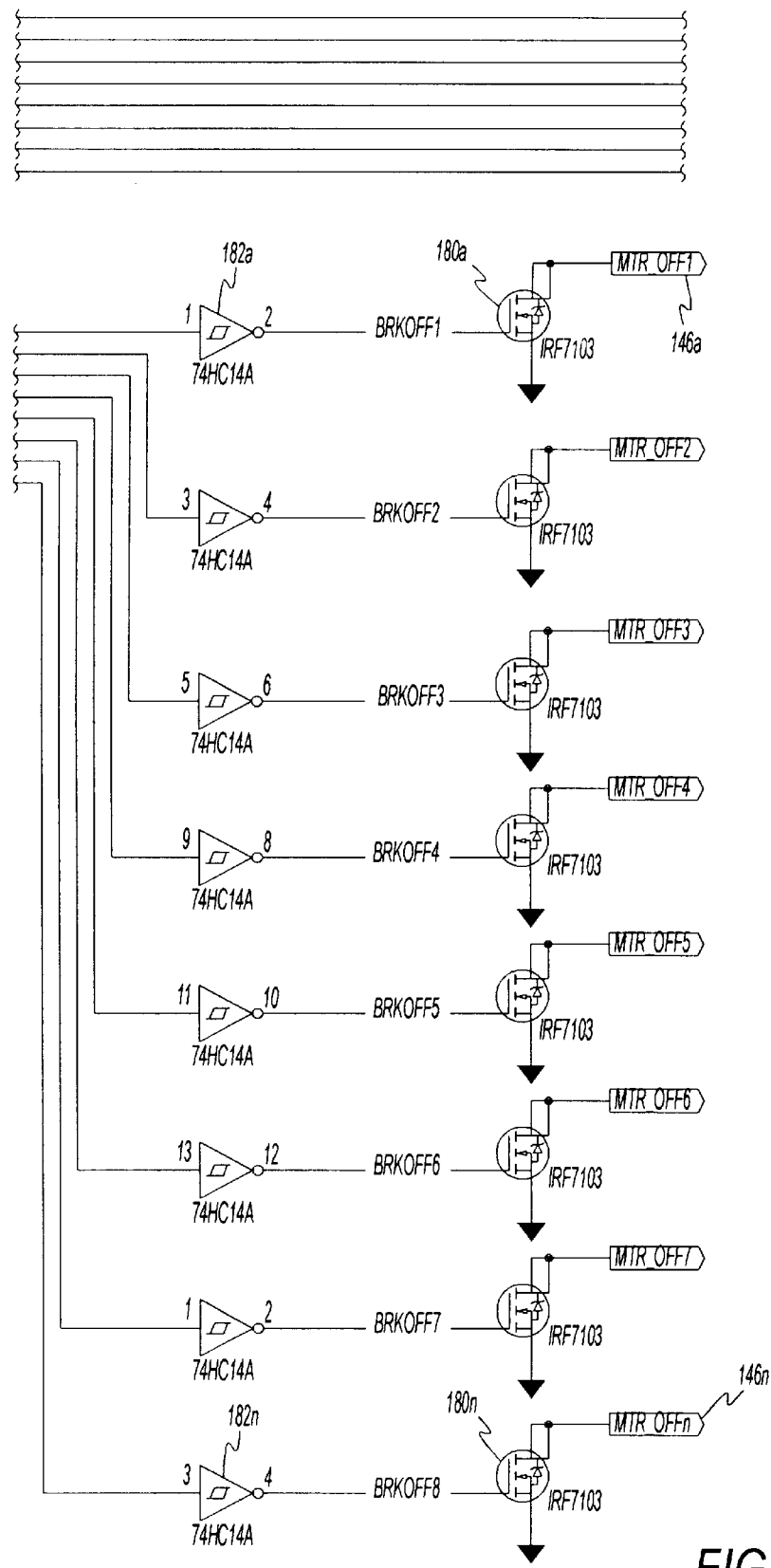
Figure 19C:
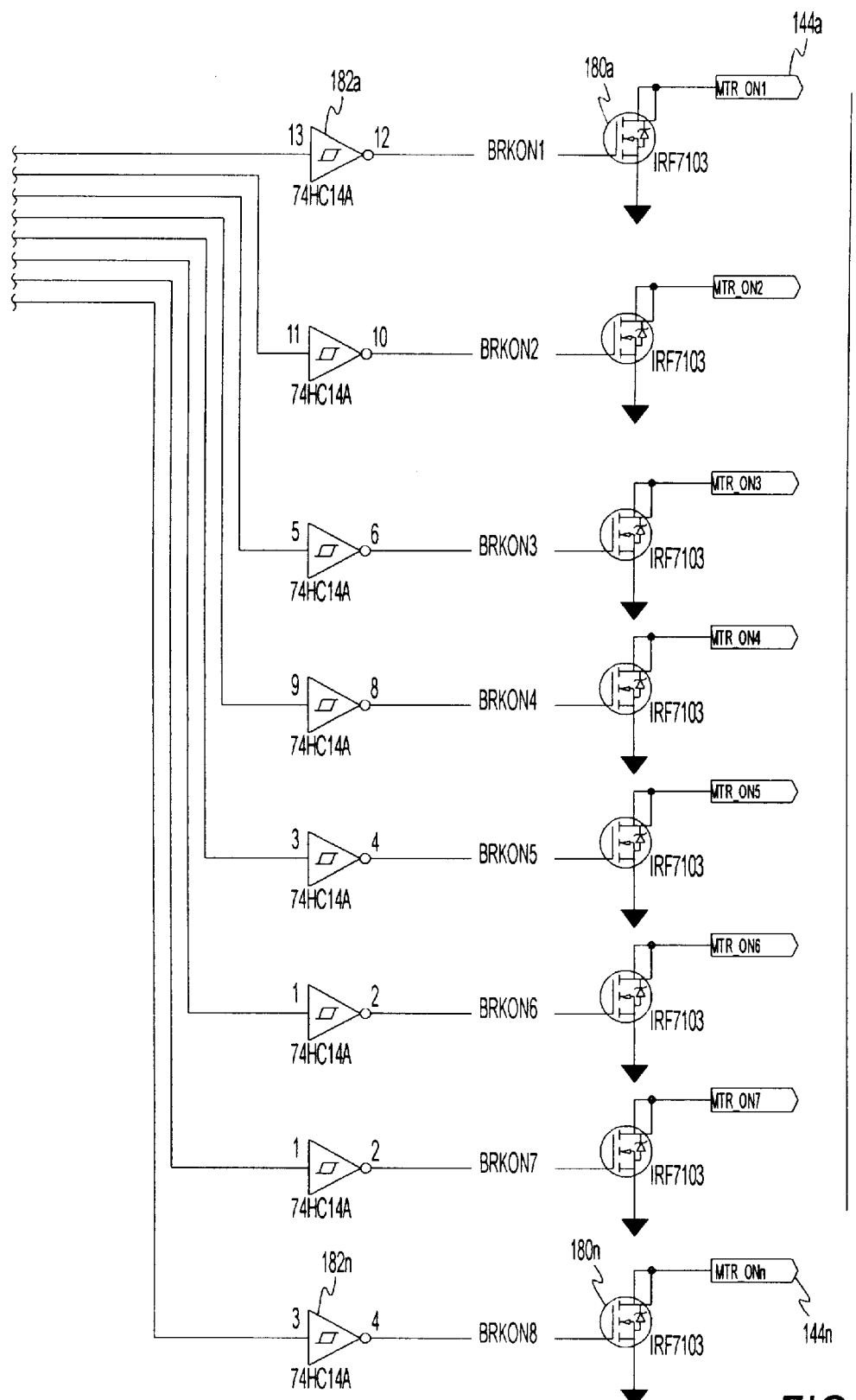
Figure 20:
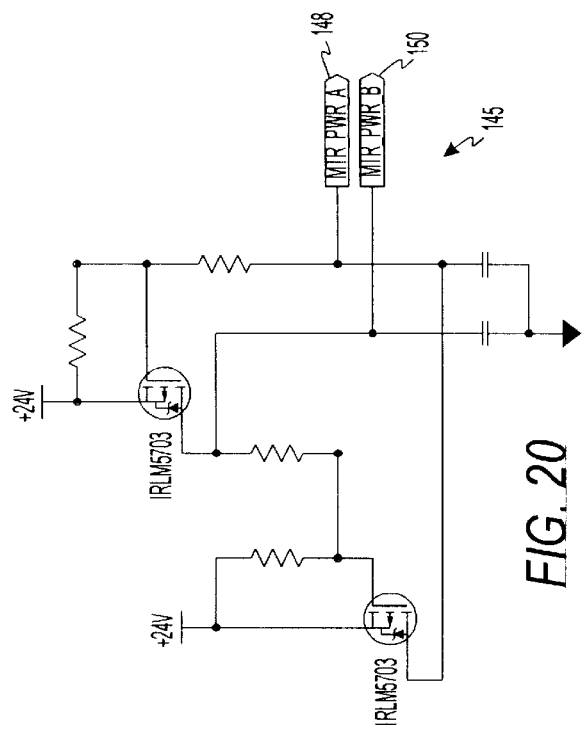

FIG. 20 indicates a common motor power drive circuit which provides the motor power A and B inputs 148 and 150 to the interface circuit 142 of each interface circuit of the smart bus 14. In the illustrated embodiment, the driver transistors Q8 and Q9 of the circuit of FIG. 20 comprise power MOSFETs of the type generally designated IRLM5703 available for example from International Rectifier. In this regard, the smart bus has an interface circuit 142 for each connector 100 therein which may receive a remotely controllable breaker, but only a single power drive circuit of the type illustrated in FIG. 20. The manner in which the power is then enabled to a particular motor in a particular breaker will next be described with reference to an addressing a driver circuit shown in FIGS. 19a–c.

Referring to FIGS. 19a–c, a 3-line to 8-line decoder/de-multiplexer 170 receives addressing control signals on inputs 172 and decodes these into eight lines which provide drive signals for the "motor on" inputs 144a–n for eight positions for which breakers may be mounted to the smart bus 14. One or more additional de-multiplexer/decoders and similar drive circuits may be provided for additional positions on the bus. Similarly, a second de-multiplexer/decoder 174 of the same type provides enabling drive signals for each of the motor off control lines 146a–n. Additional decoder/driver elements and associated drive circuits may be provided to accommodate the number of breaker positions on a smart bus. In the illustrated embodiment, a total of 16 such breakers are accommodated on a smart bus. However, the smart bus may be designed to accommodate fewer or more breakers without departing from the invention. The decoder/demultiplexers 170, 174 are of the type SN74HC138, 3-line to 8-line decoder/demultiplexer from Texas Intruments.

Figure 22:
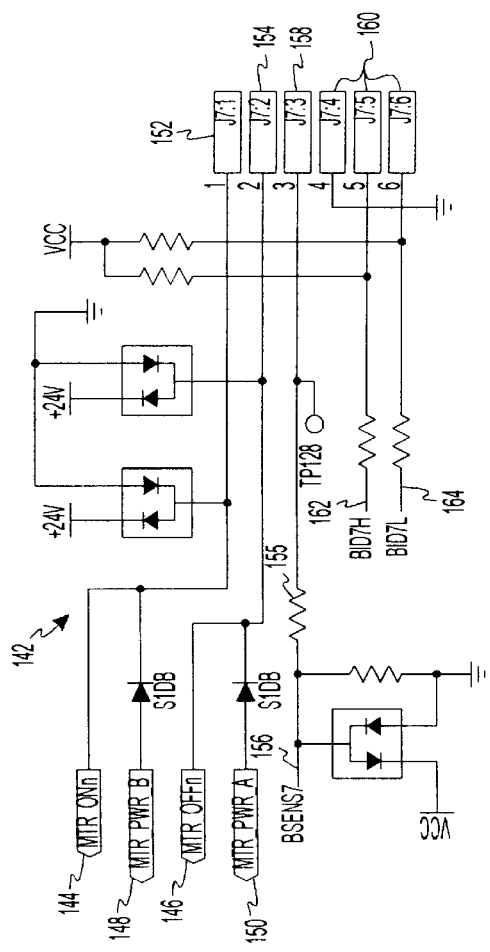
FIG. 22 illustrates a further portion of a circuit of the control bus.

In each of the drive or enable circuits associated with the de-multiplexer/decoders 170 and 174, the drive transistors 180a–n are of the type IRF7103 Power MOSFET available from International Rectifier. Clean control signals from these transistors are derived from the de-multiplexer/decoder outputs by Schmitt-Trigger inverters 182a–n of the type 74HC14 available from Texas Instruments. The sensed voltage derived from the breaker contacts at terminal 156 of each of the interface circuits 142 of FIG. 22 are fed to data inputs of a corresponding 8-bit data selector/multiplexer 184 of the type SN74HC251D available for example from Texas Instruments. One or more such data selector/multiplexers may be utilized to accommodate the number of breaker positions in a given smart bus 14. The data output from the multiplexer 184 is indicated at reference numeral 186 and is fed to microprocessor 130. Schmitt triggers 188a–n also of the type 74HC14A are utilized to shape the AC signal received on each line 156a–156n to a square wave with the desired logic level to form data inputs to the multiplexer 184.

Two similar data selector/multiplexers 190, 192 (also 74HC14A) are provided for receiving 2-bit coded outputs 162, 164 indicating the breaker type (number of poles) associated with each breaker plugged into the bus 14. These outputs are multiplexed or decoded onto respective data lines 194, 196 to the microcontroller 130 of FIG. 18A. In the illustrated embodiment additional multiplexers in the same form as multiplexers 190 and 192 can be utilized to accommodate additional breaker positions which may be present in a given smart bus 14.

As indicated in the above description, this invention places interface electronics inside the control bus, creating an intelligent control bus which provides status information and is responsive to commands. Since the control bus is intelligent, it can communicate with other busses via a local area network. This reduces the number of connections to the bus and allows busses within multiple panels to communicate. As noted above, a single power supply provides power to all devices on the local area network.

Figure 23:
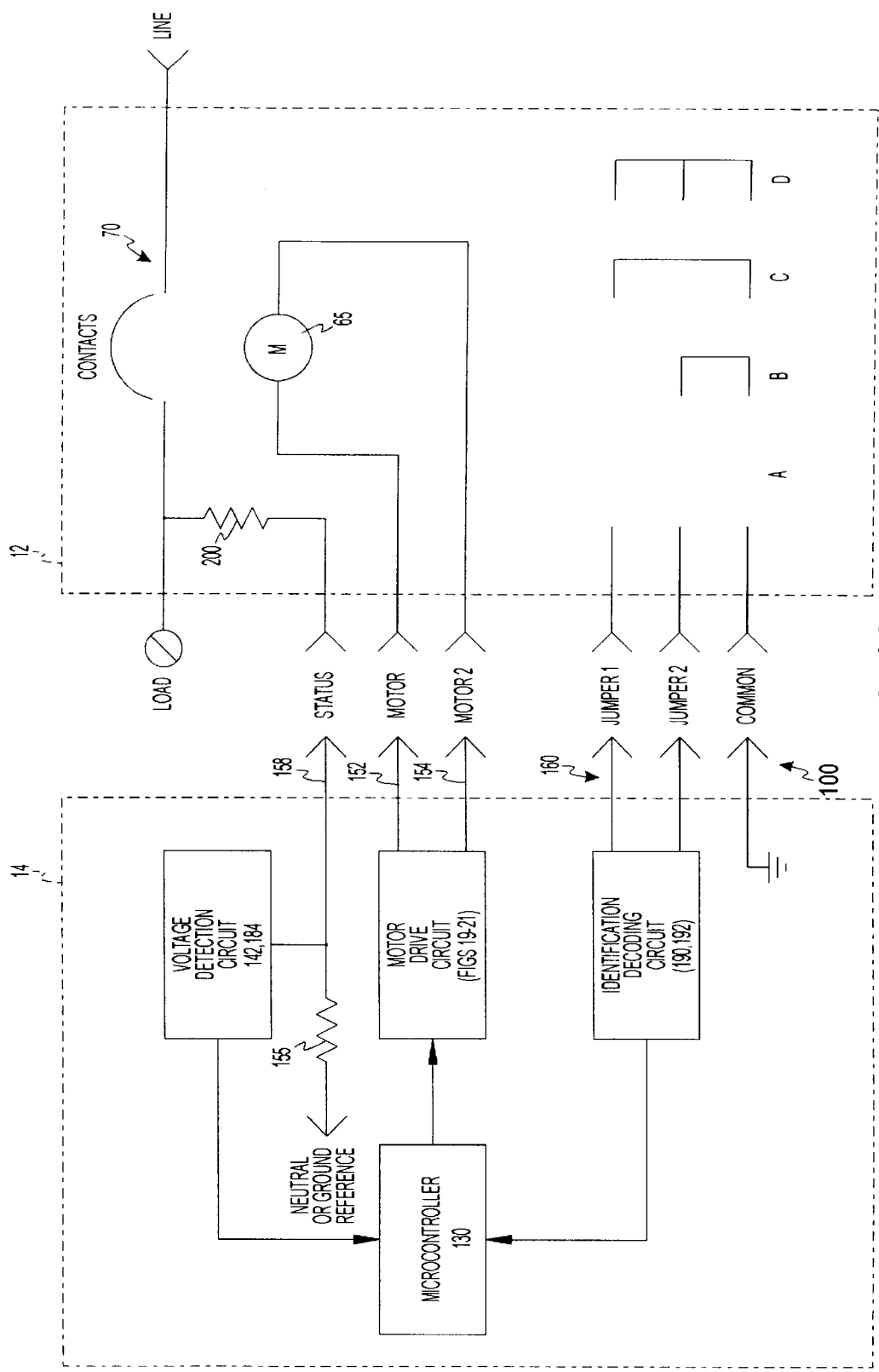
FIG. 23 is a simplified functional block diagram illustrating coupling of a circuit breaker with the circuitry of the intelligent control bus, in generally the manner indicated in FIG. 14.
Figure 24:
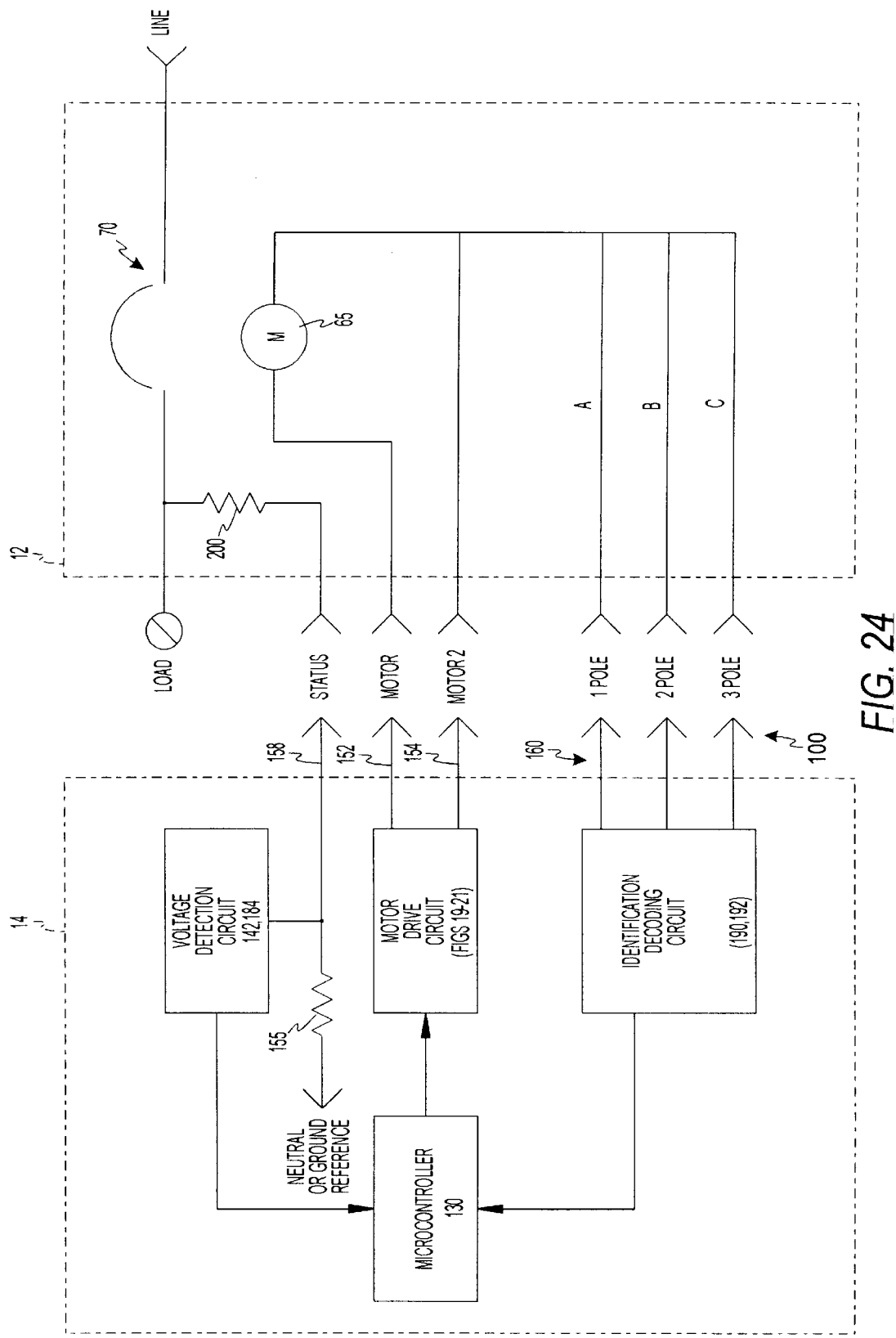
FIG. 24 is an alternate embodiment of the showing of FIG. 23.

This invention eliminates the need for control circuits and circuit boards within the breaker and uses only six connection points or terminals to the breaker, as indicated in FIGS. 23 and 24, which further illustrate the interface/connection between a typical circuit breaker 12 and the smart bus 14.

FIG. 23 shows an identification circuit created by using three of these terminals 160, with one of these terminals 160 designated a common. Jumpers, located within the breaker, between common and one or both of the other pins will produce combinations that are assigned to represent one, two, or 3-pole circuit breakers. An external circuit (in the smart bus—described above) connected to these terminals will read the configuration, whose jumpers are set at the time of manufacture of the breaker. FIG. 24 shows an alternate embodiment that uses one of the motor lines as a common, and has the additional advantage of requiring only four wires. The two logic schemes used in FIGS. 23 and 24 are as follows:

| JUMPER POSITION | IDENTIFICATION |
| --- | --- |
| (FIG. 23) | |
| A | Not Present |
| B | 1-pole |
| C | 2-pole |
| D | 3-pole |
| (FIG. 24) | |
| No Connection | Not Present |
| A | 1-pole |
| B | 2-pole |
| C | 3-pole |

The breaker status feedback (contacts 70 open or closed) circuit is implemented using a large series resistor 200. This resistor, connected between the load terminal of the circuit breaker and the connection terminal 158 is sized, e.g., 5 meg ohm to provide both isolation and a voltage drop when connected to an external circuit, e.g., a 10K ohm resistor 155 in the interface circuit 142, which is repeated in FIGS. 23–24 to facilitate this description.

The other two terminals 152, 154 are connected to the remotely controllable drive motor 70 internal to the breaker.

The above-described elements can all be located within a circuit breaker, without a circuit board to support the components.

Accordingly, the system of the invention also includes a circuit breaker device with an internal impedance, connected between a load terminal and a detection circuit, which impedance provides both isolation and level reduction. While a resistor is shown and described, the internal impedance may be resistive, capacitive or inductive. The interface circuit 142 has proportionally smaller impedance, such that a voltage divider is implemented when the smaller impedance is connected between the circuit breaker and a voltage reference point. The reduced level signal from the voltage divider is then processed as indicated above to determine the status of the voltage at the load terminal of the circuit breaker. The connection between the internal impedance 200 and the detection or interface circuit can be implemented using an unpliggable type of connector as the connector 150, if desired.

As described above, the circuit breaker also has an internal wire-jumper identification circuit, in which at least the following conditions are encoded: 1-pole, 2-pole, 3-pole, device not present. Cooperatively, the smart bus is capable of decoding this internal wire jumper identification circuit. The connection between the internal wire jumper identification circuit and external detection circuit may also be implemented using an unpluggable type of connector.

The above-described "smart bus" 14 provides a control bus for an electrical panelboard with a plurality of actuator device (e.g., breaker) locations, comprising: (a) a plurality of connectors arranged such that a connector is adjacent to each of said plurality of actuator locations, whereby the control bus couples to one or more actuators occupying one or more of said plurality of actuator locations; (b) a circuit capable of accepting a control signal from an external control device, which control signal is used to command the position or status of one or more actuators occupying one or more of said plurality of actuator locations; (c) said circuit being capable of sensing said actuator devices to actuate between at least two positions in response to said control signal; (d) a connection for accepting said control signals from an external control device; and (e) a connection for providing control power to said control bus.

While circuit breakers were discussed above, the actuator devices may be electrical switching devices selected from the group consisting of relays, contactors, and remotely operated circuit breakers. The control bus contains a circuit capable of detecting and communicating one or more signals representative of a connected actuator device, including signals for identifying the position of the actuator in the bus, and signals for determining the identity of the actuator device, e g., a 1-, 2-or 3-pole breaker. The communicated signals are digital in form, and include a means for assigning an address to said control bus, as well as to each actuator position on the bus and for addressing individual actuator device positions. The mounting of the control bus in the panel is such that the control bus may be removed for servicing or replacement. A microprocessor is used to control the circuitry of the control bus, which circuitry includes a non-volatile memory device capable of storing information such as, but not limited to, the following items: communications parameters, actuator number of operations, accumulated actuator on-time, actuator event log, actuator name tags. The controller may include at least one display element capable of indicating power, communications, or operational status of the control bus.

Figure 25:
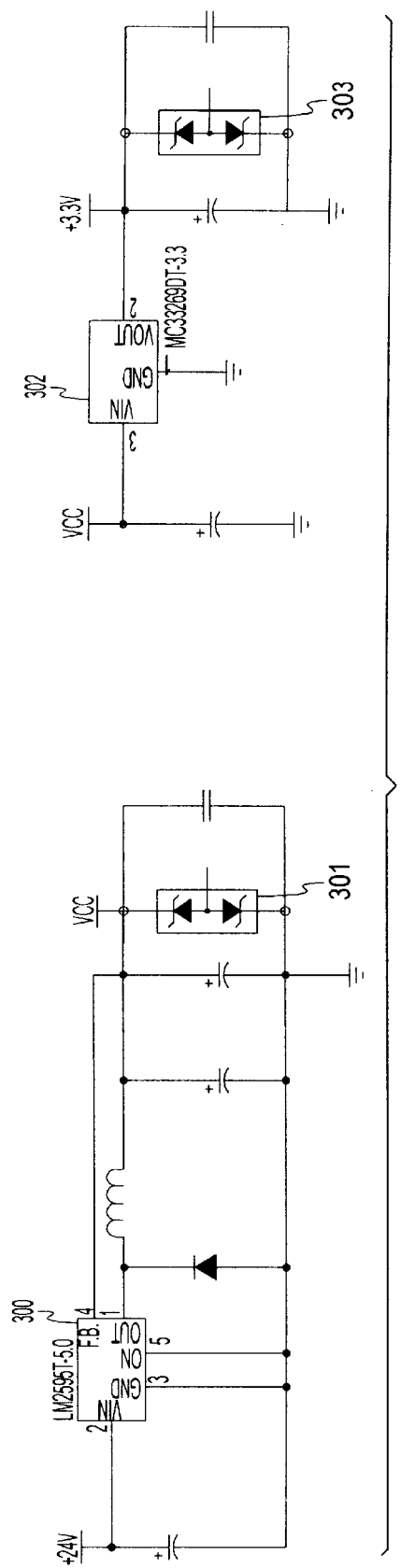
FIGS. 25 and 26 illustrate positive voltage supply and power failure monitor circuit portions of the control module of the invention.
Figure 26:
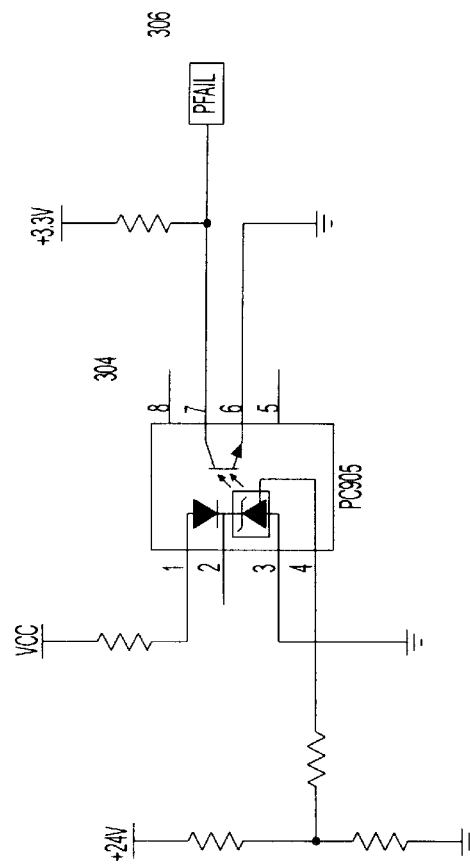

Referring now to FIGS. 25–37c, the circuitry of the controller or control module 18 will next be described. In FIG. 25, a first power supply circuit portion utilizes a voltage regulator 300 which may be of the type LM2595T (National Semiconductor) to provide a positive 5-volt VCC output from the 24-volt class 2 power supply from the power supply module 16. This 5-volt VCC may be further processed by a second regulator 302 to provide a positive 3.3-volt DC regulated supply. The regulator 302 may be of the type designated MC33269 from Motorola, Inc. Electrostatic discharge (ESD) protection is provided by elements 301, 303. These elements 301, 303 may comprise TVS diodes. Similar elements provide ESD protection in others of the circuits of FIGS. 27a–37c as indicated in the drawings. The various TVS diodes include asymmetrical TVS diodes for extended common-mode RS-485, such as part no. SM712 available from Semtech Corp. Newbury Park, Calif., and surface mount TVS diodes, such as part nos. SM05 thru SM36, also from Semtech Corp., and low voltage TVS diodes, such as part no. SLVU2.8 from Semtech Corp. FIG. 26 shows a power failure circuit monitor which monitors the 24-volt supplied from the power supply module 16 and utilizes an optoisolator 304 which may be of the type PC905 to provide a PFAIL logic output 306 to the controller or microprocessor (described below). In the illustrated embodiment, the PFAIL output 306 is normally high and goes low if the 24-volt input power fails.

Figure 27A:
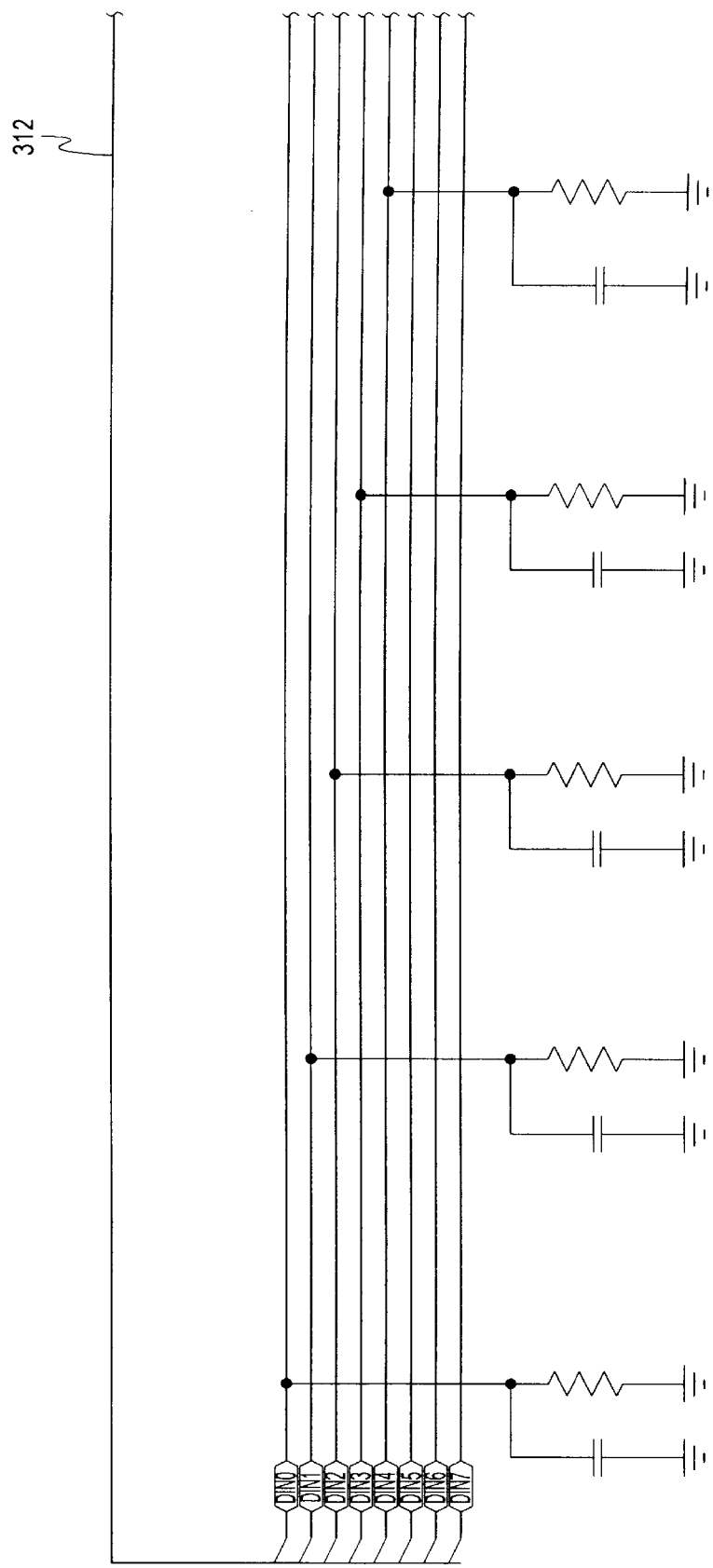
FIGS. 27*a*–32 illustrate circuitry of the control module.
Figure 27B:
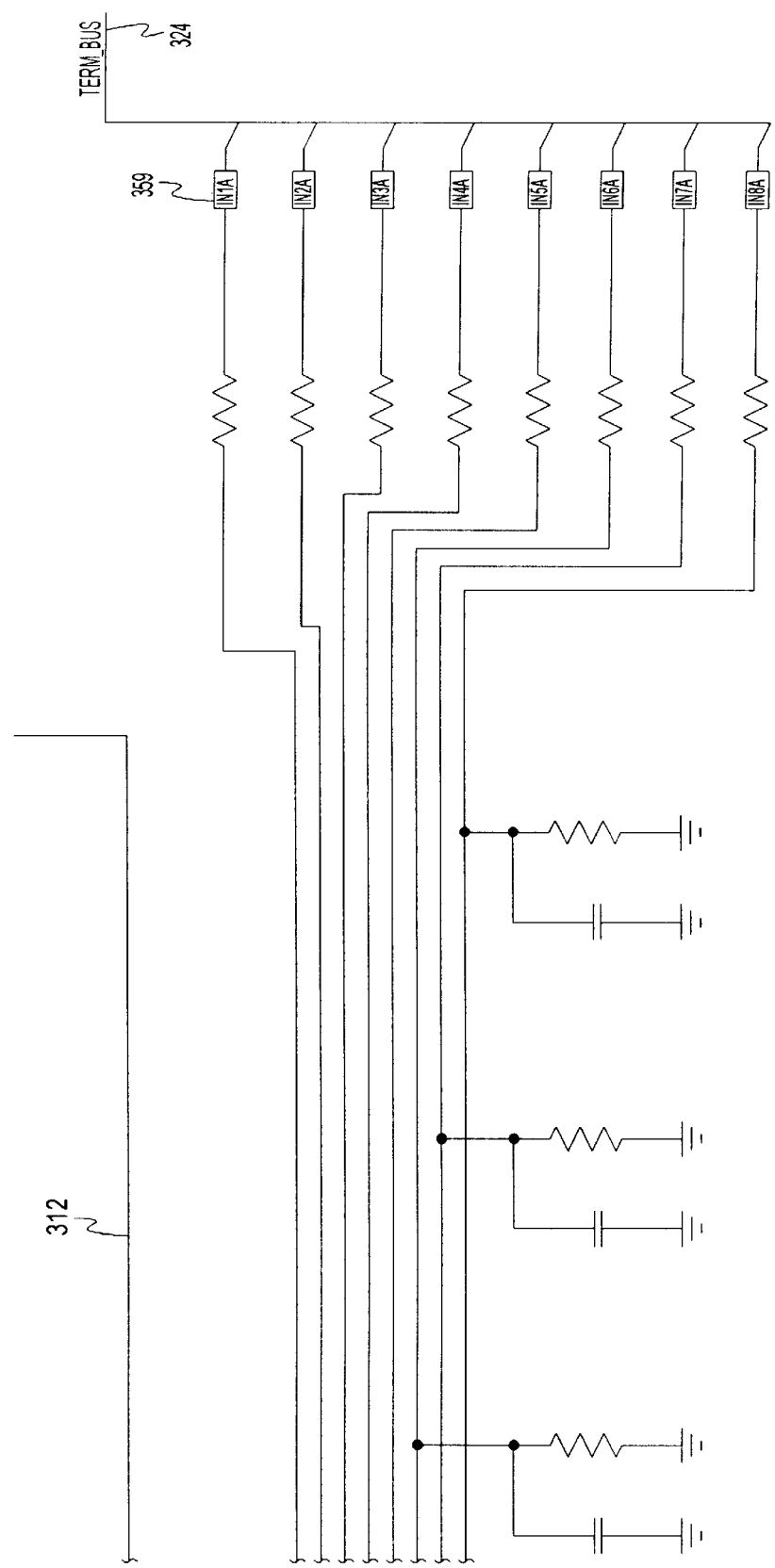
Figure 27C:
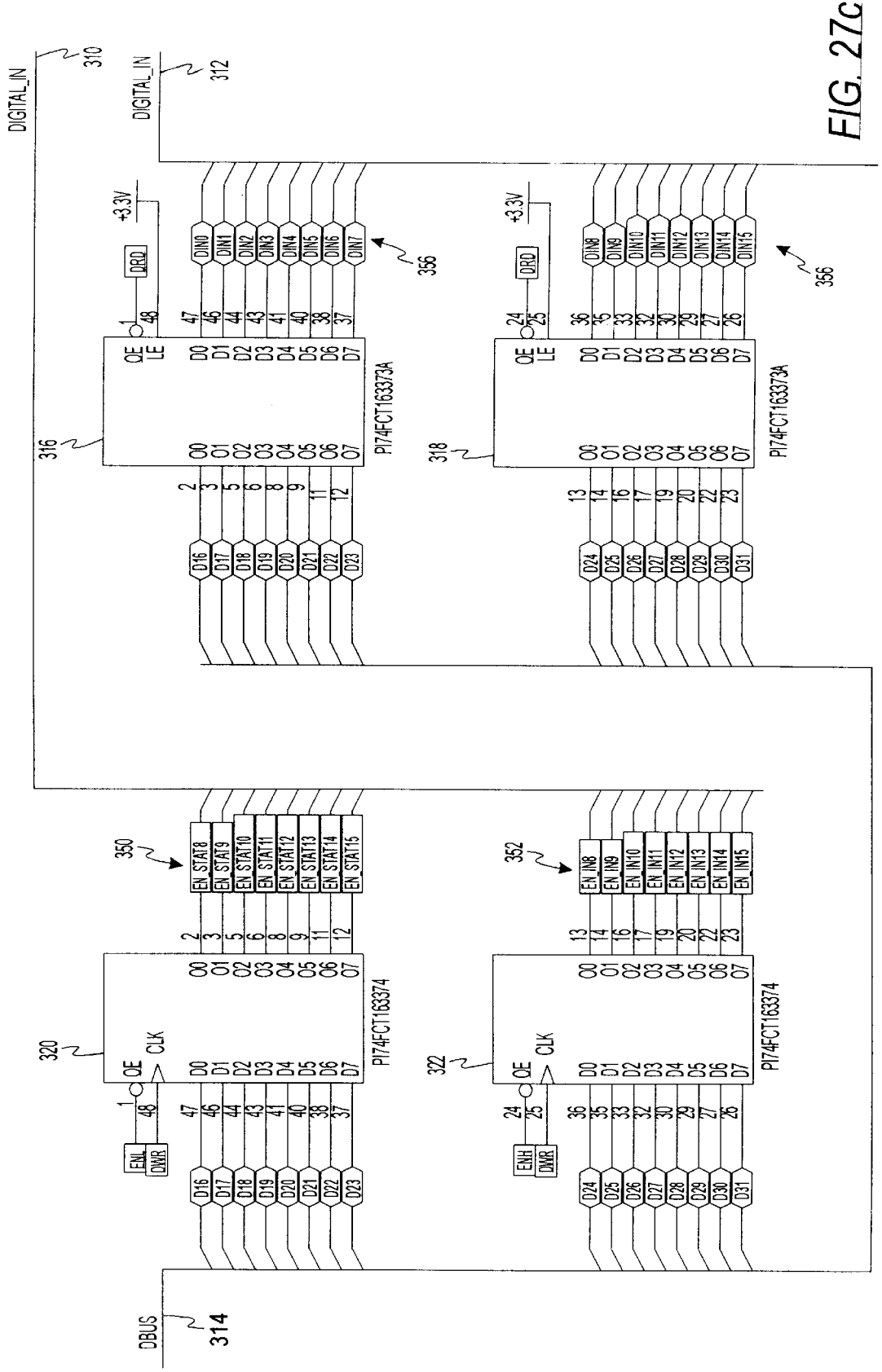

FIGS 27a–c illustrate a control bus 310, a first data bus 312 and a second data bus 314 which are respectively connected to data inputs and outputs of a pair of 16-bit latches 316, 318 and a pair of 16-bit registers 320 and 322. The latches 316 and 318 may be of the type P174FCT163373A which are 16-bit transparent latches available for example from Pericom. The registers 320 and 322 may be of the type P174FCT163374 which are 16-bit registers also available from Pericom.

An additional terminal bus 324 interfaces with the data bus 312 via suitable diode clamps and voltage divider resistors which take a 24-volt incoming level on the terminal bus 324 to a 5-volt level for the latches 316 and 318.

Figure 28A:
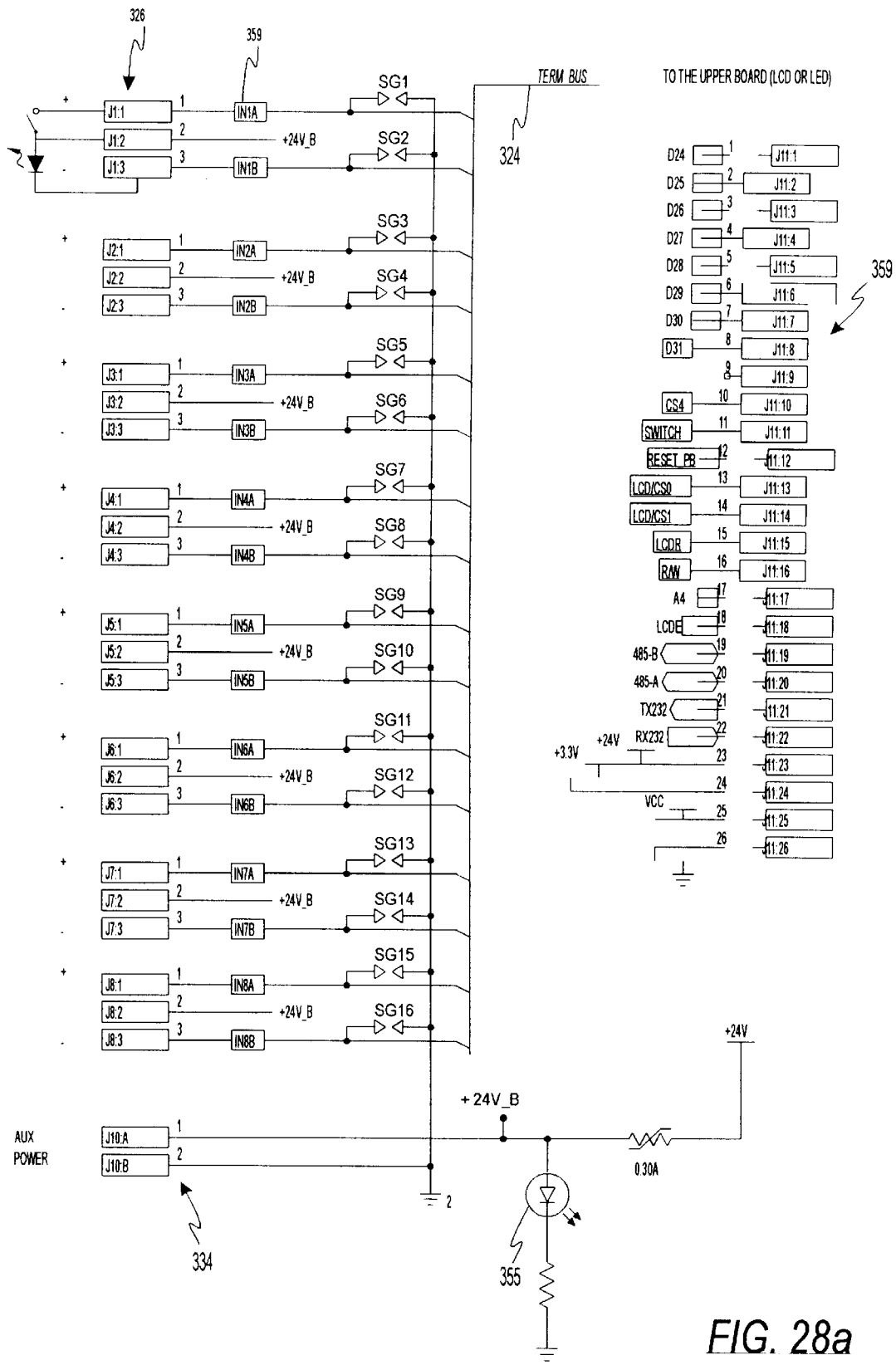

Referring now to FIGS. 28a–b, the terminal bus 324 connects to eight sets of three terminals each, each of which may be utilized either for a switch input, for example, for a switch-activated control of circuit breakers. The one or more switches coupled to these terminals 326 are preferably coupled as illustrated with respect to the first set of terminals 326 and may be programmed or mapped to particular circuit breakers as desired by the controller of the invention. The latch circuits 316 and 318 interface between the switch terminal inputs 326 and the main controller or microprocessor (FIG. 33) of the control module to be described later. The eight sets of pins 326 may also be used to drive one or more status-indicating elements, such as LEDs, an example of one of which is shown in the first set of terminals 326, and which would normally be coupled in the polarities shown between the second and third terminal of the set. These LEDs may be used to indicate the status of one or more breakers, and again may be mapped to particular breakers by the programming of the microprocessor of the control module. Spark gaps (SG1, SG2, etc.) may be provided for electrostatic discharge (ESD) protection to each set of pins 326.

Other connectors indicated in FIGS. 28a–b include a set of connectors 330 for coupling to a display panel to be described later and a set of connectors 332 which couple with the microprocessor board or lower board, to be described later. An auxiliary power jack 334 provides class 2+24-volt power for third party devices which may be utilized to provide a switch input signal, for example, for switches coupled to the terminals 326 as described above. An LED indicator 355 may be used to indicate the presence of the 24VDC voltage. A set of connectors 336 is provided for connection to RS232 or RS-485 Tx and Rx signals from a modem or computer, if desired.

Figure 29:
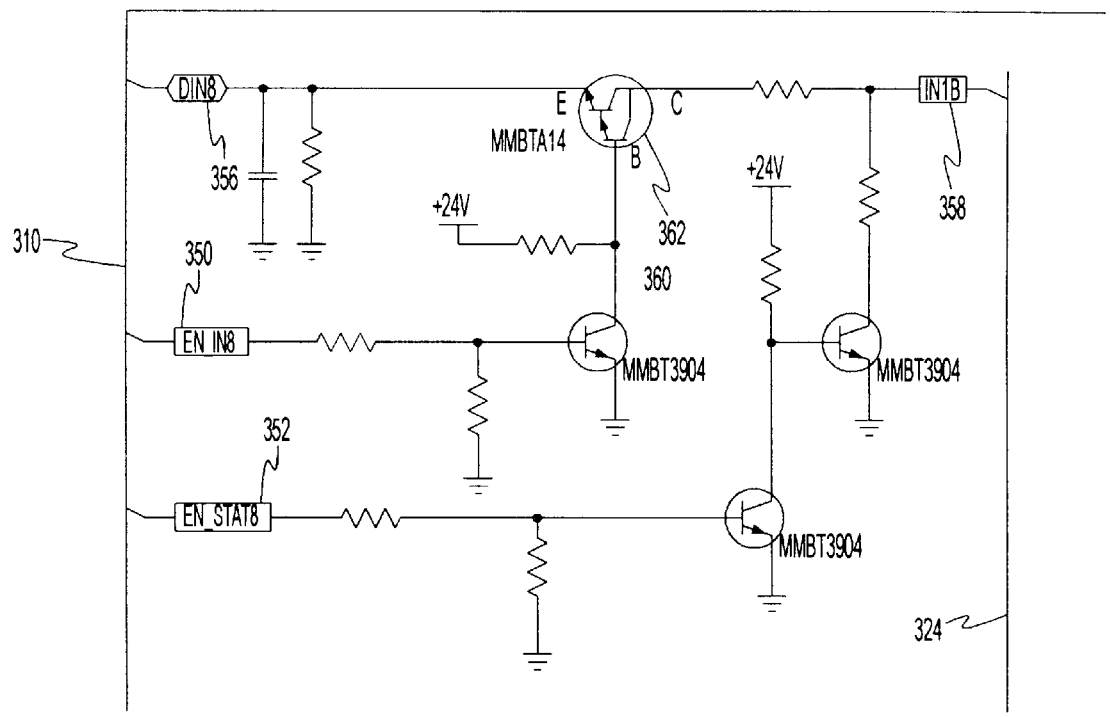

Referring now to FIG. 29, a typical circuit for configuring one of the eight sets of input terminals 326 is shown. Thus, a total of eight circuits such as the circuit shown in FIG. 29 are provided in the illustrated embodiment. This circuit receives enable outputs 350 and 352 from the registers 320 and 322 of FIG. 27 and is coupled to terminal 358 of the first set of switch input terminals 326 in FIG. 28. If a switch is installed between the first and second terminals 326 as shown in FIG. 28, a logic zero will appear at enable terminal 350 and a logic 1 at enable terminal 352 such that the status of the switch, on or off will be fed through latches via the terminal 359 and the clamps and voltage dividers as described above. If an LED is connected between the second and third terminals of any of the groups of terminals 326, a logic 1 will be present at terminal 350 and the logic signal at the terminal 352 when zero will cause the LED to be turned on and when 1 will cause the LED to be turned off. The transistor logic and switching circuit of FIG. 29 accomplishes this operation.

Figure 30A:
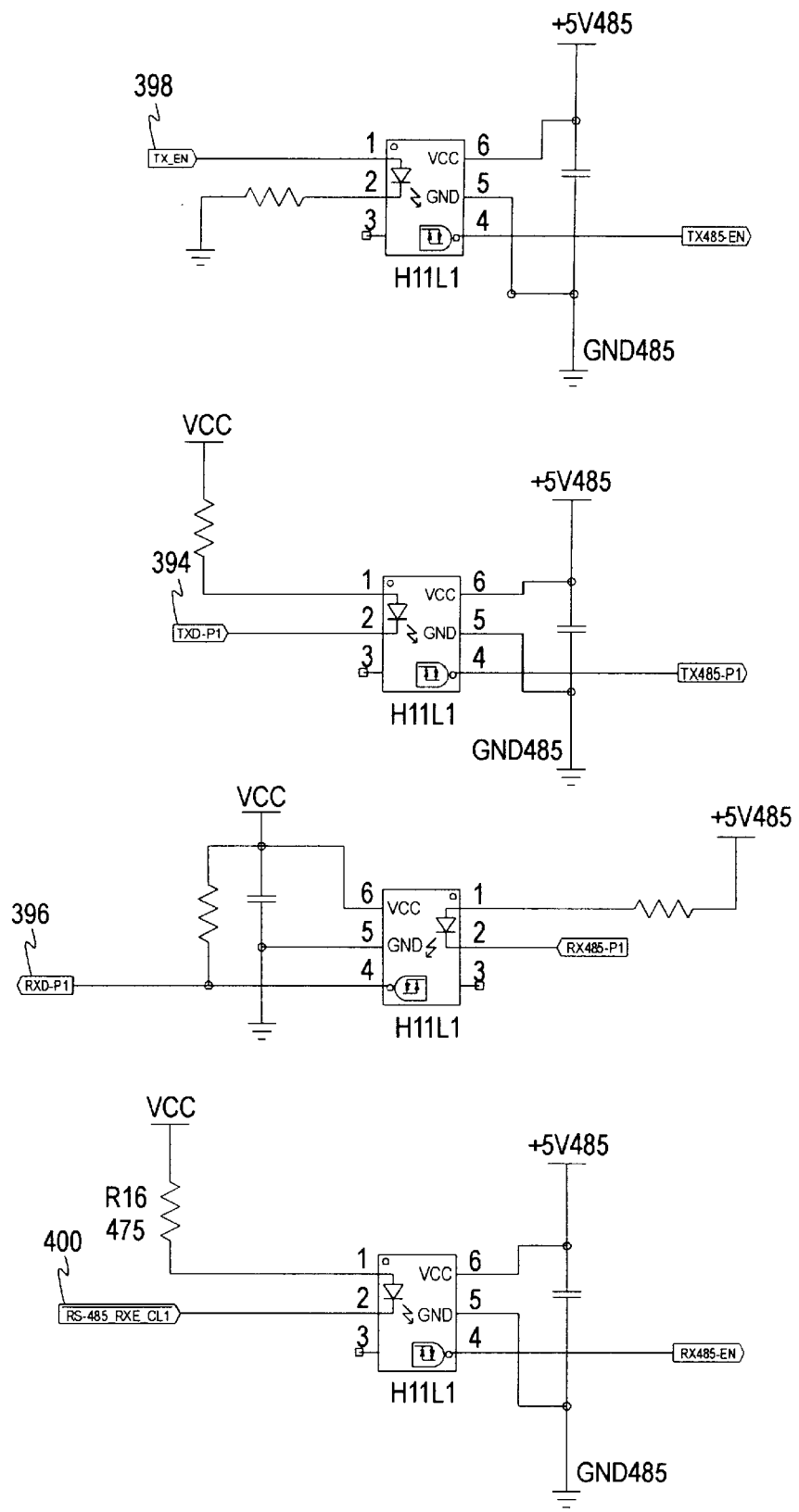
Figure 30B:
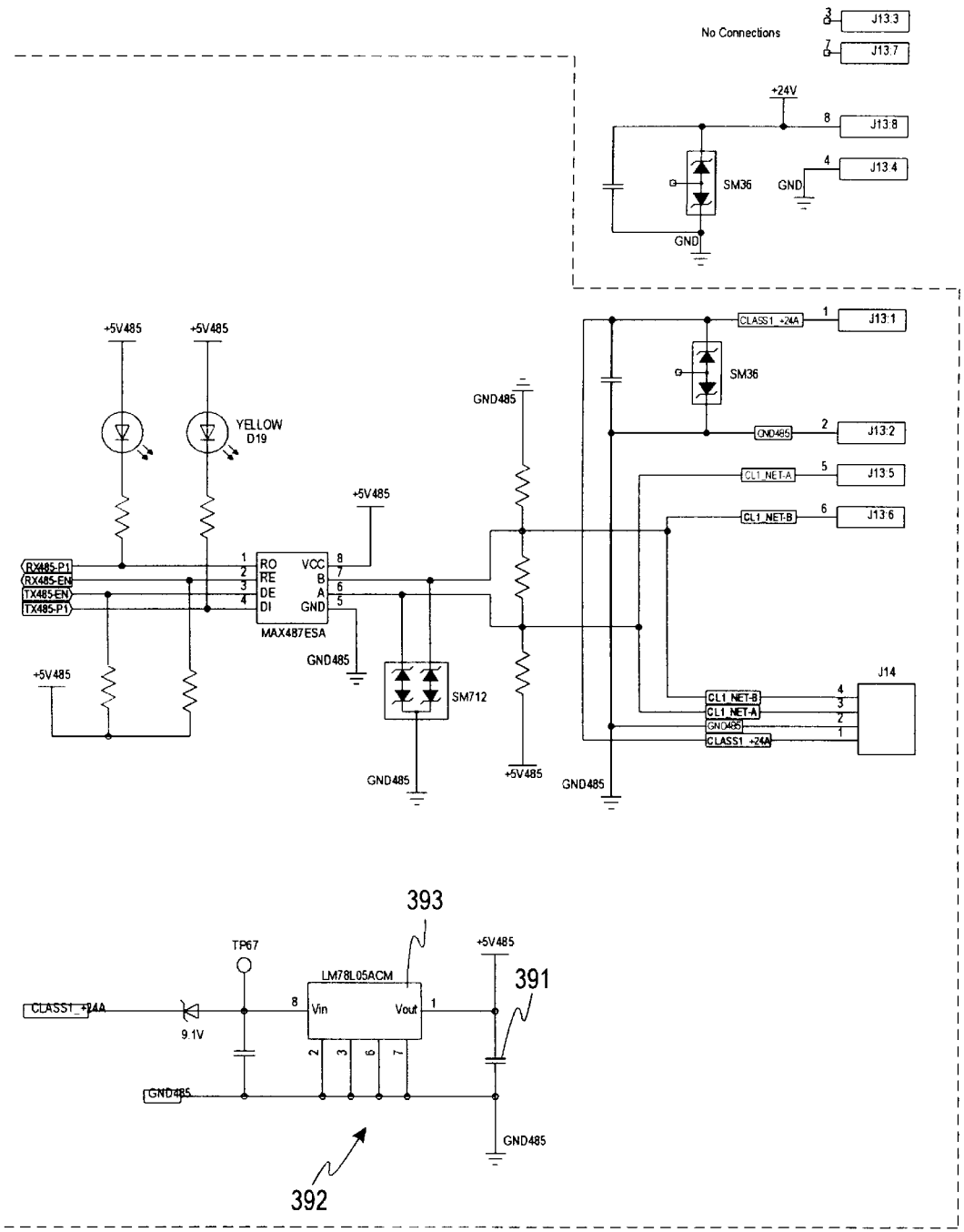

FIGS. 30a–b illustrate a scheme for isolation of class 1, 24-volt incoming lines from the power supply module 16. A total of six lines or connections are received from the power module 16. These connections include a class 2, 24power volt connection and common or ground as indicated at reference numeral 380, a class 1, 24-volt power and common at terminals 382 and a pair of communications terminals 384 and 386. The class 1, 24-volt power and communications lines at terminals 382, 384 and 386 are coupled with a second connector which feeds four lines to provide power and communications to smart busses in other panels, as indicated by cable 25 in FIG. 2. The class 2-voltage at terminal 380 is converted to the regulated DC voltages in the circuit of FIG. 25 as described above. The class 1, 24-volt power is also converted 5-volts DC for use by a RS-485 transceiver 390 by a circuit 392 which utilizes a voltage regulator 393 (e.g. LM78LO 5ACM) and a capacitor 391 to provide a suitable 5-volt power supply for the transceiver 390. The transceiver 390 receives the communications inputs 384 and 386 and feeds them through a class 1/class 2 isolation circuit which includes four optoisolators indicated generally by reference numeral 392 Enable inputs for transmit and receive respectively are indicated by reference numerals 398 and 400 at two of the optoisolators 392 while the other two optoisolators provide an isolated transmit input 394 and an isolated receive output 396. All of these inputs and outputs are provided with suitable class 1/class 2 isolation with respect to the 485 transceiver 390. The 485 transceiver 390 may be of the type generally designated MAX487ESA from Maxim Integrated Products.

Figure 31A:
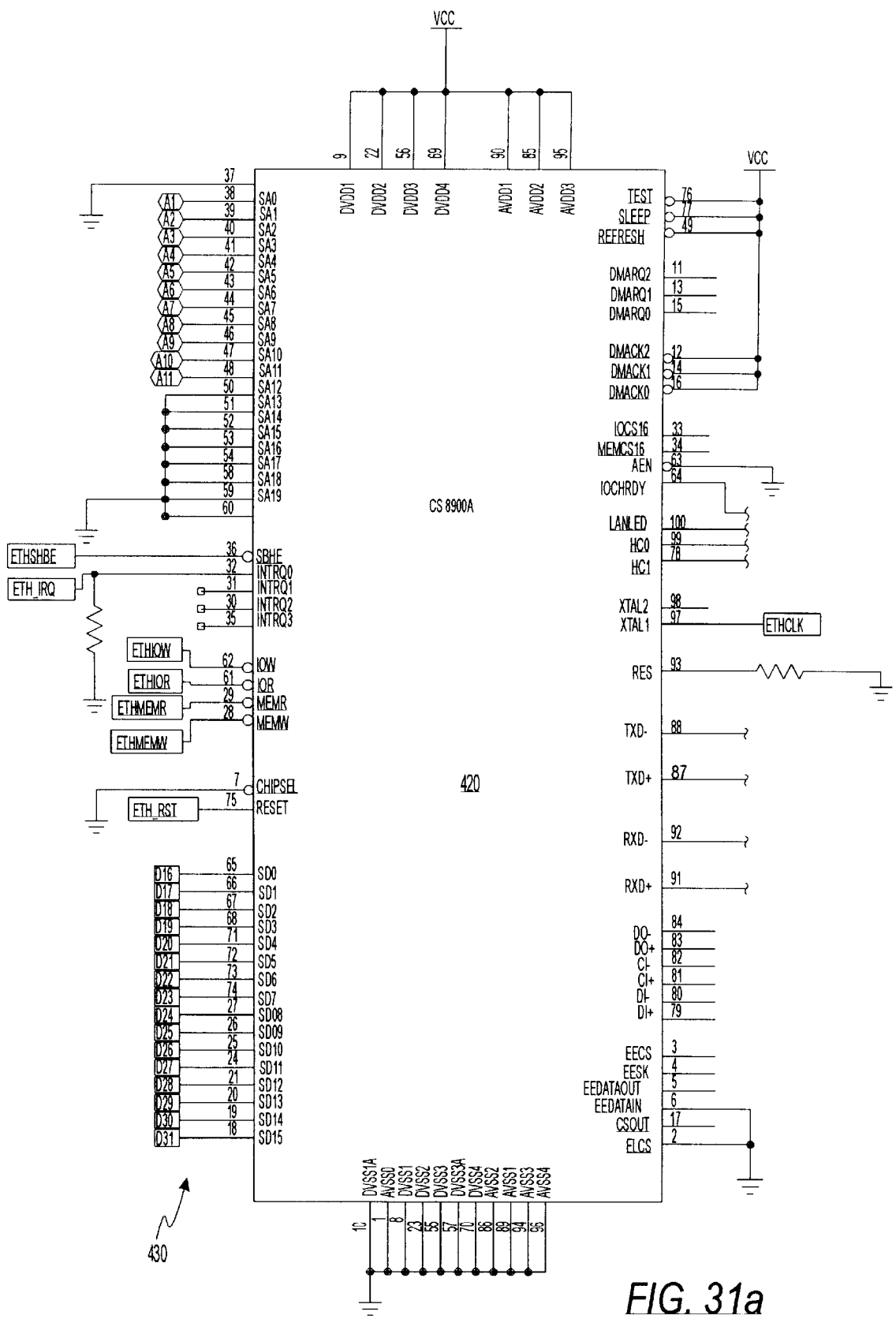

FIGS. 31a–b illustrate an Ethernet controller chip 420. The Ethernet controller chip comprises an ISA Ethernet controller of the type generally designated CS8900A available from Cirrus Logic, Inc. An Ethernet transformer 422 and RJ45 connector module 424 are also provided. Data outputs 430 and address inputs 432 are coupled with the controller or microprocessor to be described below with reference to FIG. 33.

Figure 32:
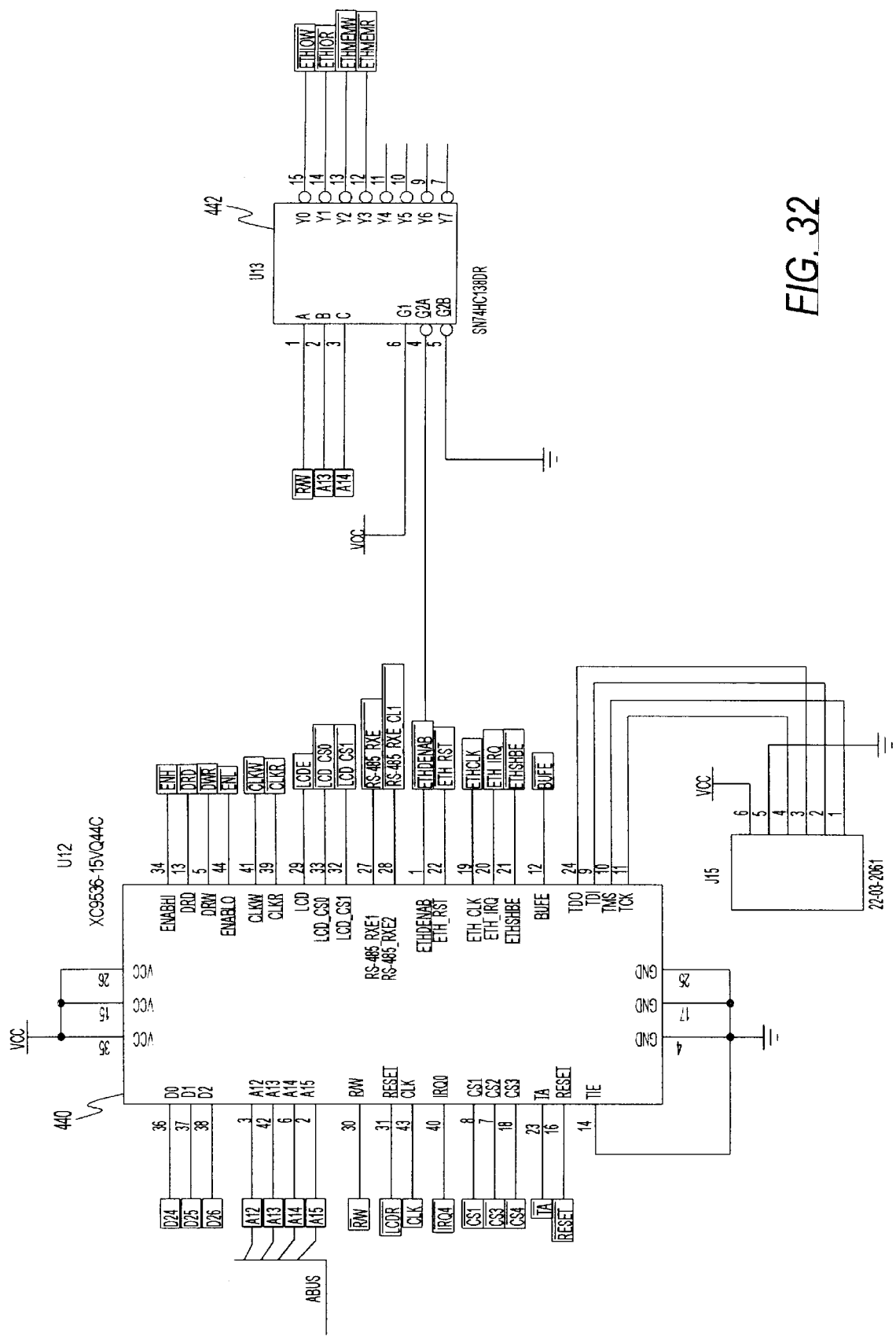

FIG. 32 illustrates additional logic and gate components for use with the Ethernet chip of FIG. 31, including an in-system programmable chip 440 of the type XC9536-15VQ44C. available from Xilinx. An additional decoder chip 442 is coupled with the chip 440 and it is of the type SN74HC138DR, a 3-line to 8-line decoder/de-multiplexer available from Texas Instruments.

Figure 33A:
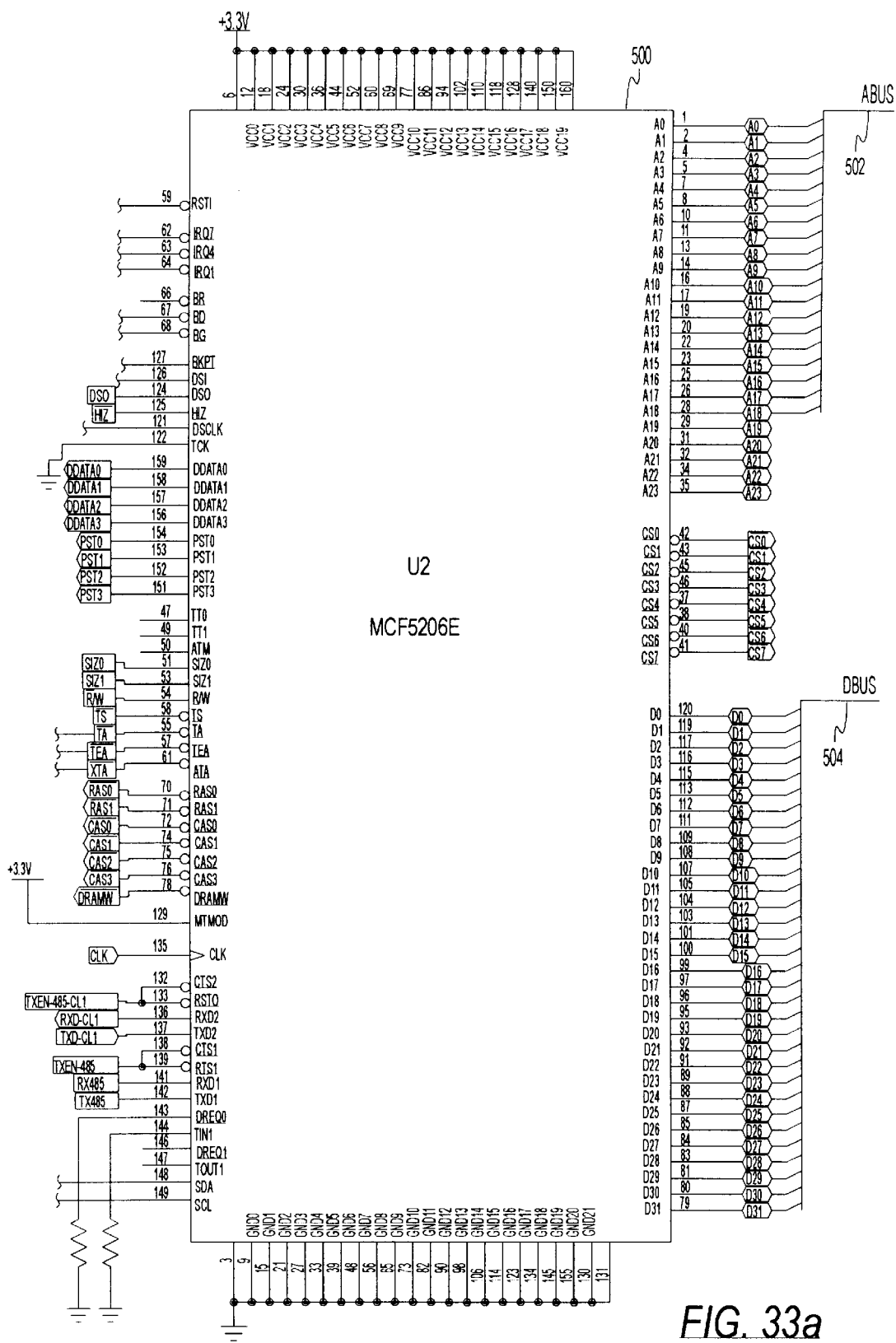
FIGS. 33*a*–*b* and 34*a*–*c* illustrate further circuits of the control module.
Figure 33B:
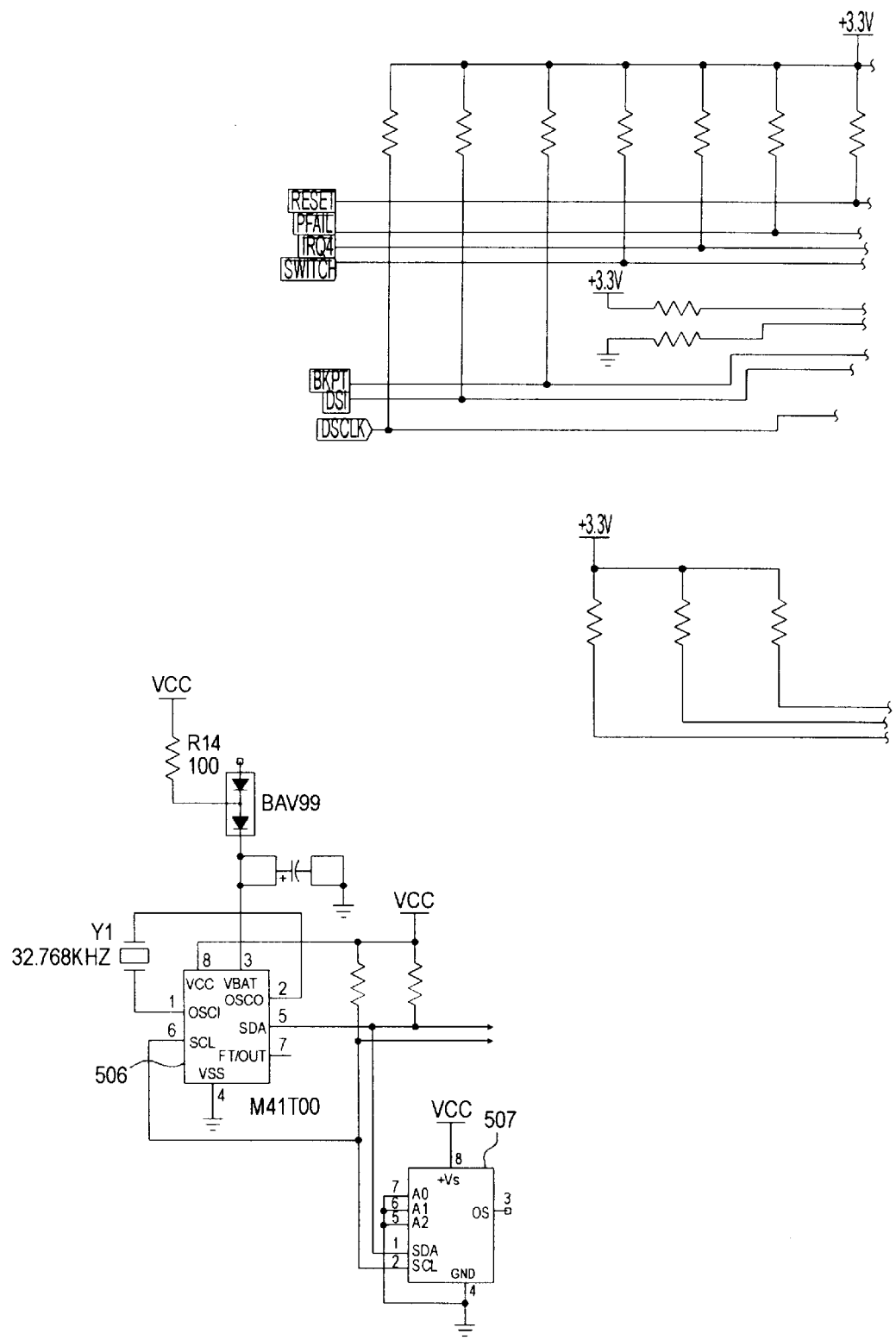

FIGS. 33a–c show the main controller or microprocessor 500 which in the illustrated embodiment comprises a Motorola MCF5206e integrated microprocessor. The microprocessor 500 is coupled with an address bus 502 and a data bus 504, portions of which also couple with the Ethernet chip 420 of FIG. 31. A portion of address bus 502 is also coupled with a real-time clock (RTC) 506. In the illustrated embodiment, this element 506 is an M41T00 serial access timekeeper available from ST Microelectronics, Inc. Temperature compensation for the clock 506 is provided by a digital temperature sensor and thermal watchdog element 507, such as a National Semiconductor LM75. A 40 MHz oscillator 508 (e.t., SG-615) is also provided for the microprocessor 500. An interface connector device 510 may also be utilized to program any memory or otherwise download data to the microprocessor 500. A supervisory chip 512 (e.g. TLC77331D) monitors a positive 3.3-volt regulated supply to assure a clean reset for the microprocessor 500. Finally, an additional serial EEPROM 514 provides non-volatile storage for a manufacturing data and/or customer configuration parameters. This EEPROM is a 24LC2651SN serial EEPROM.

Figure 34A:
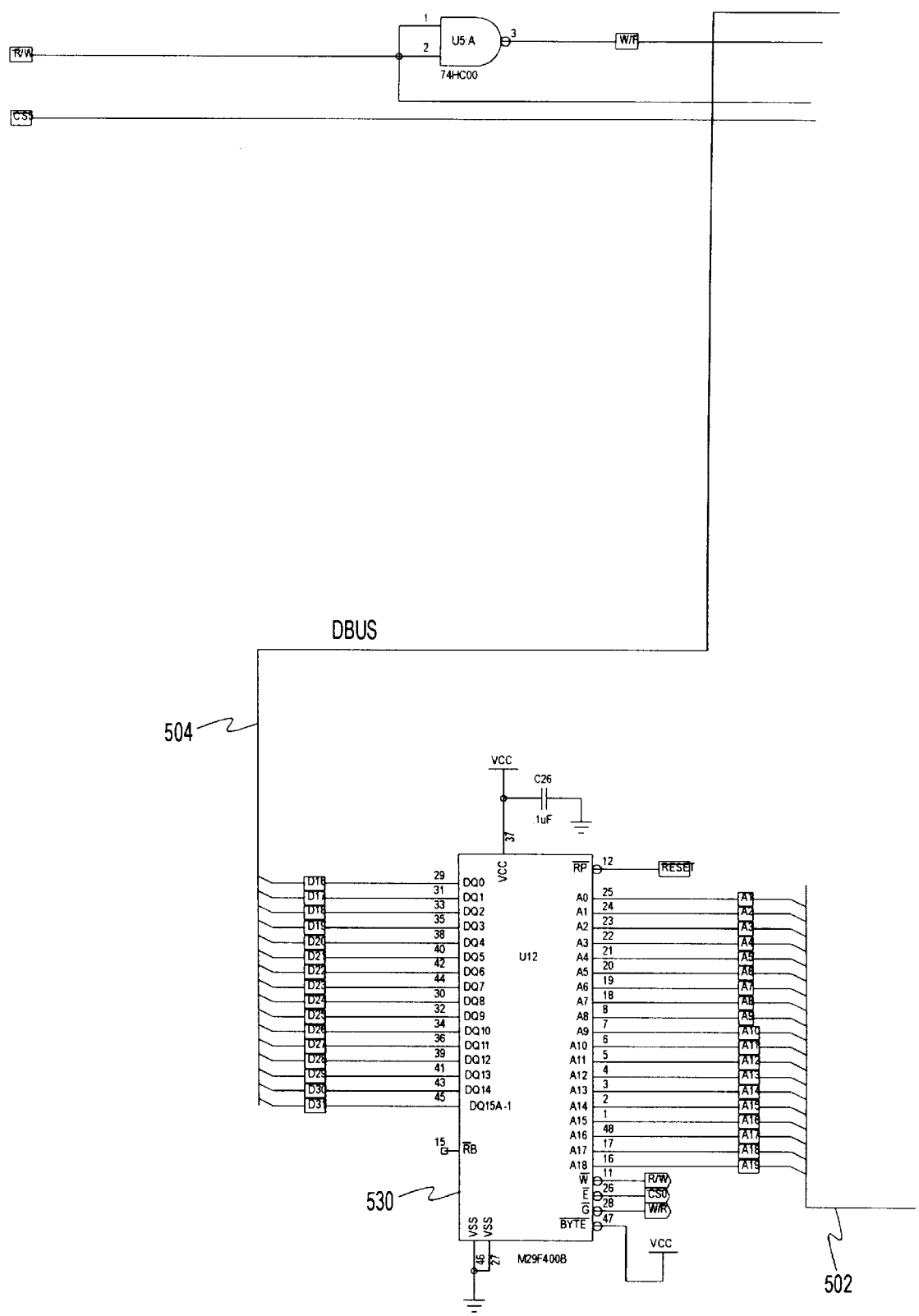
Figure 34B:
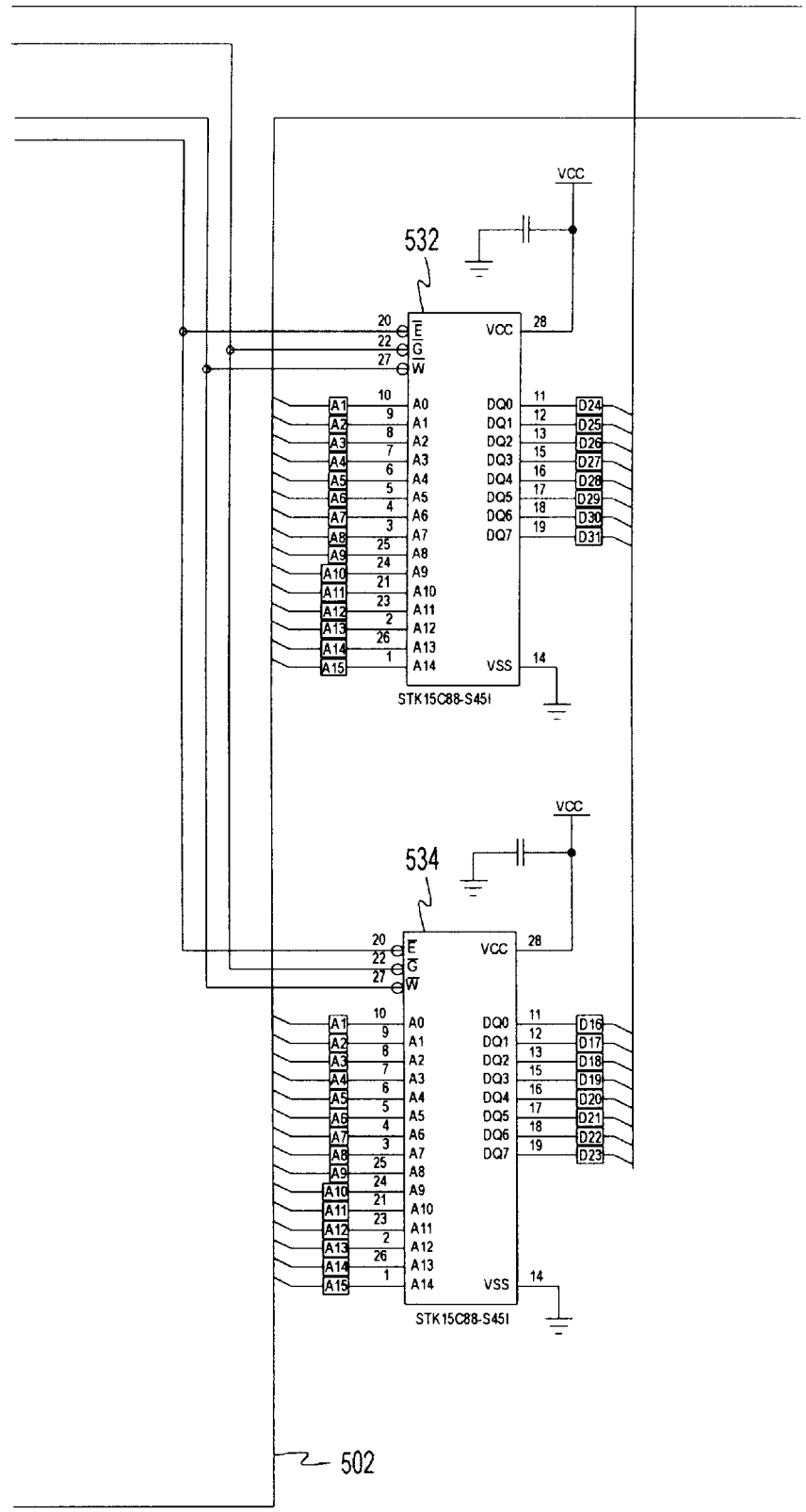
Figure 34C:
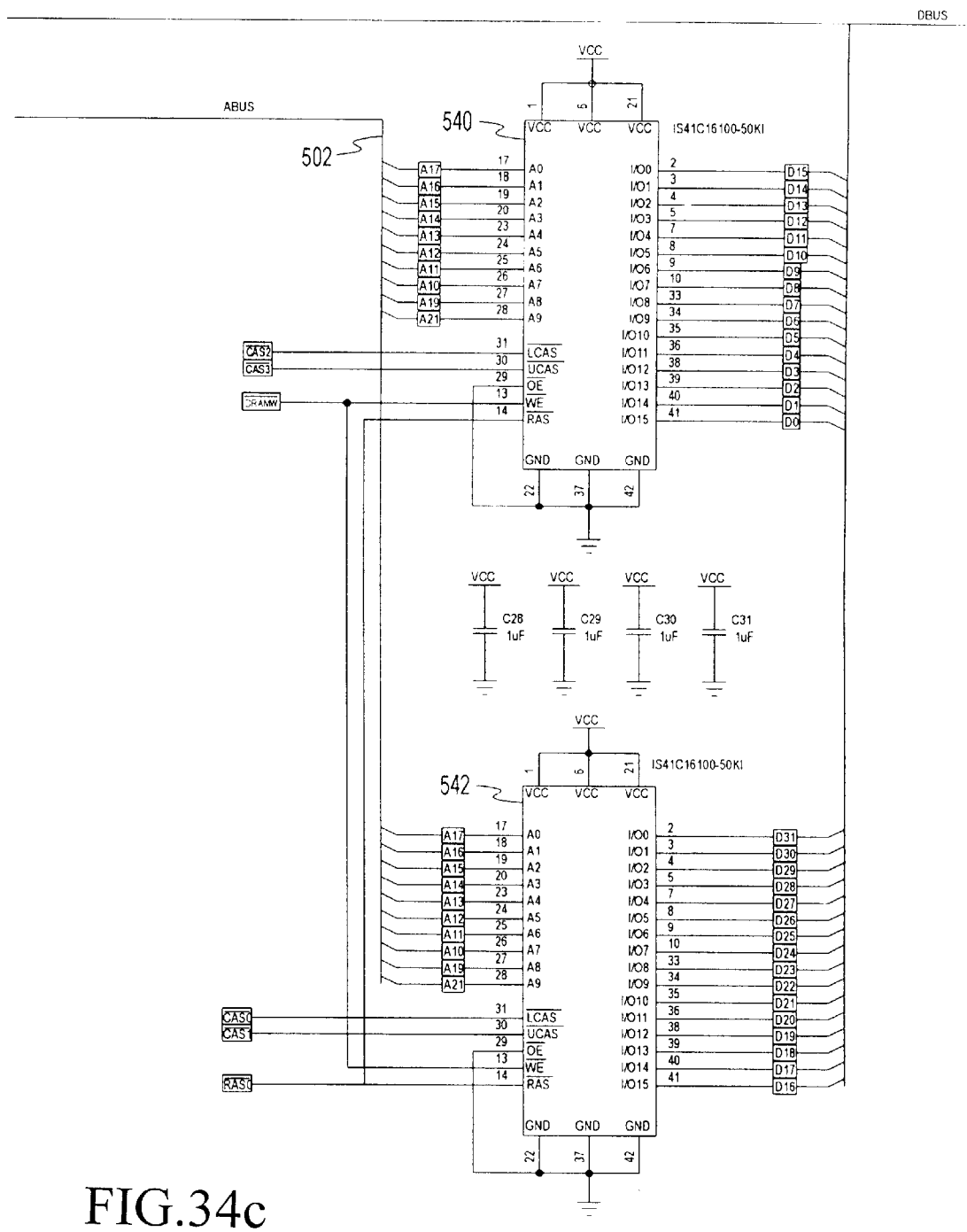

FIGS. 34a–c illustrate additional memory components which couple with the microprocessor 500 via the address and data buses 502, 504. The memory devices include a flash memory 530 which serves as a main program memory for the microprocessor 500. The flash memory 530 is an M29F400B 4 megabit (512×8 or 256×16, Boot Block) single supply/flash memory available from ST Microelectronics Inc. A pair of nonvolatile static RAM components 532, 534 are also provided. These RAM's 532, 534 may be of the type STK1588 available from Simtek. A pair of additional memory components 540 and 542 comprise DRAM RID41LV16100-50KI, 1M×16 (16M bit) Dymnamic Ram (DRAM) with EDO page mode available from Integrated Silicon Solution, Inc.

FIGS. 35a–c and 36 illustrate two types of user interface display panels which may be provided in connection with the control module 18. These panels may mount directly to the control module by use of suitable mating mounting pins (not shown) provided on the control module and the user interface/display panel. FIGS. 35a and 35b illustrate circuitry common to both of these front panels. FIG. 35c illustrates a visible display portion and related circuitry for a so-called LED front panel which uses LED displays elements 630, 640 while FIG. 36 illustrates the circuitry for connection with an LCD display panel 650. FIG. 35a illustrates a circuit associated with a number of operator-accessible pushbutton controls 600, which in the illustrated embodiment are 4 in number. A fifth pushbutton switch 602 is provided as a reset switch. A latch 604 operatively couples the switches 600 to respective data lines of the microprocessor 500. In the illustrated embodiment, the latch 604 is of the type LV373D, an Octal D-type transparent latch (3-state) available from Phillips Semiconductors. A switch interrupt signal is also provided in response to activation of any of the switches 600 by a logic circuit 606.

FIG. 35b illustrates a connector such as an RJ11 jack 610 which a customer may use to plug in a PC, laptop or other device to communicate with the processor 500, to update codes, etc., or to communicate with another device connected to the system at the connectors 336 of FIG. 28. The connector or jack 610 is coupled to RS232 protocol receive and transmit terminals 612 via a pair of buffers 614 of a buffer integrated circuit of the type MAX202E. These buffers connect in turn with an RS-485 transceiver 620 of the type MAX487ESA low power, slew-rate-limited RS-485/RS-422 transceivers available from Maxim Integrated Products. This transceiver also connects to the RS-485 terminals 336 of FIG. 28. Suitable timing signals are provided by a timing circuit which includes an LMC555CM timer available from National Semiconductor. The circuits of FIGS. 35a and 35b, as indicated above, are common to both the LED and LCD front panel/display modules. LEDs 621, 622 may be used to indicate receive or transmit signals present at transceiver 620.

Referring now to FIG. 35c, an exemplary LED display is illustrated. This display includes two groups of LEDs 630, 640 which may be programmed for desired indications, for example, for prompts to the user for setup, for indicating various aspects of system operations and the like. The first group 630 of LEDs is coupled to be addressed via 16-bit register 632 of the type P174FCT163374 available from Pericom. A second set of LEDs 640 is similarly coupled to be driven through a second 16-bit register 642 of the same type. Both of the registers 632 and 642 are coupled to suitable data lines of the microprocessor 500 (FIG. 33).

In FIG. 36, an LCD front panel circuit is illustrated. Here, an LCD 620 may be a 128×64 dot format graphic module of the type G1216BIN000 from Seiko Instruments USA. This LCD connector receives data inputs from the microprocessor 500 and is powered by a plus/minus 12-volt power supply 652 which may be of the type ICL7662EBA. Also, a negative temperature coefficient resistor 656 is utilized in the power supply circuit to control the brightness of the LCD over a range of temperatures to achieve a more constant, uniform brightness level.

Figure 37A:
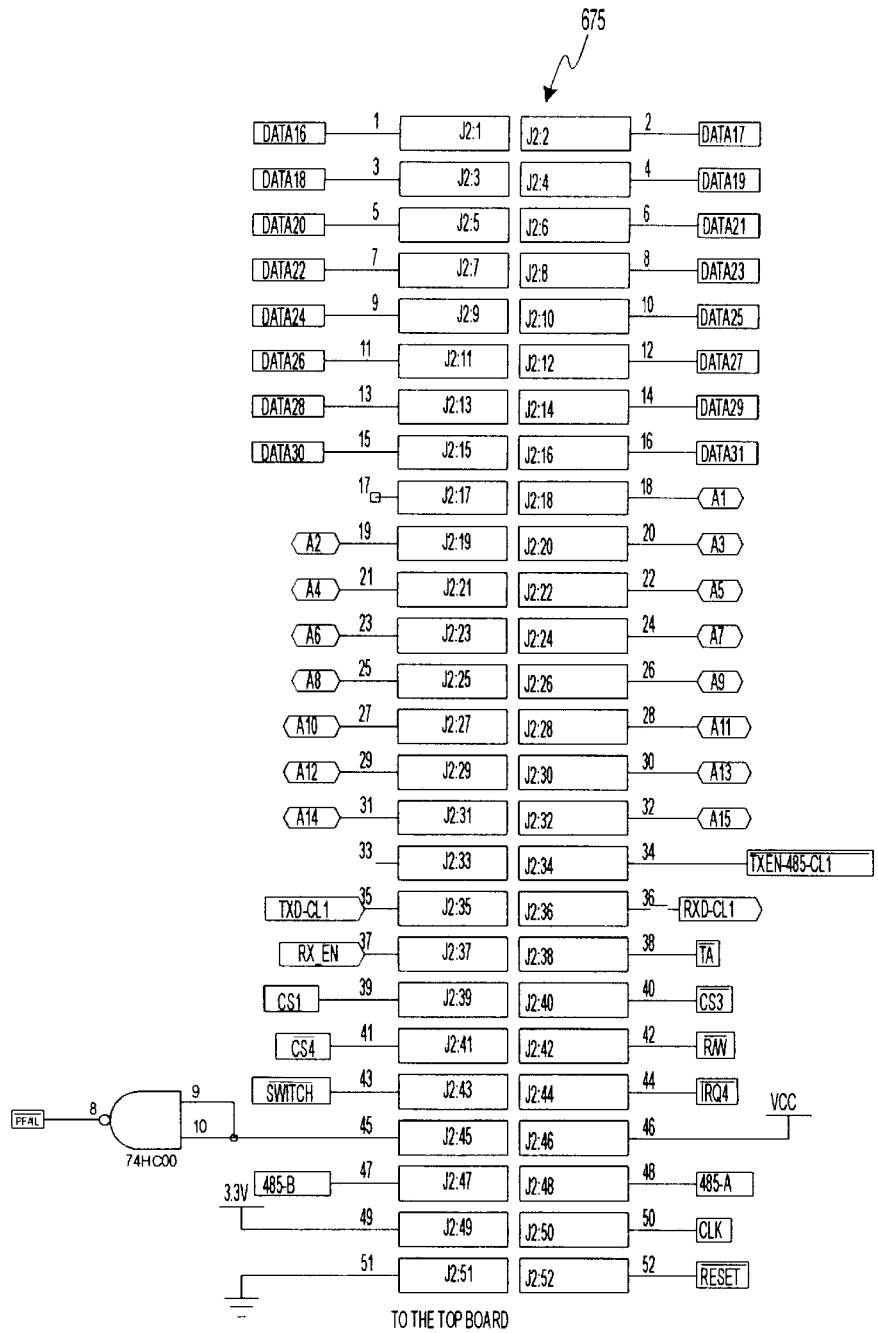
FIGS. 37*a*–*c* illustrate additional circuits of the control module of the invention.
Figure 37B:
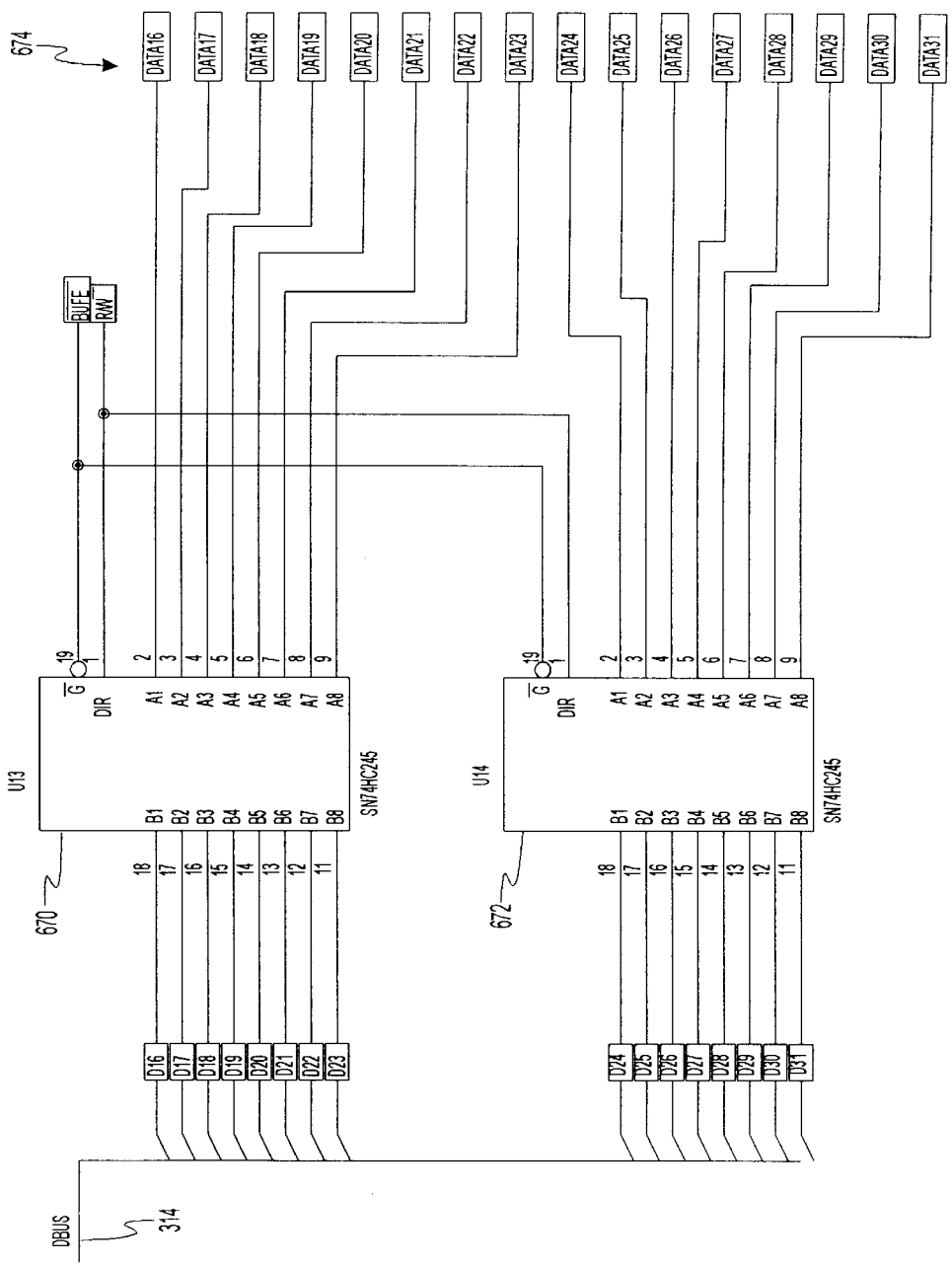
Figure 37C:
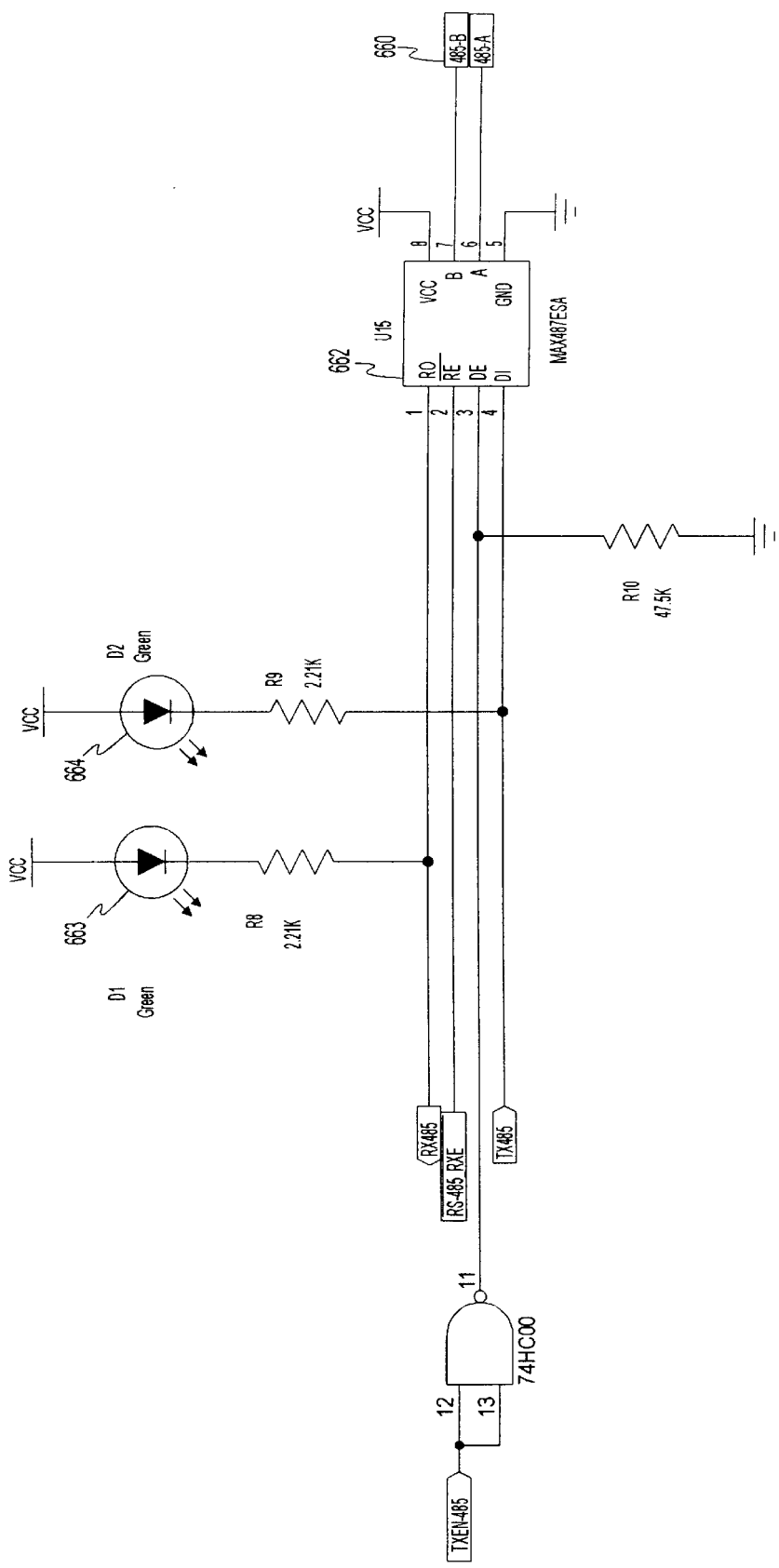

In FIG. 37, a second communications port 660 is provided by a RS-485 transceiver 662 also of the type MAX487ESA, similar to the transceiver 620 of FIG. 35b. Similar LED transmit and receive indicators 663, 664 are also provided. A pair of buffers 670, 672 are provided to limit data bus access to the upper board, which contains the microprocessor 500. These buffers are octal bus transceivers of the type SN74HC245 (Texas Instruments) and are coupled between the data bus 314 and a set of data terminals 674 which all send data to the data terminals of the non-volatile memory/RTC 506 of FIG. 33.

Finally, a connector 675 interfaces to the connector 332 of FIG. 28.

The above described controller or control module improves upon the above-discussed POWERLINK AS system in a number of ways, including the following:

This controller supports a larger number of control points, limited only by memory and communication capability.

This controller has communication router capabilities.

This controller has auxiliary power available for accessories, such as occupancy sensors.

This controller has the capability to provide a status feedback signal for pilot lights, annunciators, or control relays.

The above-described controller or control module has a housing dimensioned such that it can be inserted into a location normally occupied by one or more circuit breakers.

The control module is capable of accepting and interpreting one or more externally originating control signals provided from a sensor or control device, with an accessible termination area providing connection points for said sensor or control device. The above-described control module is also capable of providing control signals to one or more external actuator devices with a connection means for coupling said control signals to said remotely located actuator devices. The control module is also capable of interpreting said externally originating sensor or control device signals into control signals for the one or more external actuator devices. The control module includes a memory wherein mapping of said externally originating control signals to one or more external actuator devices is stored, and a circuit capable of acquiring said mapping information and loading said mapping information into said memory, and an externally viewable informational display on which a plurality of statuses of one or more of said control signals, said external actuators, or said controller are displayed. The control module may also include circuits capable of accepting commands or mapping information via at least one additional command path, via a connection located within said accessible termination area, and a circuit capable of accepting commands from the first command path and routing said commands through said additional command path. The additional command path may be configured for digital signals. A network address, may be assigned to the control module.

The control module may also utilize the informational display of accepting in the process of mapping information and loading said mapping information into said memory. The informational display may include at least one interactive user control, such as, but not limited to, a push-button, in response to activation of which the displayed statuses can be affected.

The command path(s) may be bi-directional, and utilize standardized communication interfaces and protocols such as, but not limited to, Ethernet, ModBus, RS-485, RS-232, USB, CEBus, IEEE-1394 or LonWorks communication technologies. In one embodiment, one bi-directional command path using RS-485 communication technology utilizes a ModBus protocol and ModBus automatically adjusts to RTU or ASCII communication mode. Optionally, controller response may be compatible with/viewable using a commercially available internet browser.

The control module is adapted to provide control signals for external actuator devices comprising electrical switching devices selected from the group consisting of relays, contactors, solid-state switches and remotely controllable circuit breakers. The above-described control module may have one or more of the following features:

an Ethernet controller;

an RS-485 transceiver; and a connector for connection to an external power source.

The connection to AC power may be alternately designed to receive AC power from a source other than the line terminal connection point in the panelboard location in which said controller means is mounted.

The control module may further include a circuit by which one or more of said control signal statuses are converted to an electrical voltage or current feedback signal, which may be connected to an external monitoring device via connection points located in said accessible termination area. Additional connection points to said DC electrical power may also be available within the accessible termination area.

The control module utilizes a microprocessor executing a logical program. The logical program or its configuration attributes are reprogrammable via one or more of said command paths.

The control module may further include a timing circuit and said externally originating control signals may be used to start or stop said timing circuit, with the timing circuit status being further converted into control signals for one or more external actuator devices. The control module further containing a real-time clock, whereby the real-time clock value may be compared to a schedule resident in memory, and the status of this comparison is converted into control signals for one or more external actuator devices. The real-time clock means may further contain a calendar capable of providing at least current day of the week information, and additionally capable of providing current date, month and year information. The control module may further be capable of obtaining an external clock synchronizing signal for the real-time clock, such as, but not limited to signals transmitted by radio, satellite, or network connection.

The connection points for a sensor or control device are electrically isolated from the connection coupling said externally located actuator devices, and the informational display is electrically isolated from the connection means coupling said externally located actuator devices.

The above-described control module also includes a timing circuit means (implemented in code-firmware). A control signal event commanding an external actuator device to the off state will be used to start the timing circuit, with the initiation of the timing circuit resulting in a temporary off condition at the external actuator device, and then delaying the final off condition of the external actuator until the timing circuit times out, unless a subsequent control signal event commands the external actuator device back to the on state. The temporary off condition is configurable and can be alternately configured so that said temporary off condition does not occur.

The above-described power supply module is mountable within an electrical panelboard having a plurality of circuit breaker locations, and generally includes:

a plurality of inputs for connecting to external sensors;

a plurality of outputs for connecting to external actuators capable of manual override and providing status feedback signals to the control system;

means, operable in a learn mode and responsive to the status feedback signals, for learning associations between the inputs and the outputs and recording the associations in a memory in response to a human operator selecting one of the inputs and manually toggling selected ones of the external actuators between first and second positions; and means, operable in a run mode, for commanding the selected ones of the external actuators to one of the first and second positions in response to a change in state of the external sensor connected to the one of the inputs, whereby the human operator has programmed an output response to input activity by manual manipulation of the connected sensors and actuators.

The actuators may be electrical switching devices selected from a group consisting of relays, contactors, and remotely operated circuit breakers. The sensors may be electrical signaling devices selected from a group consisting of switches, occupancy sensors, light level sensors, and thermostats. The actuators are housed within an electrical distribution panel. A user interface permits the human operator to select the one of the inputs and to direct the control system to enter one of the learn mode and the run mode, and an informational display indicates the mode of the control system and which of the inputs is selected.

A method of programming a control system is provided, as described above. The control system includes a plurality of inputs and outputs, the inputs being connected to external sensors, the outputs being connected to external actuators capable of manual override and providing status feedback signals to the control system, the control system including a memory for recording associations between the inputs and the outputs. The method comprises switching the control system to a learn mode, selecting one of the inputs, and manually toggling selected ones of the external actuators between first and second positions.

As noted above, the actuators may be electrical switching devices selected from a group consisting of relays, contactors, and remotely operated circuit breakers, and the sensors may be electrical signaling devices selected from a group consisting of switches, occupancy sensors, light level sensors, and thermostats. The steps of switching the control system to the learn mode and selecting one of the inputs can be performed by a human operator via a user interface, and the informational display indicates the mode of the control system and which of the inputs is selected.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within scope of the invention

What is claimed is:

1. A programmable control system, comprising:

a plurality of inputs for connecting to sensors;

a plurality of outputs for connecting to actuators capable of manual override and providing status feedback signals to the control system;

means, operable in a learn mode and responsive to the status feedback signals, for learning associations between the inputs and the outputs and recording the associations in a memory in response to a human operator selecting one of the inputs and manually toggling selected ones of the actuators between first and second positions; and means, operable in a run mode, for commanding the selected ones of the actuators to one of the first and second positions in response to a change in state of an external sensor connected to the one of the inputs, whereby the human operator has programmed an output response to input activity by manual manipulation of the connected sensors and actuators.

2. The programmable control system of claim 1, wherein the actuators are electrical switching devices selected from a group comprising relays, contactors, and remotely operated circuit breakers.

3. The programmable control system of claim 1, wherein the sensors are electrical signaling devices selected from a group comprising switches, occupancy sensors, light level sensors, and thermostats.

4. The programmable control system of claim 1, wherein the actuators are housed within an electrical distribution panel.

5. The programmable control system of claim 1, further including a user interface permitting the human operator to select one of the inputs and to direct the control system to enter one of the learn mode and the runmode.

6. The programmable control system of claim 1, further including an informational display for indicating the mode of the control system and which of the inputs is selected.

7. A method of programming a control system including a plurality of inputs and outputs, the inputs being connected to sensors, the outputs being connected to actuators capable of manual override and providing status feedback signals to the control system, the control system including a memory for recording associations between the inputs and the outputs, the method comprising:

switching the control system to a learn mode;

selecting one of the inputs; and manually toggling selected ones of the actuators between first and second positions.

8. The method of claim 7, wherein the switching the control system to the learn mode and the selecting one of the inputs are performed by a human operator via a user interface.

9. The method of claim 7, further including indicating by an informational display the mode of the control system and which of the inputs is selected.

10. A method of operating a programmable control system, comprising:

connecting a plurality of inputs to sensors;

connecting a plurality of inputs to actuators capable of manual override;

providing status feedback signals from said external actuators to the control system;

in a learn mode, responsive to the status feedback signals, learning associations between the inputs and the outputs and recording the associations in a memory in response to a human operator selecting one of the inputs and manually toggling selected ones of the actuators between first and second positions; and in a run mode, commanding the selected ones of the actuators to one of the first and second positions in response to a change in state of an external sensor connected to the one of the inputs, whereby the human operator has programmed an output response to input activity by manual manipulation of the connected sensors and actuators.

11. The method of claim 10, further including the human operator selecting one of the inputs and directing the control system to enter one of the learn mode and the run mode.

12. The method of claim 10, further including displaying the mode of the control system and which of the inputs is selected.

13. A control bus for an electrical panelboard, said control bus comprising:

a housing;

a plurality of connectors arranged on said housing such that a connector is adjacent to each of a plurality of actuator device locations, whereby the control bus is capable of coupling to one or more actuator devices occupying one or more of said plurality of actuator locations;

a controller circuit capable of accepting a control signal from an external device, which control signal is used to command an operating position of one or more actuator devices occupying said one or more actuator device locations; and a drive circuit capable of causing said one or more actuator devices to actuate between at least two operating positions in response to said control signal.

14. The control bus of claim 13, and further including a connector on said housing for accepting control signals from an external device, and a connector on said housing for providing externally supplied electrical power to said control bus.

15. The control bus of claim 13, and further including a detection circuit capable of detecting an actuator device coupled to the control bus and communicating one or more signals representative of said actuator device coupled to the control bus.

16. The control bus of claim 15 in which the detection circuit is capable of providing a signal representative of the operating position of the actuator.

17. The control bus of claim 15, and further including an identification circuit capable of providing a signal representative of one or more identifying features of the actuator device.

18. The control bus of claim 17 wherein the detection and identification circuits communicate digitally with the controller circuit.

19. The control bus of claim 18 in which the controller circuit assigns an address to each actuator location.

20. The control bus of claim 13 in which a means for mounting said bus within a panelboard is provided.

21. The control bus of claim 20 in which the mounting means is arranged so that the control bus may be removed for servicing.

22. The control bus of claim 13 in which said controller circuit comprises a microprocessor.

23. The control bus of claim 13 in which said controller circuit is capable of addressing individual actuator device locations.

24. The control bus of claim 13, and further including a non-volatile memory device capable of storing information including communications parameters, number of actuator operations, accumulated actuator on-time, actuator event log, and actuator name tags.

25. The control bus of claim 13, and further including at least one display element.

26. A circuit breaker device having a load terminal, and an internal impedance connected between the load terminal and an external detection circuit, which internal impedance provides both isolation and level reduction.

27. The circuit breaker device of claim 26 in which the internal impedance is resistive.

28. The circuit breaker device of claim 26, and further including an internal wire-jumper identification circuit, in which at least the following conditions are encoded: 1-pole, 2-pole, 3-pole, device not present.

29. The circuit breaker of claim 28, further including a connector for implementing a connection between the internal wire jumper identification circuit and external detection circuit.

30. The circuit breaker device of claim 26, and further including a connector for implementing a connection between the internal impedance and an external detection circuit.

31. A circuit breaker device with an internal wire-jumper identification circuit, in which at least the following conditions are encoded: 1-pole, 2-pole, 3-pole, device not present.

32. The circuit breaker device of claim 31, and further including a connector for implementing a connection between the internal wire jumper identification circuit and external detection circuit.

33. A control module comprising:

a housing;

a processor in said housing capable of accepting and interpreting one or more externally originating control signals provided directly from at least one of a sensor and a control device;

said processor being further capable of providing actuator control signals for one or more actuator devices located external to said housing;

said processor being further capable of interpreting said externally originating control signals for use in developing said actuator control signals for one or more actuator devices;

a memory disposed within said housing wherein mapping of said externally originating control signals to one or more actuator devices is stored, said processor being capable of acquiring said mapping information and loading said mapping information into said memory; and an informational display mounted to said housing, on which a plurality of statuses of at least one of said control signals, said actuators, and said controller are displayed.

34. The control module of claim 33 wherein said processor is capable of performing at least one of accepting commands and mapping information via at least one command path and one additional command path.

35. The control module of claim 33 including connectors on said housing for mounting said control module to a control bus in an electrical panelboard.

36. The control module of claim 34 wherein said processor is capable of accepting commands from said one command path and routing said commands through said additional command path.

37. The control module of claim 34 in which the command paths are configured for carrying digital signals.

38. The control module of claim 34 wherein at least one command path is bi-directional.

39. The control module of claim 33 and further including a transceiver for at least one electrical communication technology as selected from Ethernet, ModBus, RS-485, RS-232, USB, CEBus, IEEE-1394, LonWorks, and other communication technologies.

40. The control module of claim 39 in which a network address is assigned to said control module.

41. The control module of claim 33 in which said processor produces output signals which are compatible with a commercially available internet browser.

42. The control module of claim 39 in which an RS-485 communication technology is utilized, which in turn utilizes ModBus protocol and wherein said command path utilizing ModBus automatically adjusts to RTU or ASCII communication mode.

43. The control module of claim 33 wherein the processor is adapted to provide control signals for external actuator devices comprising electrical switching devices selected from the group comprising relays, contactors, solid-state switches and remotely controllable circuit breakers.

44. The control module of claim 33 and further including an Ethernet controller.

45. The control module of claim 33 and further including a real-time clock.

46. The control module of claim 35 and further including a connector on said housing for receiving electrical power from an external power source.

47. The control module of claim 33 wherein the processor utilizes said informational display in the process of acquiring said mapping information and loading said mapping information into said memory.

48. The control module of claim 47 in which the informational display includes at least one interactive user control.

49. The control module of claim 33 and further including a circuit by which one or more of said statuses are converted to an electrical signal, which may be utilized by an external monitoring device.

50. The control module of claim 33 and further including at least one RS-485 controller.

51. The control module of claim 34 wherein said processor comprises a microprocessor executing a program.

52. The control module of claim 51 in which the at least some configuration attributes of said program are reprogrammable via one or more of said command paths.

53. The control module of claim 33 further containing a timing circuit and wherein said processor is responsive to externally originating control signals to start or stop said timing circuit, and wherein a timing circuit status is converted by the processor into control signals for one or more external actuator devices.

54. The control module of claim 33 further including a real-time clock, and wherein the processor compares a real-time clock value to a schedule resident in said memory, and converts the status of said comparison into control signals for one or more external actuator devices.

55. The control module of claim 54, said real-time clock further containing a calendar capable of providing at least current day of the week information, and additionally capable of providing current date, month and year information.

56. The control module of claim 54, said real-time clock further being capable of utilizing an external clock synchronizing signal.

57. The control module of claim 33 including means for electrically isolating connection points for the sensor or control device from connection points for the actuator devices.

58. The control module of claim 33 in which said informational display is electrically isolated from said externally located actuator devices.

59. The control module of claim 33 further containing a timing circuit, wherein said processor starts said timing circuit in response to a control signal event commanding an external actuator device to the off state; and, upon initiation of said timing circuit, said processor produces a control signal for causing temporary off condition at the external actuator device and then delays a control signal for causing a final off condition of the external actuator until said timer expires, unless a subsequent control signal event commands the external actuator device back to the on state.

60. The control module of claim 59, wherein said processor can be alternately configured so that said temporary off condition does not occur.

61. The control module of claim 31 in which said power supply is adaptive to a wide range of voltage and frequency, whereby said adaptive voltage range is at least from 120 Vac to 277 Vac and the adaptive frequency range is at least from 50 to 60 cycles per second.

62. An address selection module for use in an energy management system, the energy management system including at least one control bus mounted in at least one panelboard and a plurality of circuit breakers mounted to the control bus, the address selection module comprising:

a switch for setting at least a port of an address of the control bus;

a first connector for receiving power and communication signals from an external source; and a second connector for detachably connecting the address selection module to the control bus such that the address selection module is separable and removable from the control bus, the second connector transferring the address set by the switch to the control bus.

63. The address selection module of claim 62, further including a third connector for detachably connecting the address selection module to the control bus, the third connector transferring the power and communication signals to the control bus.

64. The address selection module of claim 63, further including a fourth connector for connecting the address selection module to a wire harness extending from another control bus.

65. The address selection module of claim 62, and further including a fourth connector for connecting the address selection module to a wire harness extending from a second control bus in the same panelboard.

66. The address selection module of claim 64, wherein the address is in the form a plurality of digits comprising at least one of transferred digit and at least one non-transferred digit, the address selection module, via wire harness, transferring the at least one transferred digit to the second control bus but not transferring the non-transferred digit, the second control bus having an address comprising the at least one transferred digits and an additional digit different from the non-transferred digit.

67. The address selection module of claim 64, wherein the address is in the form a plurality of bits comprising at least one of transferred bit and at least one non-transferred bit, the address selection module, via wire harness, transferring the at least one transferred bit to the second control bus but not transferring the non-transferred bit, the second control bus having an address comprising the at least one transferred bit and an additional bit different from the non-transferred bit.

68. The address selection module of claim 66, wherein the plurality of bits includes four bits, the at least one transferred bit being the three most significant bits of the four bits, the non-transferred bit being the least significant of the four bits.

69. The address selection module of claim 62, wherein the switch assigns an address to a second control bus by connecting the address selection module to the second control bus.

70. An addressing arrangement for use in an energy management system, the energy management system including first and second control busses and a plurality of circuit breakers mounted to the control busses, the addressing arrangement comprising:

an address selection module removably connected to the first control bus, the address selection module including a switch for assigning a first address to the first control bus, the address selection module including a connector for detachably connecting the address selection module to the first control bus and transferring the first address set by the switch to the first control bus; and a wire harness extending from the address selection module to the second control bus so as to assign a second address to the second control bus.

71. The addressing arrangement of claim 70, wherein the first address is in the form a plurality of digits comprising transferred digits and at least one non-transferred digit, the wire harness transferring the transferred digits to the second control bus but not transferring the non-transferred digit, the second address comprising of the transferred digits and an additional digit different from the non-transferred digit.

72. The addressing arrangement of claim 70, wherein the first address is in the form a plurality of bits comprising transferred bits and at least one non-transferred bit, the wire harness transferring the transferred bits to the second control bus but not transferring the non-transferred bit, the second address comprising the transferred bits and an additional bit different from the non-transferred bit.

73. The addressing arrangement of claim 70, wherein the address selection module includes a second connector for receiving power and communication signals from an external source.

74. The addressing arrangement of claim 73, wherein the address selection module includes a third connector for detachably connecting the address selection module to the first control bus and transferring the power and communication signals to the first control bus.

75. The addressing arrangement of claim 73, wherein the address selection module includes a fourth connector for connecting the address selection module to the wire harness, the wire harness transferring the power and communications signals to the second control bus.

76. An energy management system comprising:

a control bus mountable to an electrical panelboard, said control bus comprising:

a housing;

a plurality of connectors arranged on said housing such that a connector is adjacent to each of a plurality of actuator device locations, whereby the control bus is capable of coupling to one or more actuator devices occupying one or more of said plurality of actuator locations;

a controller circuit capable of accepting a control signal from an external device,which control signal is used to command an operating position of one or more actuator devices occupying said one or more actuator device locations; and a drive circuit capable of causing said one or more actuator devices to actuate between at least two operating positions in response to said control signal; and a control module mountable to said control bus, said control module comprising:

a housing;

a processor in said housing capable of accepting and interpreting one or more externally originating control signals provided from at least one of a sensor and a control device;

said processor being further capable of providing actuator control signals for said actuator devices;

said processor being further capable of interpreting said externally originating control signals for use in developing said actuator control signals for one or more actuator devices;

a memory disposed within said housing wherein mapping of said externally originating control signals to one or more actuator devices is stored, said processor being capable of acquiring said mapping information and loading said mapping information into said memory; and an informational display mounted to said housing, on which a plurality of statuses of at least one of said control signals, said actuators, and said controller are displayed.

77. The energy management system of claim 76, including at least one circuit breaker device mountable to said control bus and having a load terminal and an external connector, and an internal impedance connected between the load terminal and said external connector, which internal impedance provides both isolation and level reduction; said at least one circuit breaker device comprising at least one of said actuator devices.

78. The energy management system of claim 76, including a power supply, mountable to said control bus, said power supply comprising:

a power supply housing dimensioned such that said power supply housing can be inserted into a location in said control bus configured to be occupied by a circuit breaker;

a connector on said power supply housing for connecting to AC power; and a circuit within said power supply housing providing a regulated source of DC electrical power to output terminals, converted from said AC power in a range of voltage from at least 120 Vac to 277 Vac and a frequency range from at least 50 to 60 cycles per second.

79. The energy management system of claim 76, including an address selection module mountable to said control bus, the address selection module comprising:

a switch for setting at least a port of an address of the control bus;

a first connector for receiving power and communication signals from an external source; and a second connector for detachably connecting the address selection module to the control bus such that the address selection module is separable and removable from the control bus, the second connector transferring the address set by the switch to the control bus.

80. The energy management system of claim 78, including at least one circuit breaker device mountable to said control bus and having a load terminal and an external connector, and an internal impedance connected between the load terminal and said external connector, which internal impedance provides both isolation and level reduction, said at least one circuit breaker device comprising at least one of said actuator devices.

81. The energy management system of claim 79, including at least one circuit breaker device mountable to said control bus and having a load terminal and an external connector, and an internal impedance connected between the load terminal and said external connector, which internal impedance provides both isolation and level reduction; said at least one circuit breaker device comprising at least one of said actuator devices.

82. The energy management system of claim 79, said address module further including a third connector for detachably connecting the address selection module to the control bus, the third connector transferring the power and communication signals to the control bus.

83. The energy management system of claim 82, said address module further including a fourth connector for connecting the address selection module to a wire harness extending from another control bus.

84. The energy management system of claim 78, including an address selection module mountable to said control bus, the address selection module comprising:
   a switch for setting at least a port of an address of the control bus;
   a first connector for receiving power and communication signals from an external source; and
   a second connector for detachably connecting the address selection module to the control bus such that the address selection module is separable and removable from the control bus, the second connector transferring the address set by the switch to the control bus.

85. The energy management system of claim 84, including at least one circuit breaker device mountable to said control bus and having a load terminal and an external connector, and an internal impedance connected between the load terminal and said external connector, which internal impedance provides both isolation and level reduction; said at least one circuit breaker device comprising at least one of said actuator devices.

86. An energy management system comprising:
   a control bus mounted to an electrical panelboard, said control bus comprising:
      a housing;
      a plurality of connectors arranged on said housing such that a connector is adjacent to each of a plurality of actuator device locations, whereby the control bus is capable of coupling to one or more actuator devices occupying one or more of said plurality of actuator locations;
      a controller circuit capable of accepting a control signal from an external device, which control signal is used to command an operating position of one or more actuator devices occupying said one or more actuator devices locations; and
      a drive circuit capable of causing said one or more actuator devices to actuate between at least two operating positions in response to said control signal; and
   at least one circuit breaker device mountable control bus and having a load terminal and an external connector and an internal impedance connected between the load and said external connector, which internal impedance provides both isolation and level reduction; said at least one circuit breaker comprising at least one of said attenuator devices.

87. The energy management system of claim 86, including a power supply comprising:
   a housing dimensioned such that it can be inserted into one of said actuator device locations;
   a connector on said housing for connecting to AC power; and
   a circuit within said housing providing a regulated source of DC electrical power to output terminals, converted from said AC power, in which said conversion circuitry is adaptive to a range of voltage from at least 120 Vac to 277 Vac and the adaptive frequency range is adaptive from at least 50 to 60 cycles per second.

88. An energy management system comprising:
   a control bus mountable to an electrical panelboard, said control bus comprising:
      a housing;
      a plurality of connectors arranged on said housing such that a connector is adjacent to each of a plurality of actuator device locations, whereby the control bus is capable of coupling to one or more actuator devices occupying one or more of said plurality of actuator locations;
      a controller circuit capable of accepting a control signal from an external device, which control signal is used to command an operating position of one or more actuator devices occupying said one or more actuator devices locations; and
      a drive circuit capable of causing said one or more actuator devices to actuate between at least two operating positions in response to said control signal; and
   an address selection module comprising:
      a switch for setting at least a port of an address of the control bus;
      a first connector for receiving power and communication signals from an external source; and
      a second connector for detachably connecting the address selection module to the control bus such that the address selection module is separable and removable from the control bus, the second connector transferring the address set by the switch to the control bus.

89. The system of claim 88, said address selection module further including a third connector for detachably connecting the address selection module to the control bus, the third connector transferring the power and communication signals to the control bus.

90. The system of claim 89, said address selection module further including a fourth connector for connecting the address selection module to a wire harness extending from another control bus.

91. The system of claim 88 and further including at least one circuit breaker device having a load terminal, and an internal impedance connected between the load terminal and an external detection circuit, which internal impedance provides both isolation and level reduction, said at least one circuit breaker device comprising at least one of said actuator devices.

92. The system of claim 91, said circuit breaker device further including an internal wire-jumper identification circuit, in which at least the following conditions are encoded 1-pole, 2-pole, 3-pole, device not present.

93. The system of claim 88, and further including a power supply comprising:
   a housing dimensioned such that said housing can be inserted into one of said actuator device locations;
   a connector on said housing for connecting to AC power; and a circuit within said housing providing a regulated source of DC electrical power to output terminals, converted from said AC power in a range of voltage from at least 120 Vac to 277 Vac and a frequency range from at least 50 to 60 cycles per second.

94. The system of claim 90, and further including a power supply comprising:
- a housing dimensioned such that said housing can be inserted into one of said actuator device locations;
- a connector on said housing for connecting to AC power; and
- a circuit within said housing providing a regulated source of DC electrical power to output terminals, converted from said AC power in a range of voltage from at least 120 Vac to 277 Vac and a frequency range from at least 50 to 60 cycles per second.

95. The control module of claim 34 wherein the control signal path to said externally located actuator devices is bi-directional.

96. A power supply, mountable within an electrical panelboard with a plurality of circuit breaker locations, comprising:
- a housing dimensioned such that said housing can be inserted into a location in said panelboard configured to be occupied by a circuit breaker;
- connector on said housing for connecting to AC power; and
- a circuit within said housing providing a regulated source of DC electrical power to output terminals, converted from said AC power in a range of voltage from at least 120 Vac to 277 Vac and a frequency range from at least 50 to 60 cycles per second.

* * * * *